(12) United States Patent
Nishiguchi et al.

(10) Patent No.: US 11,871,124 B2
(45) Date of Patent: Jan. 9, 2024

(54) IMAGE CAPTURING APPARATUS, METHOD OF CONTROLLING THE SAME, AND NON-TRANSITORY COMPUTER-READABLE STORAGE MEDIUM

(71) Applicant: CANON KABUSHIKI KAISHA, Tokyo (JP)

(72) Inventors: Tatsuya Nishiguchi, Kanagawa (JP); Noboru Omori, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 236 days.

(21) Appl. No.: 17/406,449

(22) Filed: Aug. 19, 2021

(65) Prior Publication Data
US 2021/0385375 A1 Dec. 9, 2021

Related U.S. Application Data

(63) Continuation of application No. PCT/JP2020/006201, filed on Feb. 18, 2020.

(30) Foreign Application Priority Data

Feb. 28, 2019 (JP) ................ 2019-036396
Apr. 26, 2019 (JP) ................ 2019-085969

(51) Int. Cl.
*H04N 23/80* (2023.01)
*H04N 19/172* (2014.01)
(Continued)

(52) U.S. Cl.
CPC ........... *H04N 23/80* (2023.01); *H04N 19/172* (2014.11); *H04N 23/64* (2023.01); *H04N 25/57* (2023.01)

(58) Field of Classification Search
CPC ........ H04N 5/772; H04N 5/77; H04N 9/8042; H04N 9/8205; H04N 23/741;
(Continued)

(56) References Cited

U.S. PATENT DOCUMENTS 8,269,852 B2 * 9/2012 Shiraishi ............... H04N 23/71
348/222.1
8,417,067 B2 4/2013 Nakao et al.
(Continued)

FOREIGN PATENT DOCUMENTS

CN 1929535 A 3/2007
CN 101155261 A 4/2008
(Continued)

OTHER PUBLICATIONS

International search report issued in Intl. Appln. No. PCT/JP2020/006201 dated May 12, 2020. English translation provided.
(Continued)

*Primary Examiner* — Pritham D Prabhakher
(74) *Attorney, Agent, or Firm* — ROSSI, KIMMS & McDOWELL LLP

(57) ABSTRACT

The invention provides an image capturing apparatus which comprises an image capturing unit, a selecting unit which selects a dynamic range, a developing unit which performs a developing process on RAW image data obtained by the image capturing unit; and a control unit which performs control such that if a first dynamic range is selected, image data obtained by performing a developing process for the first dynamic range on the RAW image data by the developing unit is recorded as the RAW image file together with the RAW image data, and if a second dynamic range is selected, image data obtained by performing a developing process for the second dynamic range on the RAW image
(Continued)

data by the developing unit is recorded as the RAW image file together with the RAW image data.

19 Claims, 44 Drawing Sheets

(51) Int. Cl.
*H04N 23/60* (2023.01)
*H04N 25/57* (2023.01)

(58) Field of Classification Search
CPC .... H04N 23/667; H04N 23/631; H04N 23/64; H04N 23/57; H04N 19/172
USPC ...................................................... 348/222.1
See application file for complete search history.

(56) References Cited

U.S. PATENT DOCUMENTS

| | | | |
|---|---|---|---|
| 8,554,010 B2* | 10/2013 | Hasegawa | H04N 23/70 |
| | | | 348/222.1 |
| 9,413,921 B2* | 8/2016 | Matsumoto | H04N 23/635 |
| 9,538,093 B2 | 1/2017 | Chen et al. | |
| 9,918,062 B2* | 3/2018 | Gunji | H04N 23/80 |
| 9,955,135 B2 | 4/2018 | Matsuyama | |
| 10,148,871 B2* | 12/2018 | Thumpudi | H04N 23/841 |
| 2007/0052819 A1* | 3/2007 | Nakao | H04N 1/2104 |
| | | | 348/231.1 |
| 2009/0086074 A1 | 4/2009 | Li et al. | |
| 2009/0154551 A1* | 6/2009 | Tauchi | H04N 5/772 |
| | | | 386/338 |
| 2015/0195441 A1* | 7/2015 | Chen | G06T 5/50 |
| | | | 348/362 |
| 2015/0271355 A1 | 9/2015 | Matsumoto | |
| 2015/0334296 A1* | 11/2015 | Gunji | H04N 23/635 |
| | | | 348/241 |
| 2016/0373713 A1* | 12/2016 | Matsuyama | H04N 9/8047 |
| 2018/0160038 A1* | 6/2018 | Thumpudi | H04N 1/648 |
| 2019/0052908 A1* | 2/2019 | Mertens | H04N 19/102 |
| 2019/0068866 A1* | 2/2019 | Sasaki | H04N 23/72 |

FOREIGN PATENT DOCUMENTS

| | | |
|---|---|---|
| CN | 101365071 A | 2/2009 |
| CN | 102970549 A | 3/2013 |
| CN | 105794193 A | 7/2016 |
| CN | 108540781 A | 9/2018 |
| JP | 2006229474 A | 8/2006 |
| JP | 2014150370 A | 8/2014 |
| JP | 2015179909 A | 10/2015 |
| JP | 2018007194 A | 1/2018 |

OTHER PUBLICATIONS

Written Opinion issued in Intl. Appln. No. PCT/JP2020/006201 dated May 12, 2020.

Office Action issued in Chinese Appln. No. 202080016877.3 dated Dec. 20, 2022. English translation provided.

* cited by examiner

F I G. 1A
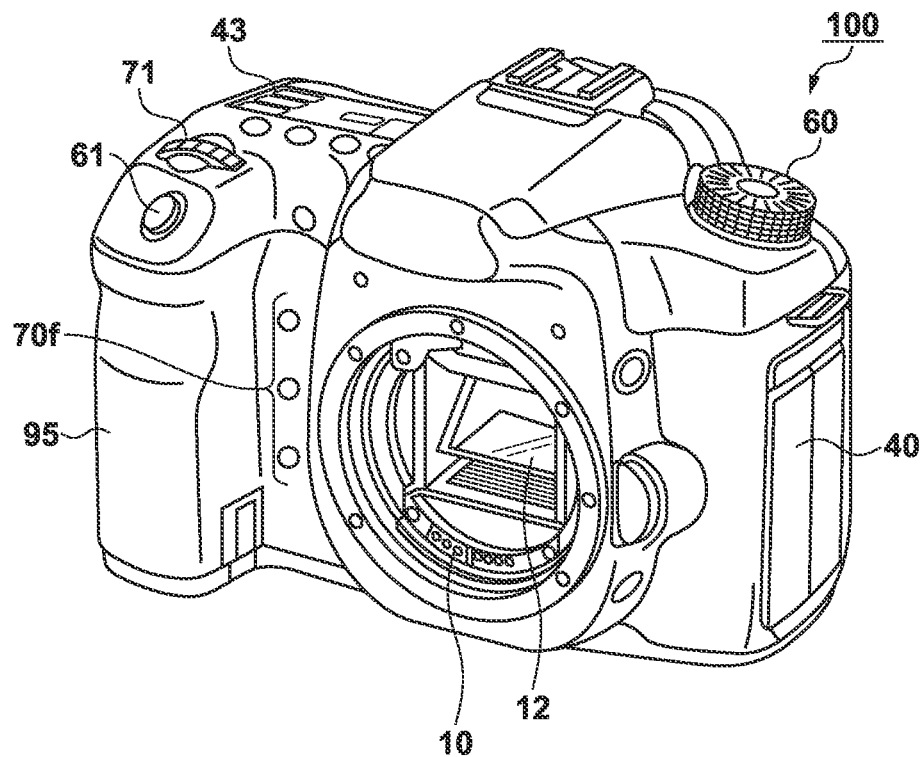
F I G. 1B
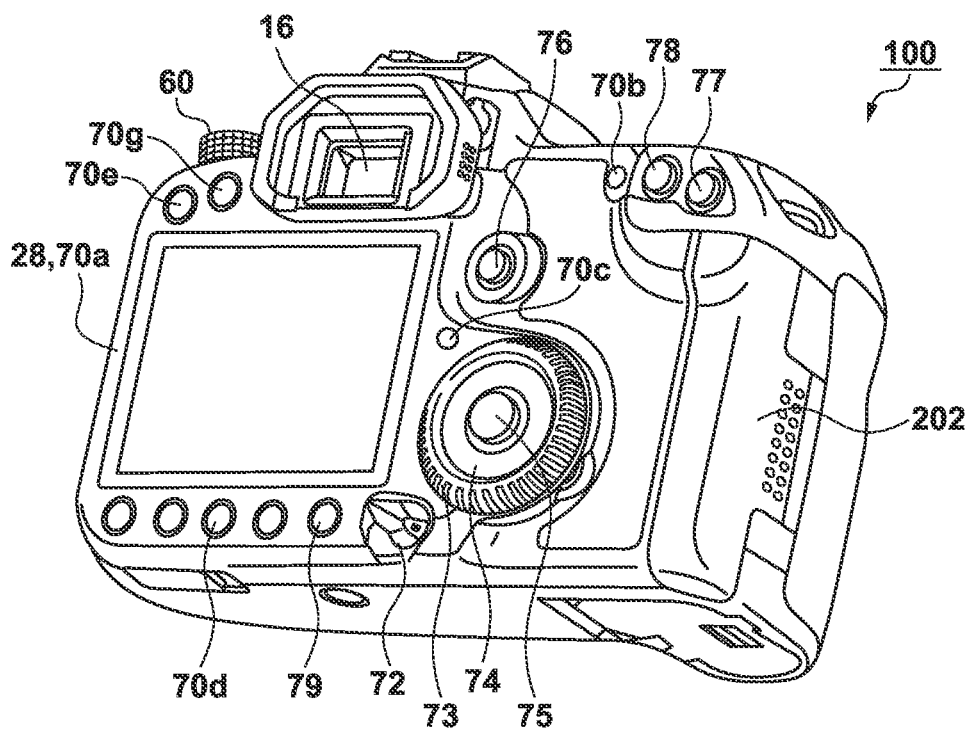

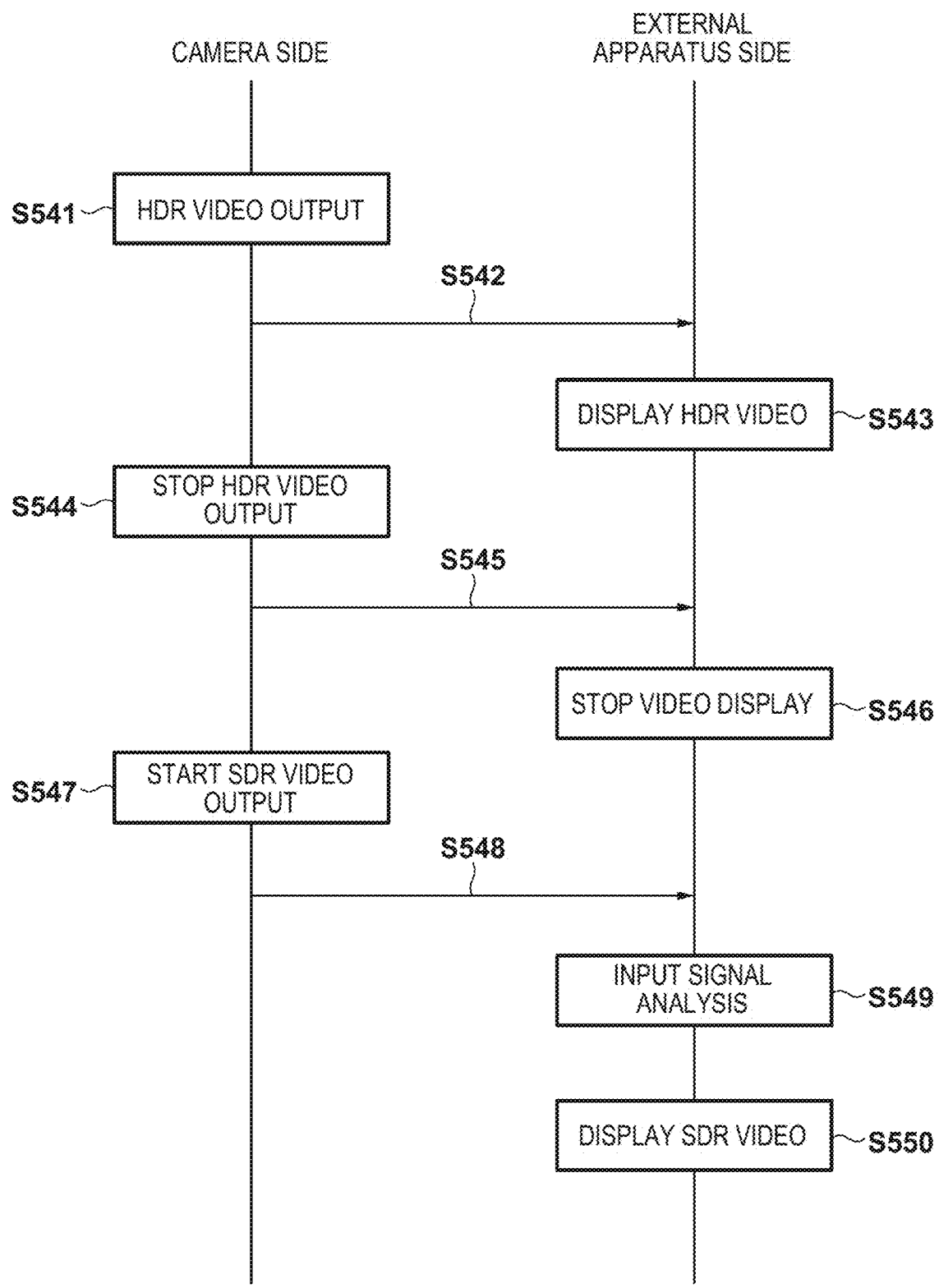

FIG. 8D

| | |
|---|---|
| 809 → | |
| SDR THM IMAGE FOR DISPLAY (JPEG) | ← 821 |
| HDR THM IMAGE FOR DISPLAY (HEVC) | ← 826 |
| SDR MPF IMAGE FOR DISPLAY (JPEG) | ← 822 |
| SDR MPF IMAGE FOR DISPLAY (JPEG) | ← 827 |
| MAIN SDR IMAGE FOR DISPLAY (JPEG) | ← 823 |
| MAIN HDR IMAGE FOR DISPLAY (HEVC) | ← 828 |
| RAW IMAGE | ← 824 |
| RAW DEVELOPMENT PARAMETERS | ← 825 |

FIG. 8E

| | |
|---|---|
| 809 → | |
| SDR THM IMAGE FOR DISPLAY (JPEG) | ← 821 |
| HDR MPF IMAGE FOR DISPLAY (HEVC) | ← 827 |
| MAIN HDR IMAGE FOR DISPLAY (HEVC) | ← 828 |
| RAW IMAGE | ← 824 |
| RAW DEVELOPMENT PARAMETERS | ← 825 |

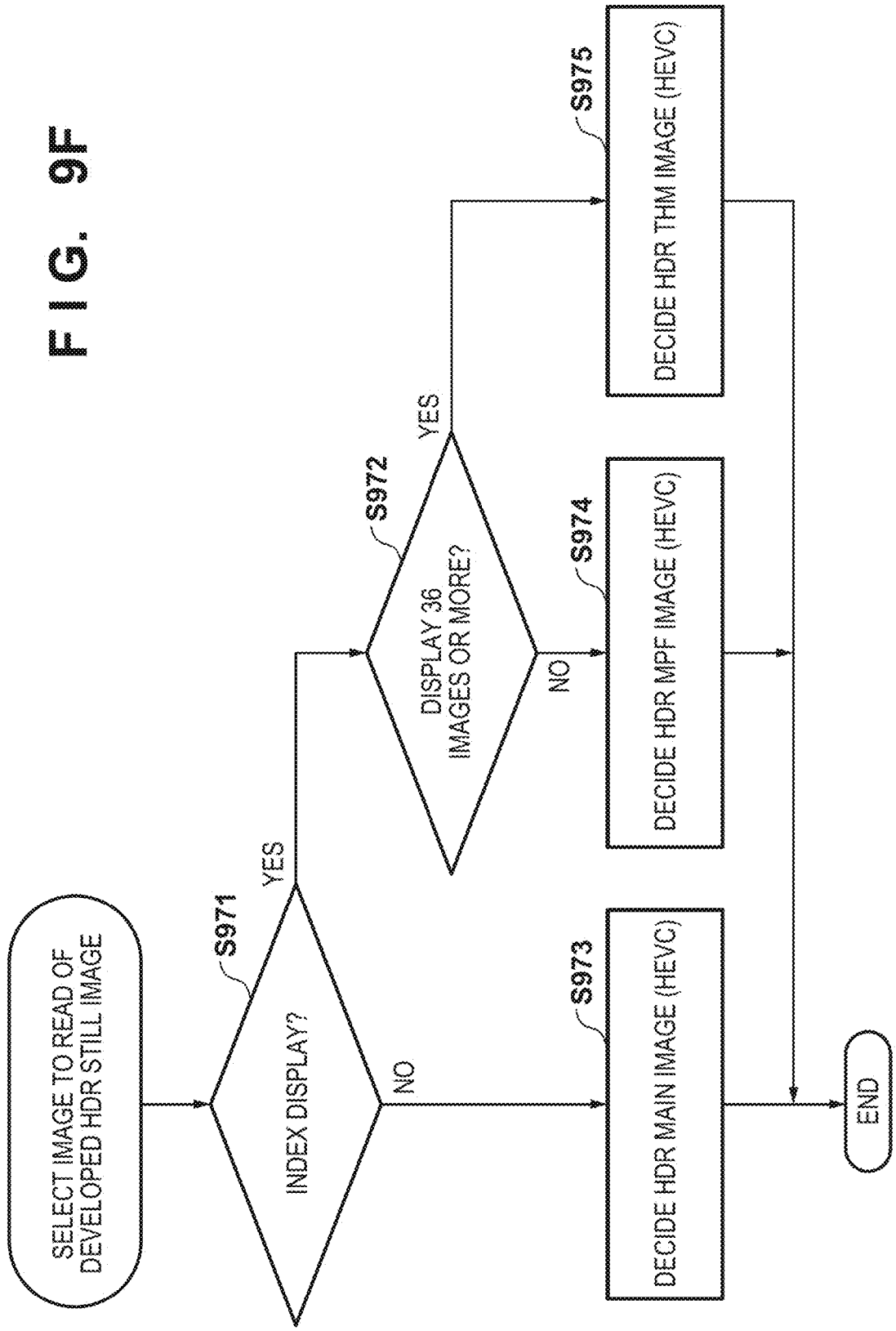

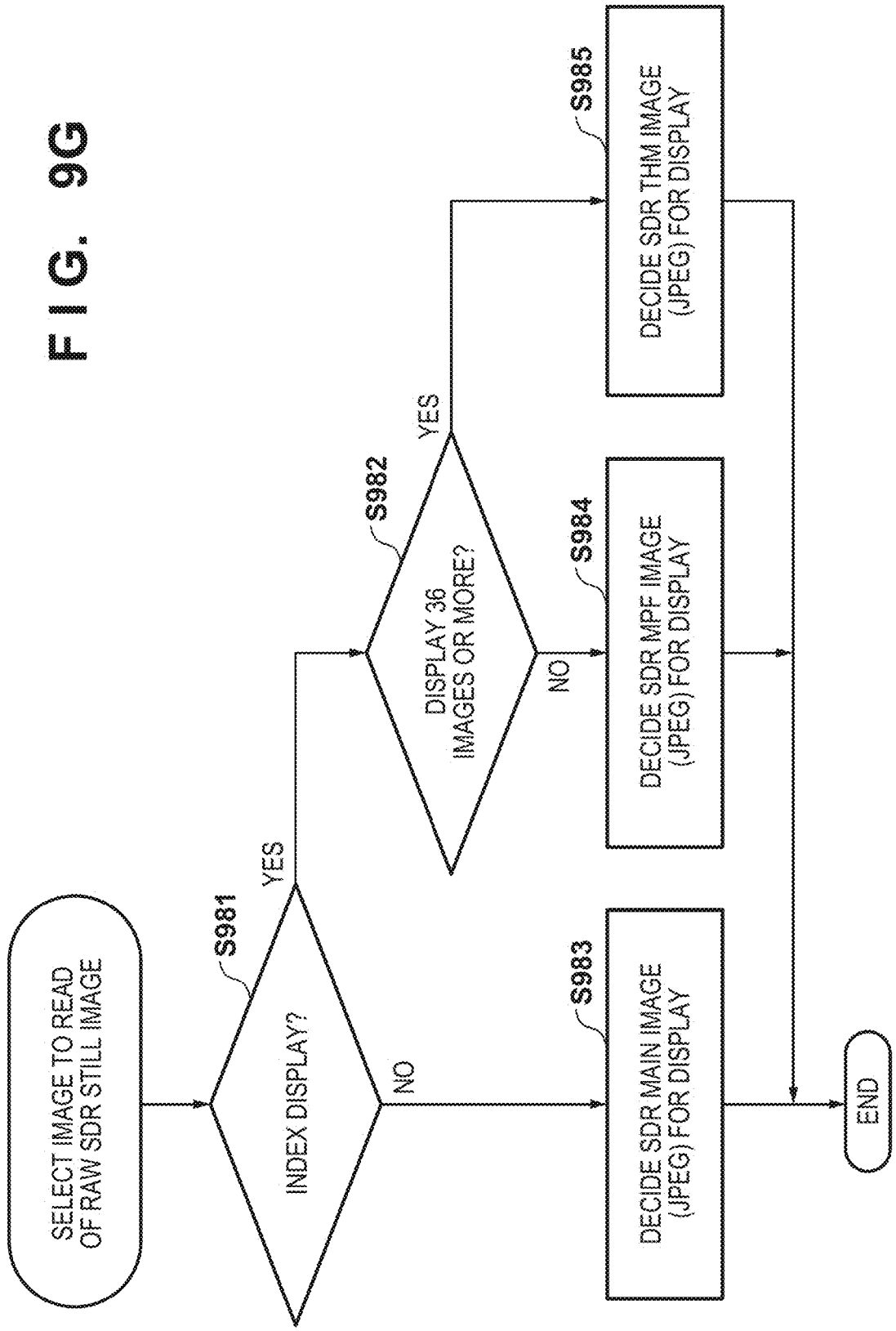

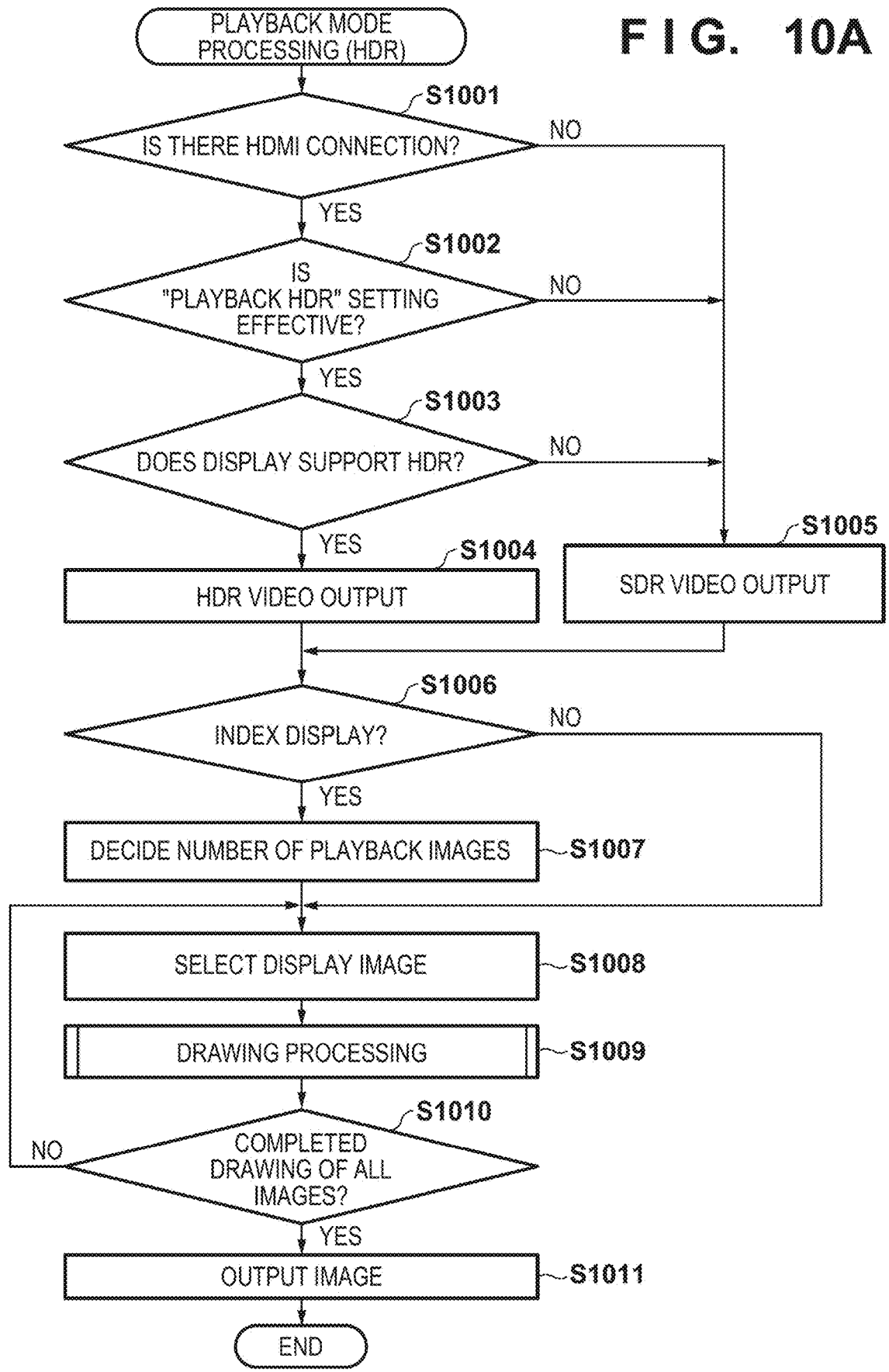

F I G. 12
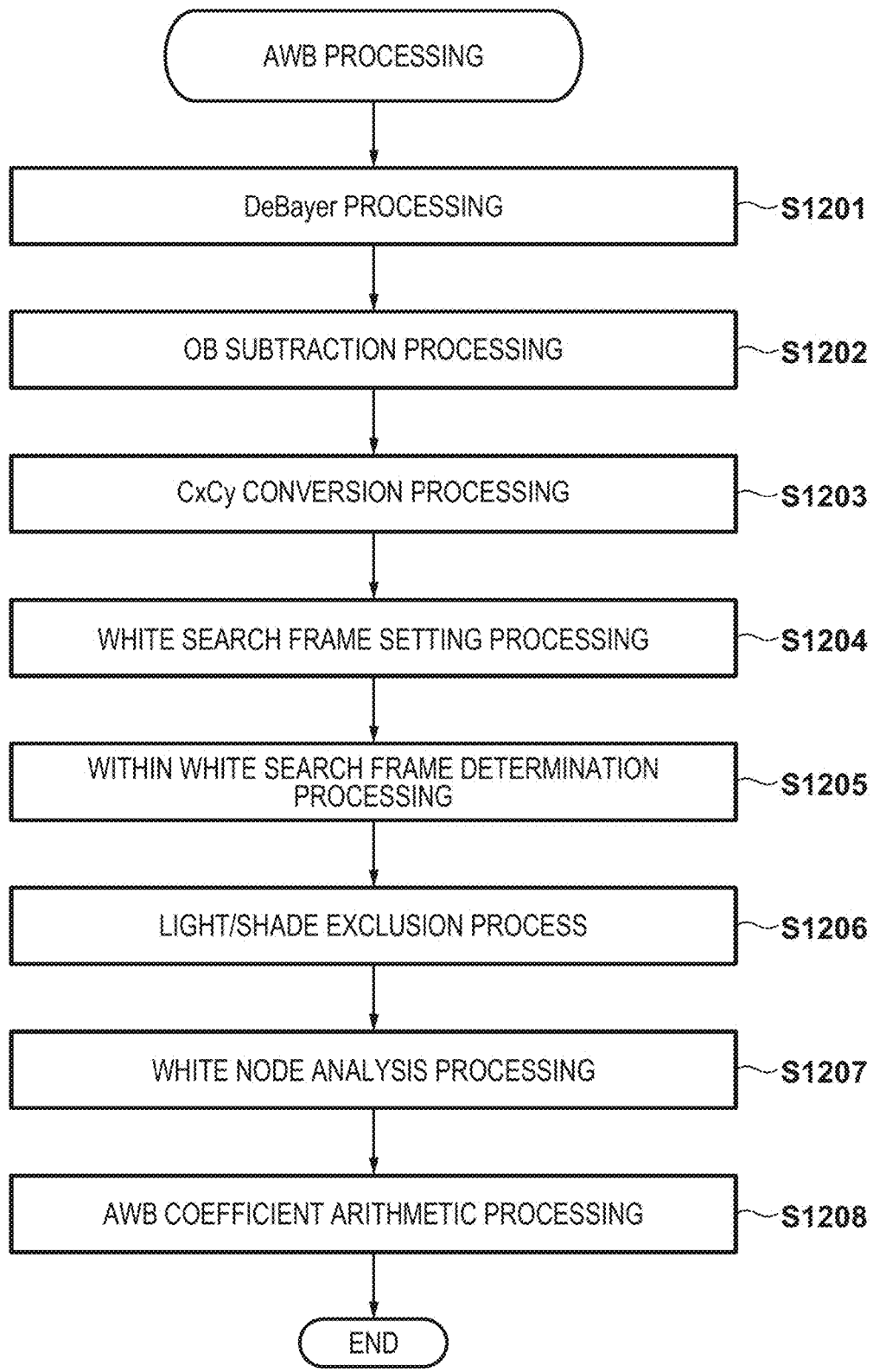

F I G. 17A
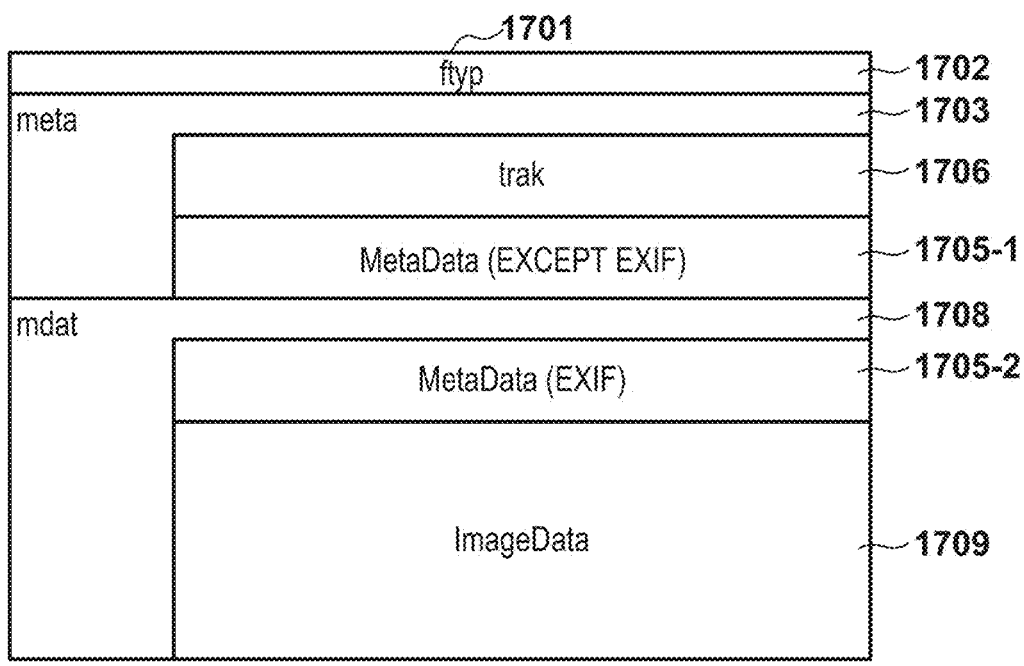

IMAGE CAPTURING APPARATUS, METHOD OF CONTROLLING THE SAME, AND NON-TRANSITORY COMPUTER-READABLE STORAGE MEDIUM

CROSS-REFERENCE TO RELATED APPLICATIONS

This application is a Continuation of International Patent Application No. PCT/JP2020/006201, filed Feb. 18, 2020, which claims the benefit of Japanese Patent Application Nos. 2019-036396, filed Feb. 28, 2019 and 2019-085969, filed Apr. 26, 2019, both of which are hereby incorporated by reference herein in their entirety.

BACKGROUND OF THE INVENTION

Field of the Invention

The present invention relates to an image capturing apparatus, a method of controlling the same, and a non-transitory computer-readable storage medium.

Background Art

A recent image capturing apparatus such as a digital camera is capable of capturing an HDR image and recording the HDR image on a recording medium. HDR is High Dynamic Range, and is a technique that generates an image having a dynamic range wider than SDR (Standard Dynamic Range). Also, a RAW image means an undeveloped raw image.

When recording the content of HDR video, the content is recorded together with identification information indicating whether the content is HDR video (for example, PTL1).

A normal RAW image file can contain JPEG-compressed data of a developed image as a display image. However, this display image cannot be saved with the HDR image quality because a JPEG image does not correspond to the HDR image quality. Even when a RAW image captured by HDR is displayed on an HDR display, therefore, this RAW image must be developed once in order to check the image with the HDR image quality.

CITATION LIST

Patent Literature

PTL 1 Japanese Patent Laid-Open No. 2018-7194

SUMMARY OF INVENTION

The present invention has been made in consideration of the above problem, and provides a technique by which even when recording RAW image data in an image capturing apparatus that supports to a plurality of dynamic ranges such as SDR and HDR, developed image data corresponding to a selected dynamic range is recorded in a RAW image file, so an image having the selected dynamic range can be checked when playing back the RAW image file as well.

To solve the above problem, an image capturing apparatus of the present invention has, for example, the following arrangement. That is, an image capturing apparatus comprising: an image capturing unit; a selecting unit configured to select a dynamic range; a developing unit configured to perform a developing process on RAW image data obtained by the image capturing unit; and a control unit configured to perform control, when recording RAW image data obtained by the image capturing unit as a RAW image file, such that if a first dynamic range is selected by the selecting unit, image data obtained by performing a developing process for the first dynamic range on the RAW image data by the developing unit is recorded as the RAW image file together with the RAW image data, and if a second dynamic range is selected by the selecting unit, image data obtained by performing a developing process for the second dynamic range on the RAW image data by the developing unit is recorded as the RAW image file together with the RAW image data.

Further features of the present invention will become apparent from the following description of exemplary embodiments with reference to the attached drawings.

BRIEF DESCRIPTION OF DRAWINGS

FIG. 1A is an external view of an image capturing/display apparatus according to an embodiment;

FIG. 1B is an external view of the image capturing/display apparatus according to the embodiment;

FIG. 4A-2 is a flowchart of the LV shooting mode processing according to the embodiment;

FIG. 4A-3 is a flowchart of the LV shooting mode processing according to the embodiment;

FIG. 4A-4 is a flowchart of the LV shooting mode processing according to the embodiment;

FIG. 4B-1 is a flowchart of quick review;

FIG. 4B-2 is a flowchart of the quick review;

FIG. 5C is a sequence chart of the HDMI connecting process according to the embodiment;

FIG. 6A-1 is a flowchart of HDR shooting menu processing according to the embodiment;

FIG. 6A-2 is a flowchart of the HDR shooting menu processing according to the embodiment;

FIG. 6B-1 is a flowchart of the HDR shooting menu processing according to the embodiment;

FIG. 6B-2 is a flowchart of the HDR shooting menu processing according to the embodiment;

FIG. 8D is a view showing an example of the ImageData region in the RAW file;

FIG. 8E is a view showing an example of the ImageData region in the RAW file;

FIG. 9E-1 is a flowchart of the playback mode processing according to the embodiment;

FIG. 9E-2 is a flowchart of the playback mode processing according to the embodiment;

FIG. 9F is a flowchart of the playback mode processing according to the embodiment;

FIG. 9G is a flowchart of the playback mode processing according to the embodiment;

FIG. 10A is a flowchart of an HDMI playback process according to the embodiment;

FIG. 12 is a flowchart of a developing process according to the embodiment;

FIG. 17A is a view showing the configuration of an HEIF file;

DESCRIPTION OF THE EMBODIMENTS

Figure 2:
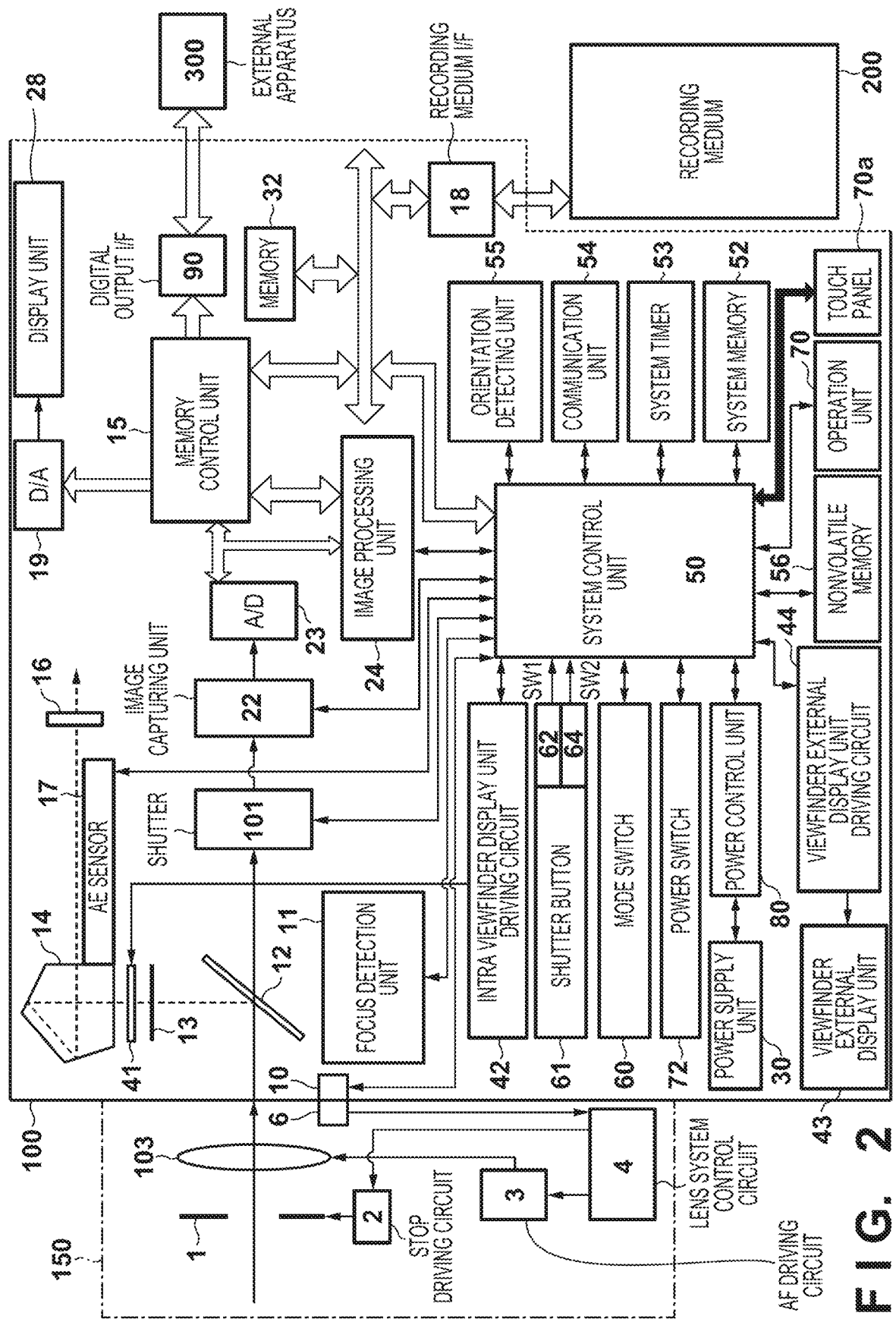
FIG. 2 is a block diagram showing the configuration of the image capturing/display apparatus according to the embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

FIGS. 1A and 1B show the outer appearance of a digital camera 100 as an example of an apparatus according to the present invention. FIG. 1A is a front perspective view of the digital camera 100. FIG. 1B is a back perspective view of the digital camera 100. Referring to FIGS. 1A and 1B, a display unit 28 is a display unit provided on the back face of the camera, and displays images and various kinds of information. A viewfinder external display unit 43 is a display unit provided on the top face of the camera, and displays various set values for the camera, such as shutter speeds and f-numbers. A shutter button 61 is an operation unit with which the user issues a shooting instruction. A mode switch 60 is an operation unit for switching between various types of modes. A terminal cover 40 is a cover for protecting connectors (not shown) such as connection cables for connecting external apparatuses to the digital camera 100. A main electronic dial 71 is a rotating operation member included in an operation unit 70. For example, the user can change a set value such as a shutter speed or f-number by rotating the main electronic dial 71. A power switch 72 is an operation member for switching on and off the power supply of the digital camera 100. A sub-electronic dial 73 is a rotating operation member included in the operation unit 70 and used to perform operations such as moving a selection frame and image feeding. A cross-key 74 (four-direction key) is included in the operation unit 70. The user can press down the upper, lower, right, and left portions of the cross-key 74. Pressing the cross-key 74 can perform an operation corresponding to the pressed portion of the cross-key 74. A SET button 75 is a press button included in the operation unit 70, and is mainly used to decide a selection item. An LV button 76 is an operation button included in the operation unit 70 and used to switch on and off a live view (to be referred to as LV hereinafter) in a still image capturing mode. In a moving image capturing mode, this button is used to issue an instruction to start or stop moving image capturing (recording). An enlargement button 77 is an operation button included in the operation unit 70 and used to turn on and off an enlargement mode in live view display in the shooting mode and change a magnification factor in a magnification mode. In a playback mode, this button functions as a magnification button for magnifying a playback image and increasing the magnification factor. A reduction button 78 is an operation button included in the operation unit 70 and used to reduce the magnification factor of a magnified playback image and reduce a displayed image. A playback button 79 is an operation button included in the operation unit 70 and used to switch between the shooting mode and the playback mode. Pressing down the playback button 79 during the shooting mode will shift to the playback mode to cause the display unit 28 or an external apparatus 300 to display the newest one of the images recorded on a recording medium 200. A quick return mirror 12 is moved up and down by an actuator (not shown) in accordance with an instruction from a system control unit 50. A communication terminal 10 allows the digital camera 100 to communicate with the lens side (detachable). An eyepiece viewfinder 16 is a look-in viewfinder for checking the focus and composition of an optical image of an object obtained through a lens unit 150 by observing a focusing screen 13. A lid 202 is the lid of a slot accommodating the recording medium 200. A grip portion 95 is a holding unit having a shape that allows the user to easily grip with his/her right hand when holding the digital camera 100.

FIG. 2 is a block diagram showing an example of the arrangement of the digital camera 100 according to this embodiment.

Referring to FIG. 2, the lens unit 150 incorporates interchangeable lenses.

Although a lens 103 is usually constituted by a plurality of lenses, FIG. 2 shows only one lens as the lens 103 for the sake of simplicity. A communication terminal 6 is a communication terminal via which the lens unit 150 communicates with the digital camera 100 side. The communication terminal 10 is a communication terminal via which the digital camera 100 communicates with the lens unit 150 side. The lens unit 150 communicates with the system control unit 50 via the communication terminals 6 and 10, and causes an internal lens system control circuit 4 to control a stop 1 via a stop driving circuit 2, and adjust the focus by displacing the position of the lens 103 via an AF driving circuit 3.

An AE sensor 17 measures the brightness of an object through the lens unit 150. A focus detection unit 11 outputs defocus amount information to the system control unit 50. The system control unit 50 controls the lens unit 150 to perform phase difference AF based on the input defocus amount information.

A quick return mirror 12 (to be referred to as the mirror 12 hereinafter) is moved up and down by an actuator (not shown) at the time of exposure, live view shooting, and moving image capturing, in accordance with instructions from the system control unit 50. The mirror 12 is a mirror for switching an incident light beam from the lens 103 between the eyepiece viewfinder 16 side and the image capturing unit 22 side. The mirror 12 is usually placed to reflect a light beam to guide it to the eyepiece viewfinder 16. At the time of shooting or live view display, the mirror 12 flips up and retreats from the light beam (mirror up) to guide the light beam to the image capturing unit 22. In addition, the central portion of the mirror 12 is a semitransparent half mirror to transmit part of light. The mirror 12 transmits part of a light beam to cause it to enter the focus detection unit 11 for focus detection.

The user (a photographer) can check the focus and the composition of an optical image of an object obtained through the lens unit 150, by observing the focusing screen 13 via a pentaprism 14 and the eyepiece viewfinder 16.

A shutter 101 is a focal-plane shutter which can freely control the exposure time of an image capturing unit 22 under the control of the system control unit 50.

The image capturing unit 22 is an image sensor formed from a CCD or CMOS device which converts an optical image into an electrical signal. Filters of color components R, G, and B are two-dimensionally, periodically arranged on the image capturing surface of the image capturing unit 22. In 2×2 filters adjacent to each other, G-component filters are arranged as two filters having the diagonal relationship, and R- and B-component filters are arranged as the two remaining filters. These 2×2 filters are arrayed on the image capturing surface of the image capturing unit 22. This array is generally called a Bayer array. Therefore, an image represented by a signal (analog signal) output from the image capturing unit 22 is also a pixel signal having the Bayer array. An A/D converter 23 converts a 1-pixel analog signal output from the image capturing unit 22 into, for example, a 10-bit digital signal. Note that image data in this stage is Bayer-array image data having one component for one pixel and 10 bits per one component as described above, and is undeveloped image data. Accordingly, image data in this stage is called RAW image data. Note that Bayer-array image data after defective pixels are compensated for can also be called RAW image data. Note also that the A/D converter 23 converts an analog signal into 10-bit digital data in this embodiment, but the number of bits is not particularly limited as long as the number of bits exceeds 8 bits. The larger the number of bits, the higher the tone of expression.

An image processing unit 24 performs a resizing process such as predetermined pixel interpolation or reduction and a color conversion process with respect to data from the A/D converter 23 or data from a memory control unit 15. In addition, the image processing unit 24 performs predetermined arithmetic processing using captured image data. The system control unit 50 then performs exposure control and focus control based on the obtained arithmetic result. With this operation, the system control unit 50 performs TTL (Through The Lens) AF (AutoFocus) processing, TTL AE (Auto Exposure) processing, and TTL EF (Electronic Flash pre-emission) processing. The image processing unit 24 also performs predetermined arithmetic processing by using captured image data, and performs TTL AWB (Auto White Balance) processing based on the obtained arithmetic result. Furthermore, the image processing unit 24 encodes/decodes image data under the control of the system control unit 50. This encoding includes JPEG and HEVC. JPEG is used to encode image data having 8 bits per one color component, and HEVC is used to encode image data having more than 8 bits per one color component.

Output data from the A/D converter 23 is written in a memory 32 via the image processing unit 24 and the memory control unit 15 or directly written in the memory 32 via the memory control unit 15. The memory 32 stores image data obtained by the image capturing unit 22 and converted into digital data by the A/D converter 23, and image data to be displayed on the display unit 28 or the external apparatus 300. The memory 32 has a storage capacity large enough to store a predetermined number of still images, and moving images and sounds with durations of predetermined times.

The memory 32 also functions as a memory (video memory) for image display. A D/A converter 19 converts data for image display stored in the memory 32 into an analog signal and supplies it to the display unit 28. In this manner, the image data for display written in the memory 32 is displayed by the display unit 28 via the D/A converter 19. The display unit 28 displays an image corresponding to the analog signal from the D/A converter 19 on a display device such as an LCD. The D/A converter 19 converts the digital signals having undergone A/D conversion once by the A/D converter 23 and stored in the memory 32 into analog signals, and sequentially transfers the signals to the display unit 28 to display images, thereby functioning as an electronic viewfinder and performing through image display (live view display).

An intra-viewfinder liquid crystal display unit 41 displays a frame (AF frame) indicating a focus point at which autofocus is currently performed, icons indicating the setting state of the camera, and the like via an intra-viewfinder display unit driving circuit 42. The viewfinder external display unit 43 displays various set values for the camera, such as a shutter speed and an f-number, via a viewfinder external display unit driving circuit 44.

A digital output I/F 90 supplies image data for display stored in the memory 32 directly to the external apparatus 300 in the form of a digital signal. For example, the digital output I/F 90 outputs moving image data in a stream form in accordance with a communication protocol complying with the HDMI© (High-Definition Multimedia Interface) standard. The external apparatus 300 thus displays the image data for display written in the memory 32.

A nonvolatile memory 56 is a memory capable of electrically erasing and recoding data. For example, an EEPROM or the like is used as the nonvolatile memory 56. The nonvolatile memory 56 stores constants, programs, and the like for the operation of the system control unit 50. The programs in this case are programs for executing various flowcharts to be described later in this embodiment.

The system control unit 50 is a controller having at least one processor, and controls the overall digital camera 100. The system control unit 50 implements each processing in this embodiment (to be described later) by executing a program recorded on the nonvolatile memory 56 described above. A system memory 52 is a RAM. Constants, variables, programs read out from the nonvolatile memory 56, and the like for the operation of the system control unit 50 are deployed in the system memory 52. The system control unit 50 also performs display control by controlling the memory 32, the D/A converter 19, the digital output I/F 90, the display unit 28, and the like. Furthermore, the system control unit 50 converts captured image data into a form to be recorded on the recording medium 200, and performs recording control for recording image data on the recording medium 200 via a recording medium I/F 18.

A system timer 53 is a time measurement unit for measuring the times used for various types of control and the time of a built-in timepiece.

The mode switch 60, a first shutter switch 62, a second shutter switch 64, and the operation unit 70 are operation means for inputting various types of operation instructions to the system control unit 50.

The mode switch 60 switches the operation mode of the system control unit 50 to one of, for example, a still image recording mode, a moving image capturing mode, and a playback mode. The still image recording mode includes the following modes: an auto shooting mode, an auto scene discrimination mode, a manual mode, an aperture-priority mode (Av mode), and a shutter-speed-priority mode (Tv mode). The still image recording mode also includes various types of scene modes with shooting-scene-specific shooting settings, a program AE mode, and a custom mode. The mode switch 60 directly switches the operation mode to one of these modes. Alternatively, after temporarily switching to a list screen for shooting modes with the mode switch 60, the user may select one of the plurality of displayed modes and switch to the selected mode by using another operation member. Likewise, the moving image capturing mode may include a plurality of modes.

The shutter button 61 to be operated by the user includes the first shutter switch 62 and a second shutter switch 64. The first shutter switch 62 is turned on to generate a first shutter switch signal SW1 when the user operates halfway the shutter button 61, that is, performs a so-called half-stroke operation (pre-shoot instruction). Upon receiving the first shutter switch signal SW1, the system control unit 50 starts operations such as AF (AutoFocus) processing, AE (Auto Exposure) processing, AWB (Auto White Balance) processing, and EF (Electronic Flash pre-emission) processing. The second shutter switch 64 is turned on to generate a second shutter switch signal SW2 when the user completely operates the shutter button 61, that is, performs a so-called full-stroke operation (shoot instruction). The system control unit 50 starts a series of shooting processes from reading out a signal from the image capturing unit 22 to writing image data in the recording medium 200, in response to the second shutter switch signal SW2.

The individual operation members of the operation unit 70 are assigned appropriate functions corresponding to scenes and function as various function buttons, when the user selectively operates various function icons displayed on the display unit 28 or the external apparatus 300. Examples of the function buttons are an end button, a return button, an image feeding button, a jump button, a narrow-down button, and an attribute change button. For example, when a menu button 70e is pressed, the display unit 28 or the external apparatus 300 displays a menu screen on which various kinds of settings can be performed. The user can intuitively perform various kinds of settings by using this menu screen displayed on the display unit 28 or the external apparatus 300, the four-direction buttons for up, down, left, and right, and the SET button.

Note that the display unit 28 according to this embodiment has an SDR-quality image display function, that is, can display each of color components R, G, and B by 8 bits (256 tones). Note also that when the external apparatus 300 is connected to the digital camera 100, the external apparatus 300 is set as an output target device for a captured image or a live image in place of the display unit 28. Furthermore, when the user explicitly selects one of the display unit 28 and the external apparatus 300 by operating the operation unit 70, the selected one is set as an output target device.

The operation unit 70 is an operation member that functions as an input unit for accepting operations from the user. The operation unit 70 includes at least the following operation units: the shutter button 61, the main electronic dial 71, the power switch 72, the sub-electronic dial 73, the cross-key 74, the set button 75, the LV button 76, the enlargement button 77, the reduction button 78, and the playback button 79. The cross-key 74 is a direction button by which the user can press down the upper, lower, right, and left portions of the cross-key 74. The cross-key 74 is explained as an integrated operation unit in this embodiment, but the upper, lower, right, and left buttons can also be independent buttons. In the following explanation, the upper or lower portion will be called an up/down key, and the left or right portion will be called a left/right key. The operation unit 70 also includes the following operation units.

An AF-ON button 70b is a push button switch included in the operation unit 70. The user can designate the execution of AF by pressing down the AF-ON button 70b. The press-down direction of the AF-ON button 70b is parallel to the direction (optical axis) of object light entering the image capturing unit 22 from the lens 103.

A quick setting button 70c (to be referred to as a Q button 70c hereinafter) is a push button switch included in the operation unit 70. When the Q button 70c is pressed, a quick setting menu as a list of setting items settable in each operation mode is displayed. For example, when the Q button 70c is pressed in a shooting standby state in live view shooting, setting items such as an electronic front curtain shutter, the brightness of a monitor, the WB of the LV screen, two-point enlargement, and soundless shooting are displayed in a line in the form of a list as they are superposed on LV The user selects an arbitrary item in the quick setting menu by using the up/down key and presses the set button. The user can thus change setting corresponding to the selected setting item and proceed on to an operation mode corresponding to the item.

An active frame switch button 70d is a push button switch included in the operation unit 70. When the active frame switch button 70d is pressed in a two-point enlarging process (to be described later), two enlarged portions can be switched as an active enlargement position (frame). Also, the active frame switch button 70d is assigned different functions corresponding to operation modes. When the active frame switch button 70*d* is pressed in the playback mode, a protect attribute can be given to a displayed image.

A menu button 70*e* is a push button switch included in the operation unit 70, and a menu screen on which various kinds of settings can be performed is displayed on the display unit 28 or the external apparatus 300.

Function buttons 70*f* are three push button switches included in the operation unit 70, and assigned different functions. Each of the function buttons 70*f* is arranged in a position where it can be operated by a finger (the middle finger, the ring finger, or the little finger) of the right hand holding the grip portion 95. The pressing direction is parallel to the direction (optical axis) of object light entering the image capturing unit 22 from the lens 103.

An info button 70*g* is a push button switch included in the operation unit 70, and used to switch various kinds of information display operations.

A power control unit 80 includes, for example, a battery detection circuit, a DC-DC converter, and a switching circuit for switching blocks to which electric power is to be supplied, and detects the presence/absence of a battery, the type of the battery, and the remaining amount of the battery. Based on the detection results and instructions from the system control unit 50, the power control unit 80 controls the DC-DC converter, and supplies necessary voltages to units including the recording medium 200 for necessary periods of time.

A power supply unit 30 is constituted by a primary battery such as an alkaline battery or lithium battery, a secondary battery such as an NiCd battery, NiMH battery, or Li battery, an AC adapter, and the like. A recording medium I/F 18 is an interface with the recording medium 200 such as a memory card or hard disk. The recording medium 200 is a recording medium such as a memory card for recording captured images, and is formed from a semiconductor memory, magnetic disk, or the like.

A communication unit 54 is connected to an external apparatus wirelessly or via a wired cable, and transmits and receives video signals and audio signals. The communication unit 54 can also be connected to a wireless LAN (Local Area Network) and the Internet. The communication unit 54 can transmit the images (including through images) captured by the image capturing unit 22 and images recorded on the recording medium 200, and can receive image data and other various kinds of information from external apparatuses.

An orientation detecting unit 55 detects the orientation of the digital camera 100 in the direction of gravitational force. It is possible to discriminate, based on the orientation detected by the orientation detecting unit 55, whether the image captured by the image capturing unit 22 is the one captured when the digital camera 100 is held in the horizontal direction or the vertical direction. The system control unit 50 can add direction information corresponding to the orientation detected by the orientation detecting unit 55 to the image file of the image captured by the image capturing unit 22 or record the image upon rotating it. As the orientation detecting unit 55, an acceleration sensor, a gyro sensor, or the like can be used.

Note that the operation unit 70 also includes a touch panel 70*a* which can detect touches on the display unit 28. The touch panel 70*a* and the display unit 28 can be integrated. For example, the touch panel 70*a* is configured to prevent the transmittance of light from hindering display on the display unit 28, and is mounted on the upper layer of the display surface of the display unit 28. The input coordinates on the touch panel 70*a* are associated with the display coordinates on the display unit 28. This can form a GUI (Graphical User Interface) which allows the user to directly operate the screen displayed on the display unit 28. The system control unit 50 can detect the following operations on the touch panel 70*a* or its states:

a new touch on the touch panel 70*a* with the finger or pen which has not touched the panel, that is, the start of a touch (to be referred to as "Touch-Down" hereinafter);

a state in which the user is touching the touch panel 70*a* with his/her finger or pen (to be referred to as "Touch-On" hereinafter);

the movement of the finger or pen while the user is touching the touch panel 70*a* with his/her finger or pen (to be referred to as "Touch-Move" hereinafter);

releasing the finger or pen from the touch panel 70*a*, that is, the end of touch (to be referred to as "Touch-Up" hereinafter); and a state in which nothing is touching the touch panel 70*a* (to be referred to as "Touch-Off" hereafter).

Upon detecting "Touch-Down", the system control unit 50 simultaneously detects "Touch-On". After "Touch-Down", the system control unit 50 usually keeps detecting "Touch-On" unless detecting "Touch-Up". The system control unit 50 also detects "Touch-Move" when "Touch-On" is detected. Even when the system control unit 50 detects "Touch-On", the unit does not detect "Touch-Move" unless the touch position moves. Upon detecting "Touch-Up" of all the fingers or the pen which has touched the touch panel, the system control unit 50 detects "Touch-Off".

Information indicating such an operation or state and the coordinates of the position on the touch panel 70*a* where the finger or pen touches are notified to the system control unit 50 via an internal bus. The system control unit 50 determines, based on the notified information, a specific operation (touch operation) which has been performed on the touch panel 70*a*. The system control unit 50 can determine, based on a change in position coordinates, "Touch-Move" including the moving direction of the finger or pen moving on the touch panel, for each vertical component and each horizontal component on the touch panel 70*a*. If a predetermined distance of "Touch-Move" is detected, the system control unit 50 determines that a slide operation is performed. An operation of quickly moving the finger by a certain distance while touching the touch panel 70*a* and then releasing the finger is called "flick". In other words, "flick" is an operation of quickly tracing on the touch panel 70*a* as if flicking it with the finger. Upon detecting "Touch-Move" at a predetermined speed or more by a predetermined distance or more and continuously detecting "Touch-Up", the system control unit 50 can determine that the user has performed "flick" (can determine that "flick" is performed following the slide operation). Furthermore, a touch operation of touching a plurality of portions (for example, two points) at the same time and bringing the touch positions close to each other is called "pinch-in", and a touch operation of moving the touch positions away from each other is called "pinch-out". "Pinch-out" and "pinch-in" are generally called a pinch operation (or simply pinch). As the touch panel 70*a*, any one of the following types of touch panels may be used: a resistance film type, a capacitive type, a surface acoustic wave type, an infrared type, an electromagnetic induction type, an image recognition type, a photosensor type, and the like. Some types are designed to detect a touch by detecting a contact on the touch panel. Other types are designed to detect a touch by detecting the proximity of the finger or pen to the touch panel. Either of these types can be used.

Note that the present invention is not limited to an image capturing apparatus main body, and is also applicable to a control apparatus that communicates with an image capturing apparatus (including a network camera) via wired or wireless communication, and remotely controls the image capturing apparatus. Examples of the apparatus that remotely controls the image capturing apparatus are a smartphone, a tablet PC, and a desktop PC. The control apparatus can remotely control the image capturing apparatus by notifying the image capturing apparatus of a command for causing the image capturing apparatus to perform various operations or settings, based on operations or processing performed on the control apparatus side. It is also possible to receive a live view image captured by the image capturing apparatus via wired or wireless communication, and display the received image on the control apparatus side.

Note that the embodiment has been explained by taking the case in which the present invention is applied to a digital camera as an example, but the present invention is not limited to this. For example, the present invention is applicable to any apparatus including a display unit, such as a PDA, a portable telephone terminal, a portable image viewer, a printer apparatus including a display, a digital photo frame, a music player, a game machine, or an electronic book reader.

Figure 3:
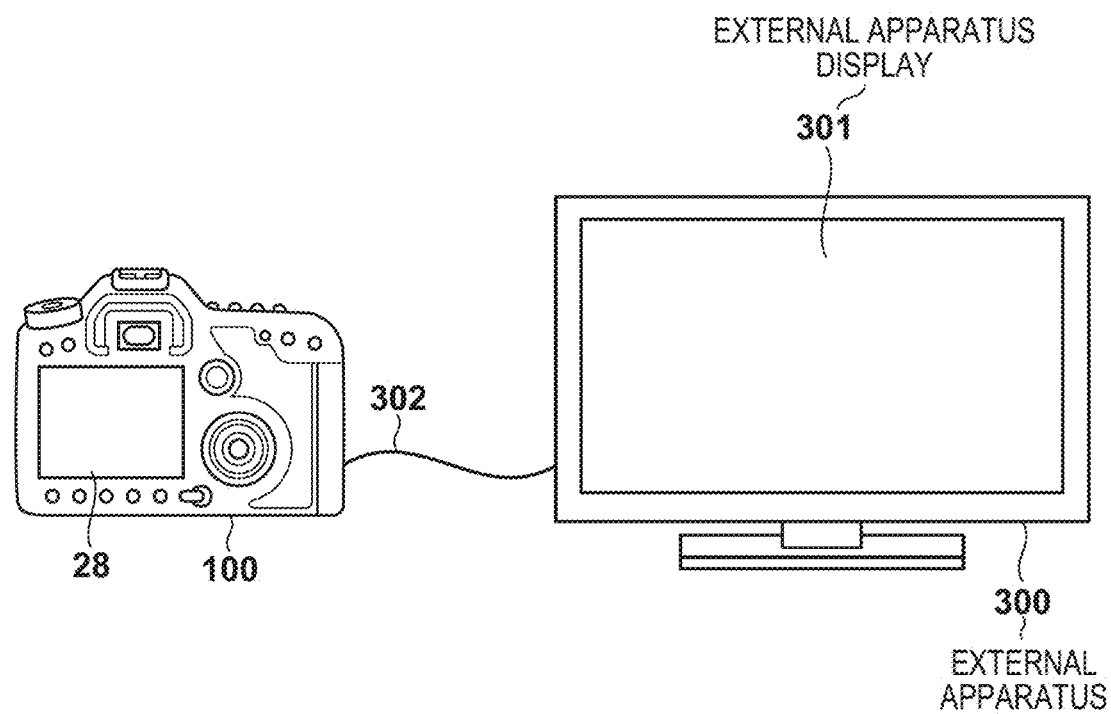
FIG. 3 is a view showing a connection configuration to an external apparatus.

FIG. 3 is a view showing a connection example of the digital camera 100 and the external apparatus 300. When the digital camera 100 and the external apparatus 300 are connected by a connection cable 302, the display unit 28 of the digital camera 100 is turned off, and a display 301 of the external apparatus 300 displays the contents having been displayed on the digital camera 100.

Figures 1, 4A:
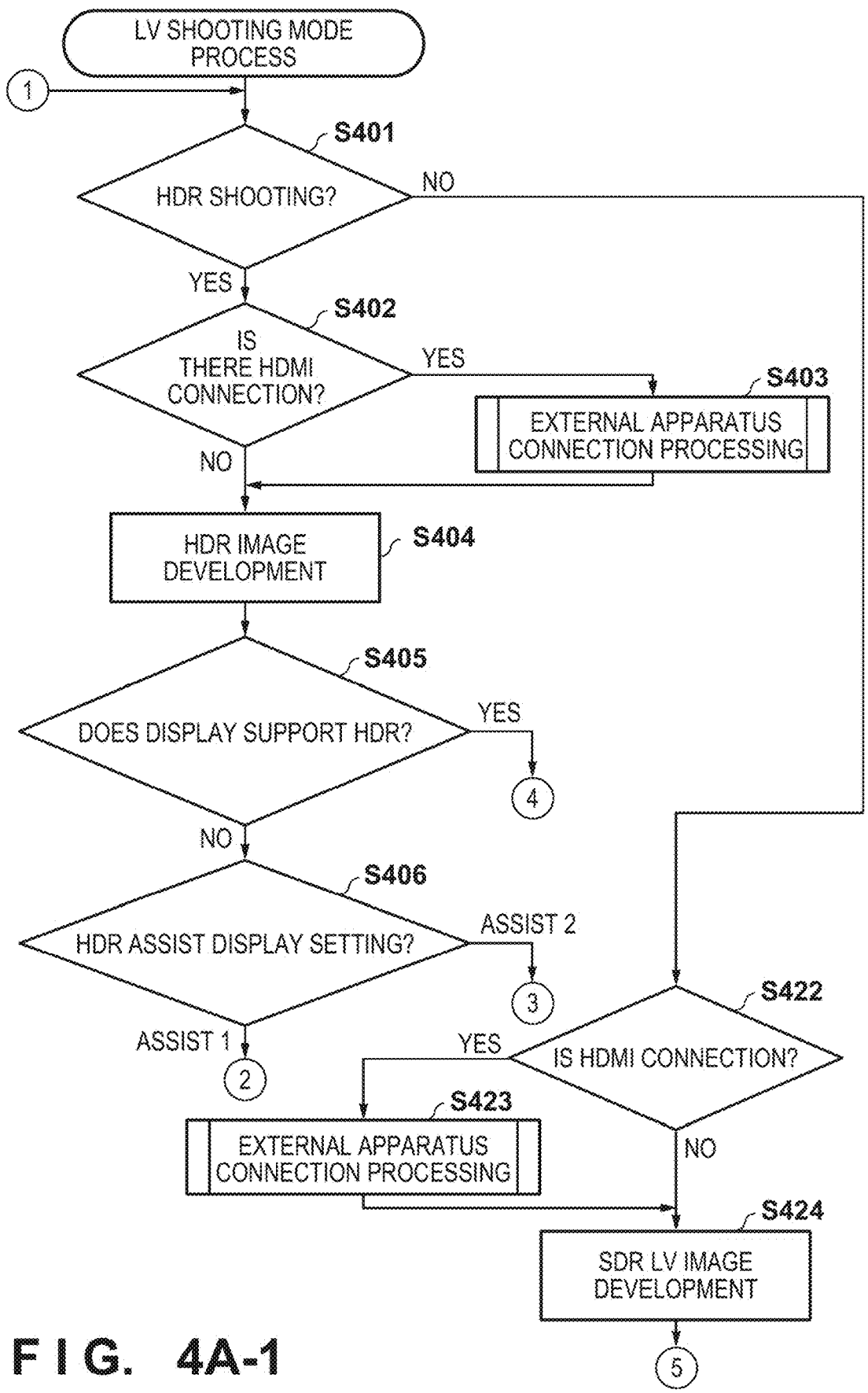
FIG. 4A-1 is a flowchart of LV shooting mode processing according to the embodiment.
Figures 2, 4A:
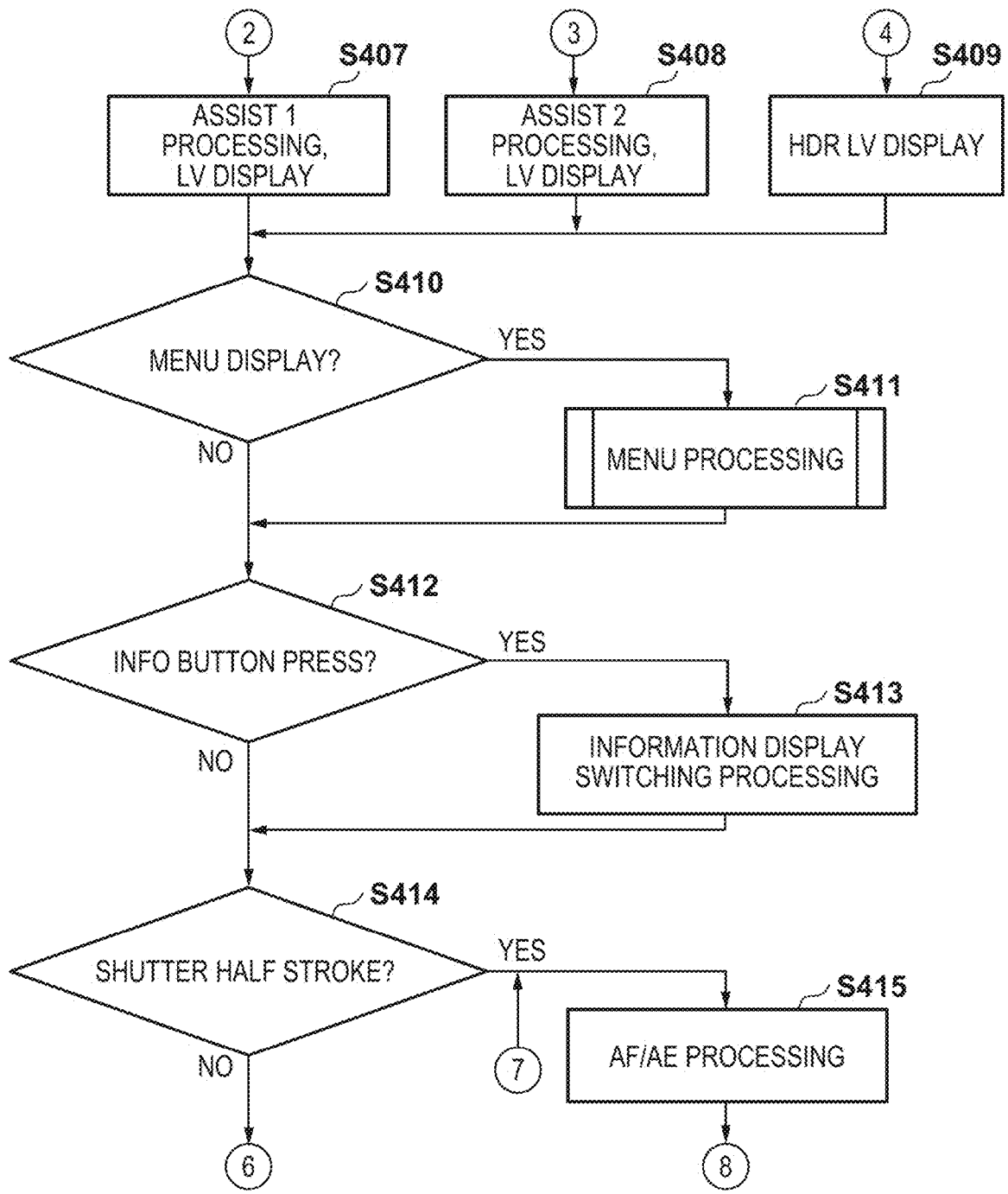
Figures 3, 4A:
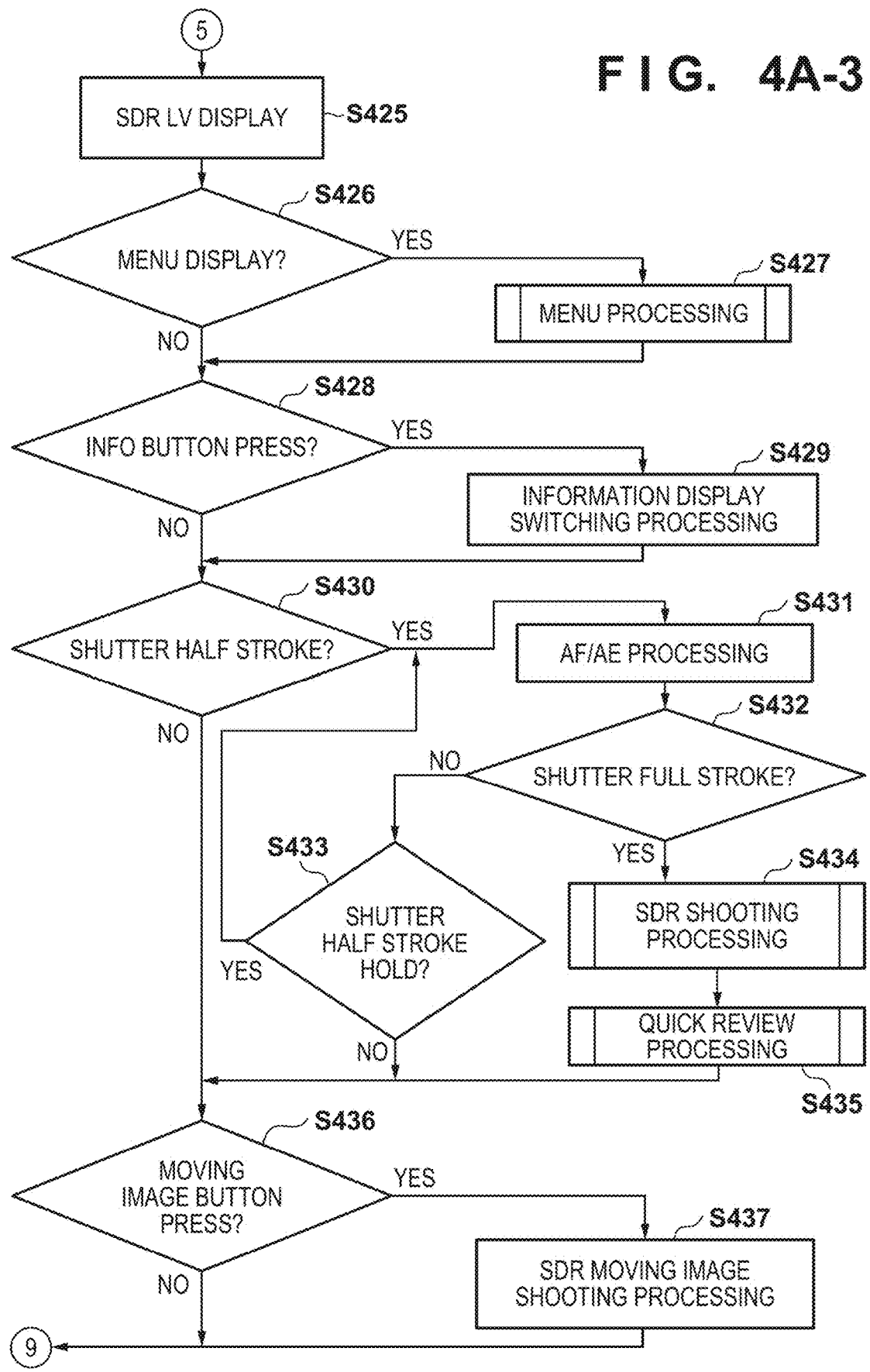
Figures 4, 4A:
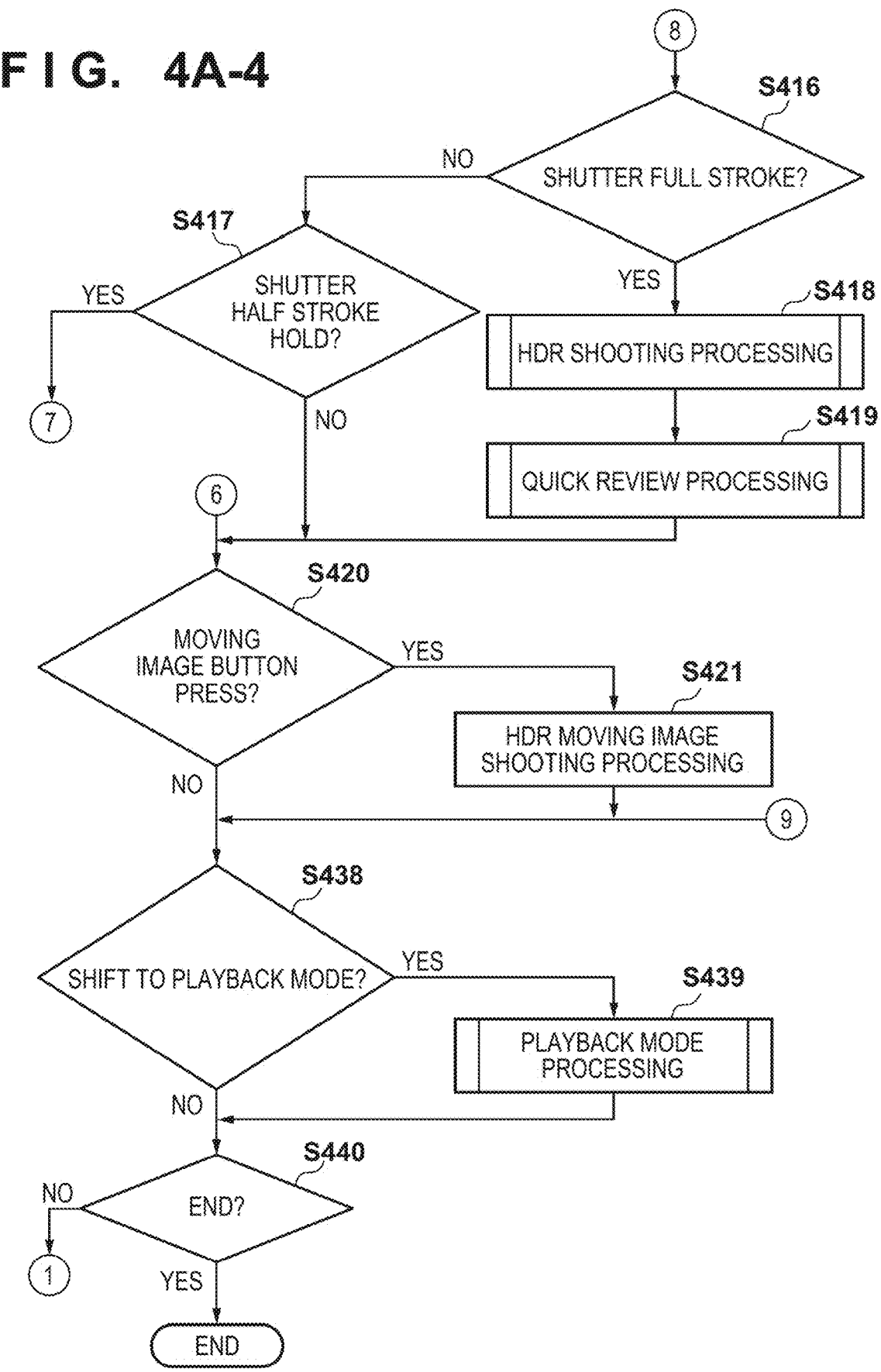

FIGS. 4A-1 to 4A-4 are flowcharts showing LV shooting mode processing of the digital camera 100. This processing is implemented by deploying a program recorded in the nonvolatile memory 56 in the system memory 52, and executing the program by the system control unit 50.

First, an HDR shooting mode and an SDR shooting mode according to this embodiment will be explained. In the digital camera 100 of this embodiment, the HDR shooting mode or the SDR shooting mode can be set by a menu operation or the like from the user. These modes allow the user to set whether to finally obtain HDR-quality image data or SDR-quality image data, and various control operations are performed in the following processing in accordance with the set mode. Performing shooting in the HDR shooting mode and the SDR shooting mode will be described as "HDR shooting" and "SDR shooting" in some cases hereinafter. However, it is also possible to set recording using only the RAW format as will be described later, so an HDR image is not necessarily recorded when shooting is performed in the HDR shooting mode.

In S401, the system control unit 50 determines whether the setting performed on the operation unit 70 by the user is the HDR shooting mode. The system control unit 50 advances the process to S402 if it is determined that the HDR shooting mode is set, and advances the process to S422 if it is determined that the SDR shooting mode is set.

In S402, the system control unit 50 determines whether the external apparatus 300 is connected to the digital camera 100. The system control unit 50 advances the process to S403 if it is determined that the external apparatus 300 is connected, and advances the process to S404 if it is determined that the external apparatus 300 is not connected.

In S403, the system control unit 50 performs a process of connecting the digital camera 100 and the external apparatus 300. Then, the system control unit 50 advances the process to S404. Details of this connecting process will be described later with reference to FIGS. 5A to 5C. Note that HDR connection is performed if the external apparatus supports an HDR connection and SDR connection is performed if not.

In S404, the system control unit 50 performs an HDR-quality developing process by using the image processing unit 24, on live RAW image data captured by the imaging capturing unit 22 and converted into a digital signal by the A/D converter 23. An image obtained by the HDR-quality developing process will be called an HDR image.

Note that the HDR image data of this embodiment is data in which one pixel is formed by three components (for example, Luv or YCbCr), and each component is represented by 10 bits (1,024 tones) in this embodiment. A gamma curve for an HDR-image (for example, PQ or HLG of the recommendation BT.2100 of ITU-R) is applied to the HDR image data.

In S405, the system control unit 50 determines whether a device (the display unit 28 or the external apparatus 300) for displaying an LV image supports HDR. The system control unit 50 advances the process to S406 if it is determined that the device does not support HDR, and advances the process to S409 if it is determined that the device supports HDR.

In S406, the system control unit 50 checks HDR assist display setting. The system control unit 50 advances the process to S407 if it is determined that assist 1 is set, and advances the process to S408 if assist 2 is set. Assist 1 is the setting for checking a high-luminance region of an HDR image, and a process of allocating many tones (code values) to a high-luminance range of the HDR image is performed. Assist 2 is the setting for checking an intermediate-luminance range of an HDR image, and a process of allocating many tones to an intermediate-luminance region of an HDR image is performed.

In S407, the system control unit 50 performs an HDR→SDR conversion process in accordance with the setting of assist 1, on the HDR image data obtained by the developing process in S404. In addition, the system control unit 50 displays SDR-quality LV image data obtained by performing a resizing process to a size suitable for an output target device (the display unit 28 or the external apparatus 300), and advances the process to S410.

In S408, the system control unit 50 performs an HDR→SDR conversion process in accordance with the setting of assist 2, on the HDR image data obtained by the developing process in S404. In addition, the system control unit 50 displays SDR-quality LV image data obtained by performing a resizing process to a size suitable for an output target device (the display unit 28 or the external apparatus 300), and advances the process to S410.

The SDR-quality image data (SDR image data) in S407 and S408 is image data having 8 bits per one component. A gamma curve for an SDR image (for example, a gamma curve of the sRGB standard) is applied to the SDR-quality image data. Note that the gamma curve of the sRGB standard is generally a curve in which a dark portion is straight and a bright portion is the power of 2.4, but it is also possible to simply use a curve that is the power of 2.2.

In S409, the system control unit 50 performs a process of resizing the HDR image data obtained by the developing process in S404 to a size suitable for an output target device (the display unit 28 or the external apparatus 300), displays the resized HDR-quality image (to be referred to as an HDL_LV image hereinafter) as a live image, and advances the process to S410.

In S410, the system control unit 50 determines whether the menu display button 70e is pressed. The system control unit 50 advances the process to S411 if it is determined that the button is pressed, and advances the process to S412 if it is determined that the button is not pressed. In S411, the system control unit 50 performs shooting menu processing and advances the process to S412. Details of this shooting menu processing will be described later with reference to FIGS. 6A-1 and 6A-2 and FIGS. 6B-1 and 6B-2.

In S412, the system control unit 50 determines whether the info display button 70*g* is pressed. The system control unit 50 advances the process to S413 if it is determined that the button is pressed, and advances the process to S414 if it is determined that the button is not pressed. In S413, the system control unit 50 switches the displays of shooting information, and advances the process to S414. Examples of the shooting information are a histogram and a highlight warning table.

In S414, the system control unit 50 determines whether the shutter button 61 is pressed halfway, based on whether the signal SW1 is received. The system control unit 50 advances the process to S420 if it is determined that the button is not pressed halfway, and advances the process to S415 if it is determined that the button is pressed halfway.

In S415, the system control unit 50 performs the AE/AF processing explained with reference to FIG. 2, and advances the process to S416. In S416, the system control unit 50 determines whether the shutter button 61 is completely pressed, based on whether the signal SW2 is received. The system control unit 50 advances the process to S417 if it is determined that the button is not completely pressed, and advances the process to S418 if it is determined that the button is completely pressed. In S417, the system control unit 50 determines whether the half-stroke state of the shutter button 61 is held. The system control unit 50 returns the process to S415 if the half-stroke state is held, and advances the process to S420 if it is determined that the half-stroke state is not held. In S418, the system control unit 50 performs an HDR shooting process, and records an image data file corresponding to a preset recording format on the recording medium. FIG. 8A shows the data structure of the file to be recorded. Then, the system control unit 50 advances the process to S419. Note that details of this HDR shooting process will be described later with reference to FIGS. 7A and 7B. In S419, the system control unit 50 performs quick review display processing, and advances the process to S420. Details of this quick review display processing will be described later with reference to FIGS. 4B-1 and 4B-2.

In S420, the system control unit 50 determines whether the LV button 76 is pressed. The system control unit 50 advances the process to S421 if it is determined that the button is pressed, and advances the process to S422 if it is determined that the button is not pressed.

In S421, the system control unit 50 compresses the image data (image data having three components for one pixel and 10 bits per one component) developed into the HDR image quality in S404 by HEVC (H.265) compression, records the compressed data as an HDR moving image file, and advances the process to S438.

In S422, the system control unit 50 determines whether the external apparatus 300 is connected to the digital camera 100. The system control unit 50 advances the process to S423 if it is determined that the external apparatus 300 is connected, and advances the process to S424 if it is determined that the external apparatus 300 is not connected. In S423, the system control unit 50 performs a process of connecting the digital camera 100 and the external apparatus 300, and advances the process to S424. Details of this connecting process will be described later with reference to FIGS. 5A to 5C. Note that the external apparatus is connected by SDR connection because the SDR shooting mode is set.

In S424, the system control unit 50 causes the image processing unit 24 to develop the image captured by the image capturing unit 22 and converted into a digital signal by the A/D converter 23 into SDR image quality (three components for one pixel, and 8 bits (256 tones) per one component), and advances the process to S425. Note that the SDR-quality developed image will be referred to as an SDR image hereinafter.

In S425, the system control unit 50 generates an SDR-quality live image (SDR_LV image) by performing a process of resizing the SDR image obtained by the developing process in S424 to a size suitable for the resolution of an output destination device (the display unit 28 or the external apparatus 300), and displays the generated SDR_LV image.

In S426, the system control unit 50 determines whether the menu display button 70*e* is pressed. The system control unit 50 advances the process to S427 if it is determined that the button is pressed, and advances the process to S428 if it is determined that the button is not pressed. In S427, the system control unit 50 performs shooting menu processing, and advances the process to S428. Details of this shooting menu processing in S427 will be described later with reference to FIGS. 6A-1 and 6A-2 and FIGS. 6B-1 and 6B-2.

In S428, the system control unit 50 determines whether the info display button 70*g* is pressed. The system control unit 50 advances the process to S429 if it is determined that the button is pressed, and advances the process to S430 if it is determined that the button is not pressed. In S429, the system control unit 50 switches the displays of shooting information, and advances the process to S430. Examples of the shooting information are a histogram and a highlight warning table.

In S430, the system control unit 50 determines whether the shutter button 61 is in the half-stroke state. The system control unit 50 advances the process to S436 if it is determined that the button is not in the half-stroke state, and advances the process to S431 if it is determined that the button is in the half-stroke state.

In S431, the system control unit 50 performs the AF/AE processing explained with reference to FIG. 2, and advances the process to S432. In S432, the system control unit 50 determines whether the shutter button 61 is in the full-stroke state, based on whether the signal SW2 is received. The system control unit 50 advances the process to S433 if it is determined that the button is not in the full-stroke state, and advances the process to S434 if it is determined that the button is in the full-stroke state. In S433, the system control unit 50 determines whether the half-stroke state of the shutter button 61 is held, based on whether the signal SW1 is received. The system control unit 50 returns the process to S431 if it is determined that the half-stroke state is held, and advances the process to S436 if it is determined that the half-stroke state is not held.

In S434, the system control unit 50 performs an SDR shooting process and advances the process to S435. In this SDR shooting process, the system control unit 50 develops RAW image data obtained by SDR shooting by the SDR image quality, generates JPEG image data by encoding the SDR-quality image by JPEG, and records the data as a JPEG file having the JPEG format on the recording medium. If recording of only the SDR image as a JPEG file is set as the recording setting, only the JPEG file is recorded. If recording of both a JPEG file and a RAW image file is set as the recording setting, the JPEG file is recorded, and data obtained by encoding the RAW image data obtained by SDR shooting and the JPEG image data are recorded on the recording medium as a RAW image file having the RAW image file format shown in FIG. 8A. In this RAW image file, ImageData 809 in the data structure shown in FIG. 8A has a format shown in FIG. 8B. That is, images having sizes for display are encoded by JPEG at an accuracy of 8 bits, and the encoded data are integrated and stored as one file. Then, in S435, the system control unit 50 performs quick review display processing, and advances the process to S436. Details of this quick review display processing will be described later with reference to FIGS. 4B-1 and 4B-2.

In S436, the system control unit 50 determines whether the LV button 76 is pressed. The system control unit 50 advances the process to S437 if it is determined that the button is pressed, and advances the process to S438 if it is determined that the button is not pressed. In S437, the system control unit 50 compresses the SDR image obtained by the SDR-quality developing process in S425 by H264 compression, records the compressed image as an SDR moving image file, and advances the process to S438.

In S438, the system control unit 50 determines whether the playback button 79 is pressed. The system control unit 50 advances the process to S439 if it is determined that the playback button 79 is pressed, and advances the process to S440 if it is determined that the playback button 79 is not pressed. In S439, the system control unit 50 performs playback mode processing and advances the process to S440. Details of this playback mode processing will be described later with reference to FIGS. 9A to 9H and FIGS. 10A and 10B.

In S440, the system control unit 50 determines whether there is an LV-mode termination instruction. The system control unit 50 returns the process to S401 if it is determined that there is no LV-mode termination instruction, and terminates the process if it is determined that there is a termination instruction.

Figures 1, 4B:
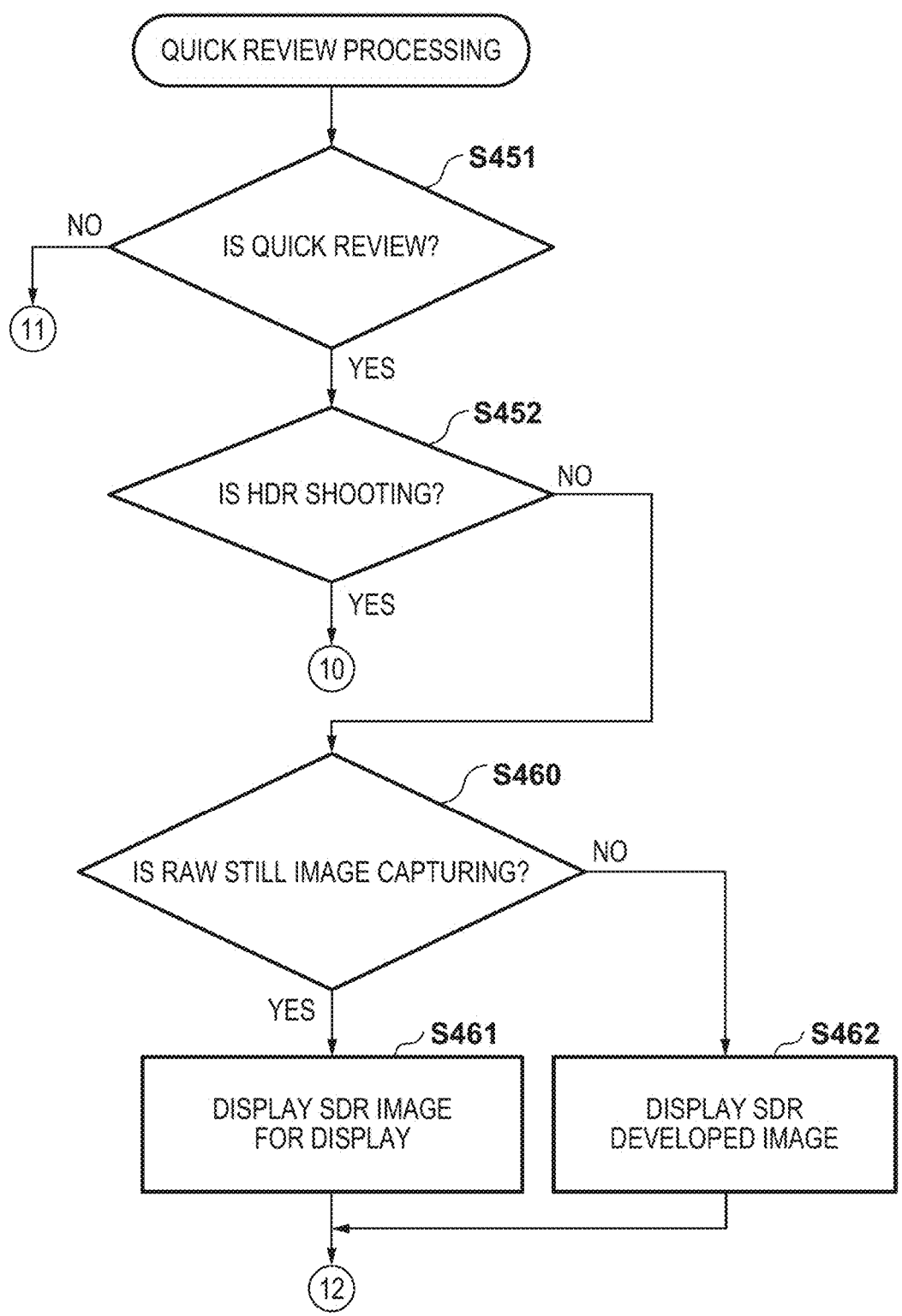
Figures 2, 4B:
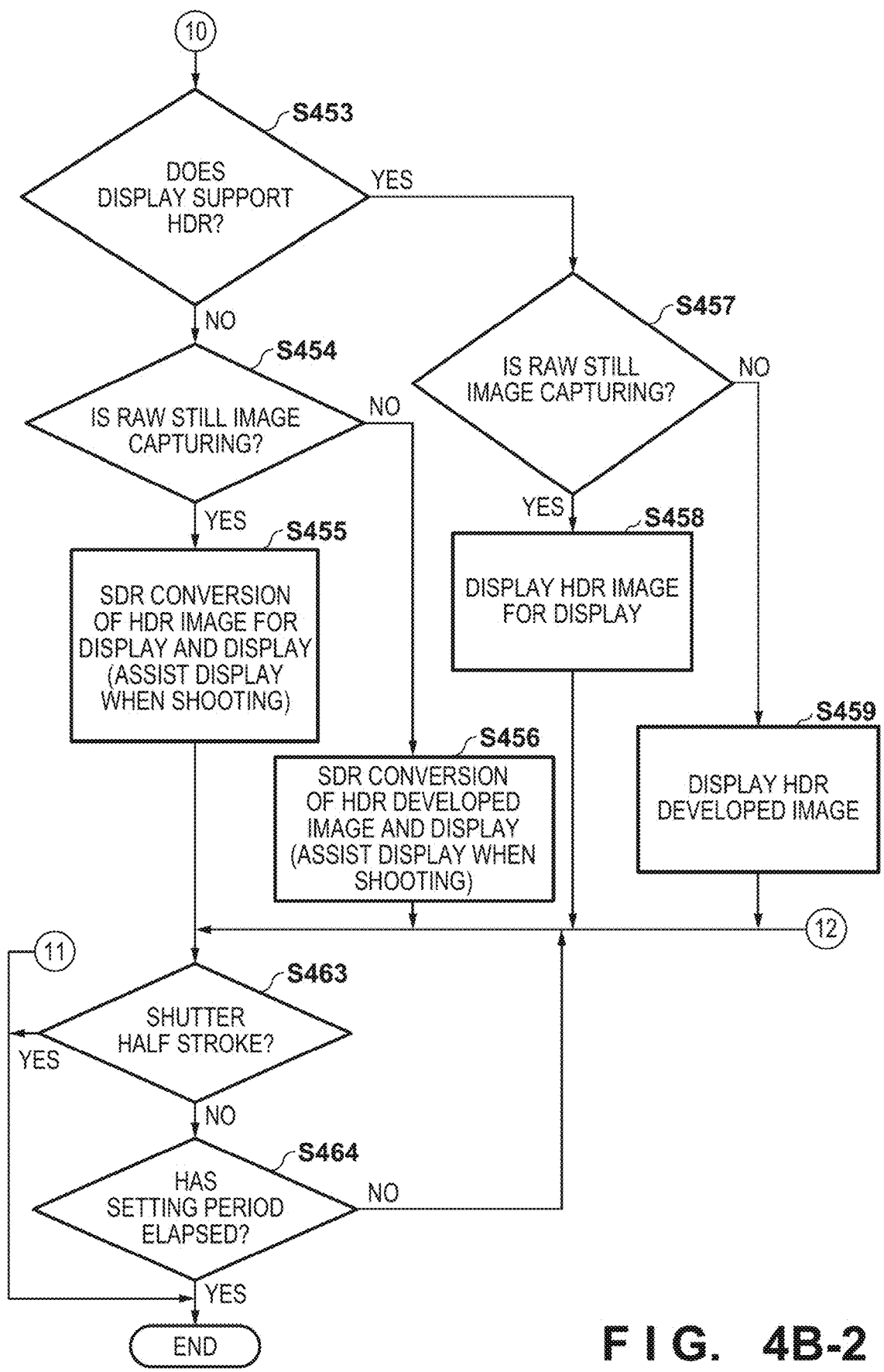

FIGS. 4B-1 and 4B-2 are flowcharts showing the quick review display processing of the system control unit 50. This processing is implemented by deploying a program recorded in the nonvolatile memory 56 in the system memory 52, and executing the program by the system control unit 50.

In S451, the system control unit 50 determines whether quick review display is set. The system control unit 50 advances the process to S452 if it is determined that quick review display is set, and terminates the process if it is determined that no quick review display is set.

In S452, the system control unit 50 determines whether shooting is performed in the HDR shooting mode. The system control unit 50 advances the process to S453 if it is determined that shooting is performed in the HDR shooting mode, and advances the process to S460 if it is determined that shooting is performed in the SDR shooting mode.

In S453, the system control unit 50 determines whether a device (the display unit 28 or the external apparatus 300) for quick review display supports HDR. The system control unit 50 advances the process to S454 if it is determined that the device does not support HDR, and advances the process to S457 if it is determined that the device supports HDR.

In S454, the system control unit 50 determines whether shooting is performed by RAW still image capturing. The system control unit 50 advances the process to S455 if it is determined that shooting is performed by RAW still image capturing, and advances the process to S456 if it is determined that shooting is performed by HEIF still image capturing.

In S455, the system control unit 50 performs HDR→SDR conversion on an HDR image 828 for display in the HDR RAW image by the same processing as in S406 to S408, resizes the image to a size suitable for an output target device (the display unit 28 or the external apparatus 300), displays the image by the SDR image quality, and advances the process to S463.

In S456, the system control unit 50 performs HDR→SDR conversion on an HDR image for display in the HEIF image by the same processing as in S406 to S408, resizes the image to a size suitable for an output target device (the display unit 28 or the external apparatus 300), displays the image by the SDR image quality, and advances the process to S463.

In S457, the system control unit 50 determines whether shooting is performed by RAW still image capturing. The system control unit 50 advances the process to S458 if it is determined that shooting is performed by RAW still image capturing, and advances the process to S459 if it is determined that shooting is performed by HEIF still image capturing. In S458, the system control unit 50 resizes the HDR image 828 for display in the HDR RAW image to a size suitable for an output target device (the display unit 28 or the external apparatus 300), displays the image by the HDR image quality, and advances the process to S463. In S459, the system control unit 50 resizes the HDR image for display in the HEIF image to a size suitable for an output target device (the display unit 28 or the external apparatus 300), displays the image by the HDR image quality, and advances the process to S463.

In S460, the external apparatus 300 determines whether shooting is performed by RAW still image capturing. The external apparatus 300 advances the process to S461 if it is determined that shooting is performed by RAW still image capturing, and advances the process to S462 if it is determined that shooting is performed by HEIF still image capturing. In S461, the system control unit 50 resizes an SDR image 823 for display in the SDR RAW image to a size suitable for an output target device (the display unit 28 or the external apparatus 300), displays the image by the SDR image quality, and advances the process to S463. In S462, the system control unit 50 resizes the SDR image for display in the JPEG image to a size suitable for an output target device (the display unit 28 or the external apparatus 300), displays the image by the SDR image quality, and advances the process to S463.

In S463, the system control unit 50 determines whether the shutter button 61 is pressed. The system control unit 50 advances the process to S464 if it is determined that the button is not pressed, and terminates the process if it is determined that the button is pressed.

In S464, the system control unit 50 determines whether the time set as the quick review display time has elapsed. The system control unit 50 returns the process to S463 if it is determined that the time has not elapsed yet, and terminates the process if it is determined that the time has elapsed.

Figure 5A:
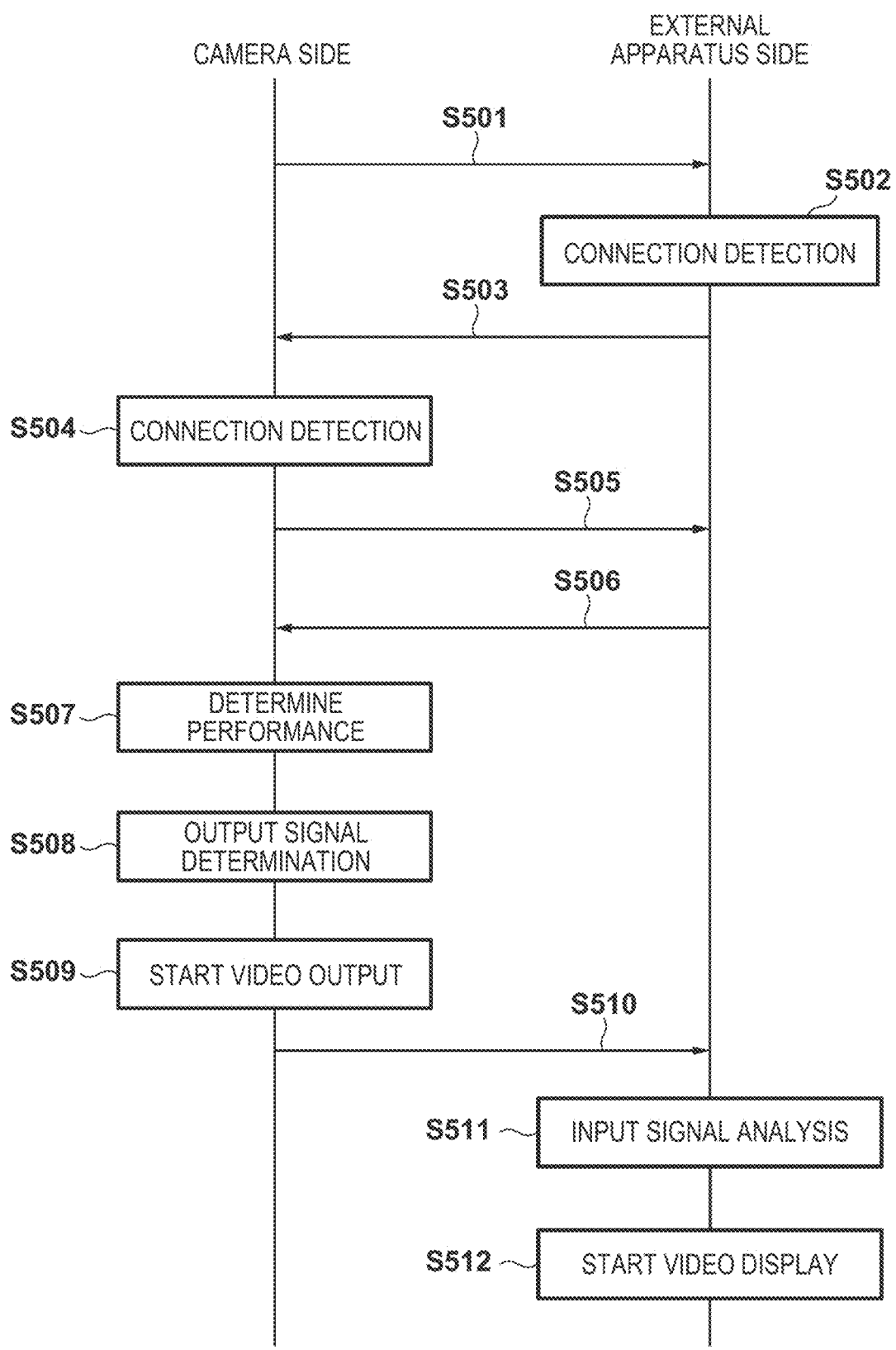
FIG. 5A is a sequence chart of an HDMI connecting process according to the embodiment.

FIG. 5A is a sequence chart showing the control procedures of the digital camera 100 and the external apparatus 300 when the digital camera 100 and the external apparatus 300 are connected. The explanation will be made by assuming that the digital camera 100 and the external apparatus 300 are connected by HDMI connection.

In S501, the system control unit 50 instructs the digital output I/F 90 to start transmitting a +5V signal. As a consequence, the digital output I/F 90 starts transmitting the +5V signal. The transmitted +5V signal is transmitted to the external apparatus 300 through a +5V signal line (not shown) of the connection cable 302. The external apparatus 300 receives the +5V signal of the connection cable 302, and advances the process to S502.

In S502, the external apparatus 300 determines that the digital camera 100 has confirmed the connection of the external apparatus 300, and advances the process to S503.

In S503, the external apparatus 300 starts transmitting an HPD signal from an HPD signal line (not shown) of the connection cable 302. The digital output I/F 90 of the digital camera 100 receives the transmitted HPD signal via the connection cable 302. Upon receiving the HPD signal, the digital output I/F 90 notifies the system control unit 50 of the HPD reception.

In S504, the system control unit 50 detects the connection response from the external apparatus 300 by the notification of HPD, and advances the process to S505.

In S505, the system control unit 50 controls the digital output I/F 90 to transmit an EDID request signal from the connection cable 302. The transmitted EDID request signal is transmitted to the external apparatus 300 through an EDID signal line (not shown) of the connection cable 302. The external apparatus 300 receives this EDID request signal and advances the process to S506.

In S506, the external apparatus 300 transmits EDID from the EDID signal line (not shown) of the connection cable 302. The digital output I/F 90 of the digital camera 100 receives this EDID via the connection cable 302. Upon receiving the EDID, the digital output I/F 90 notifies the system control unit 50 of the reception of the EDID.

In S507, the system control unit 50 receives the notification of the EDID reception, and instructs the digital output I/F 90 to copy the EDID received in S506 to the memory 32. After this copying is complete, the system control unit 50 analyzes the EDID deployed in the memory 32, determines the performance of a video signal acceptable by the external apparatus 300, and advances the process to S508.

In S508, the system control unit 50 determines to output an HDR signal to the external apparatus 300 if the main body setting is HDR-effective and the performance of a video signal acceptable by the external apparatus 300 determined in S507 corresponds to an HDR signal, determines to output an SDR signal in other cases, and advances the process to S509.

In S509, the system control unit 50 instructs the digital output I/F 90 to start transmitting the HDR or SDR video signal determined in S508. The digital output I/F 90 having received this video signal transmission start instruction starts transmitting the video signal through the connection cable 302, and advances the process to S510.

In S510, the digital camera 100 outputs the video signal to a TMDS signal line (not shown) of the connection cable 302. The external apparatus 300 receives the video signal via the TMDS signal line (not shown) of the connection cable 302, and advances the process to S511.

In S511, the external apparatus 300 analyzes the video signal received in S510, switches the driving conditions of the display 301 to settings capable of displaying the video signal, and advances the process to S512. In S512, the external apparatus 300 displays the video signal received in S510 on the display 301 of the external apparatus 300.

Figure 5B:
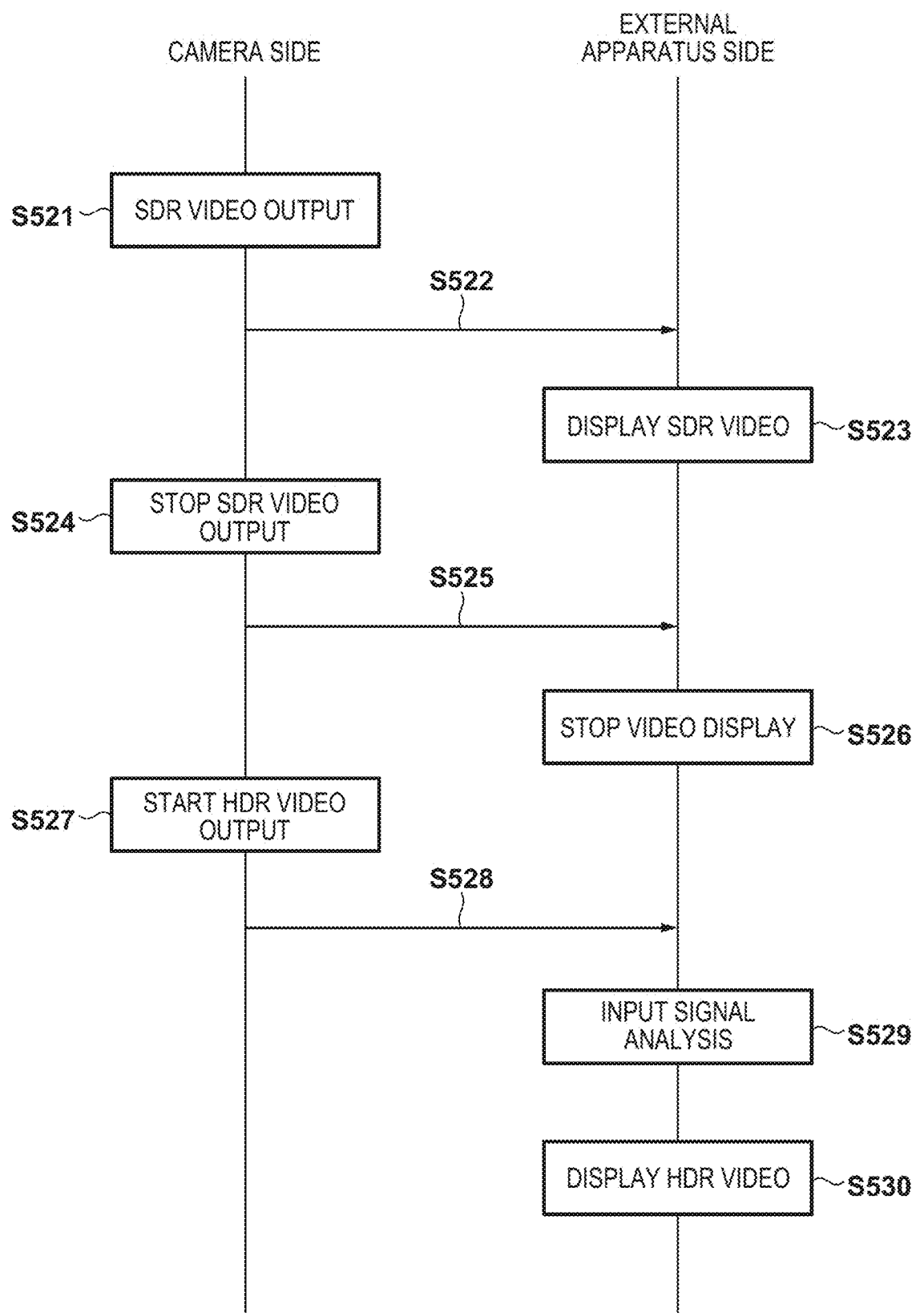
FIG. 5B is a sequence chart of the HDMI connecting process according to the embodiment.
Figures 1, 6A:
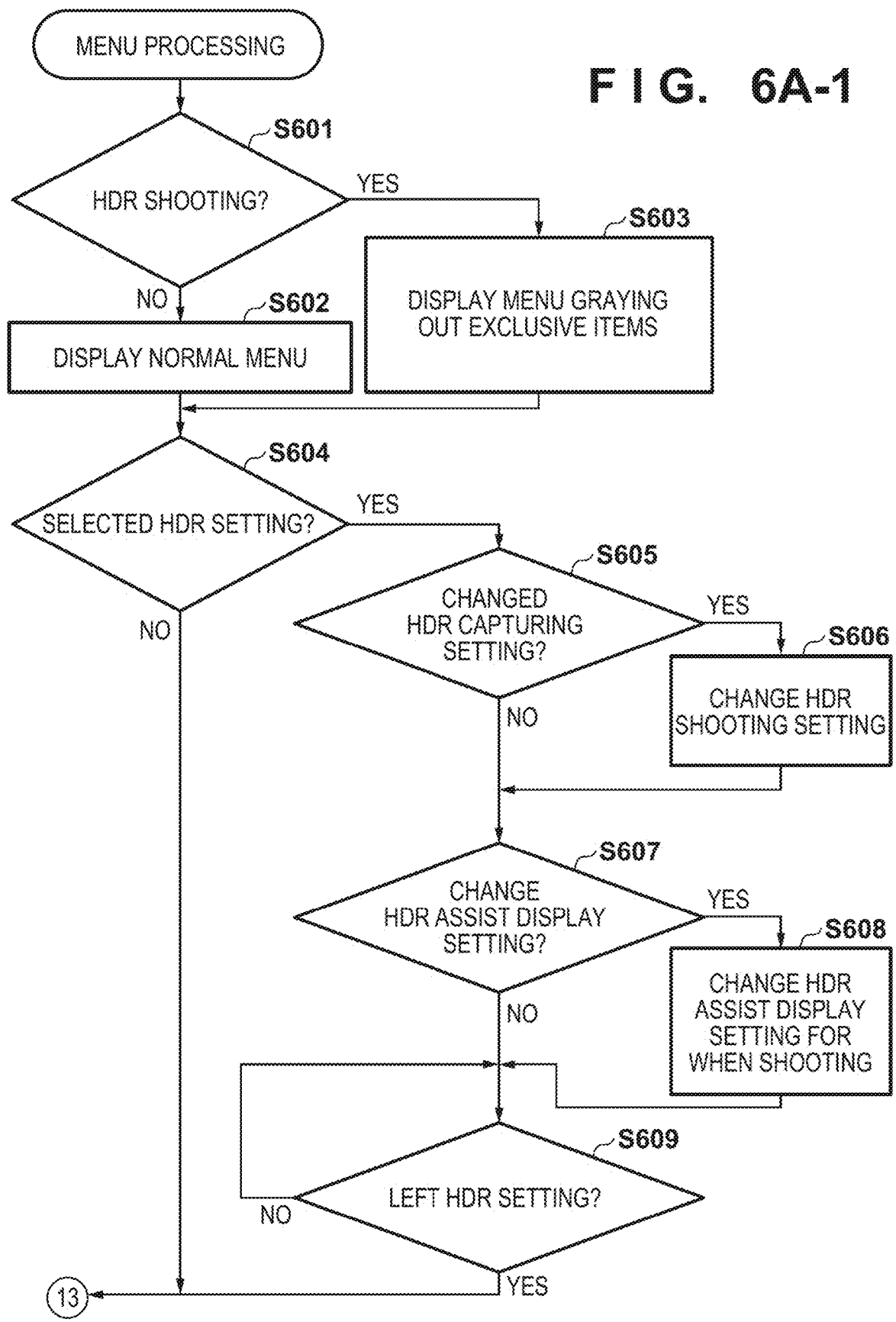
Figures 2, 6A:
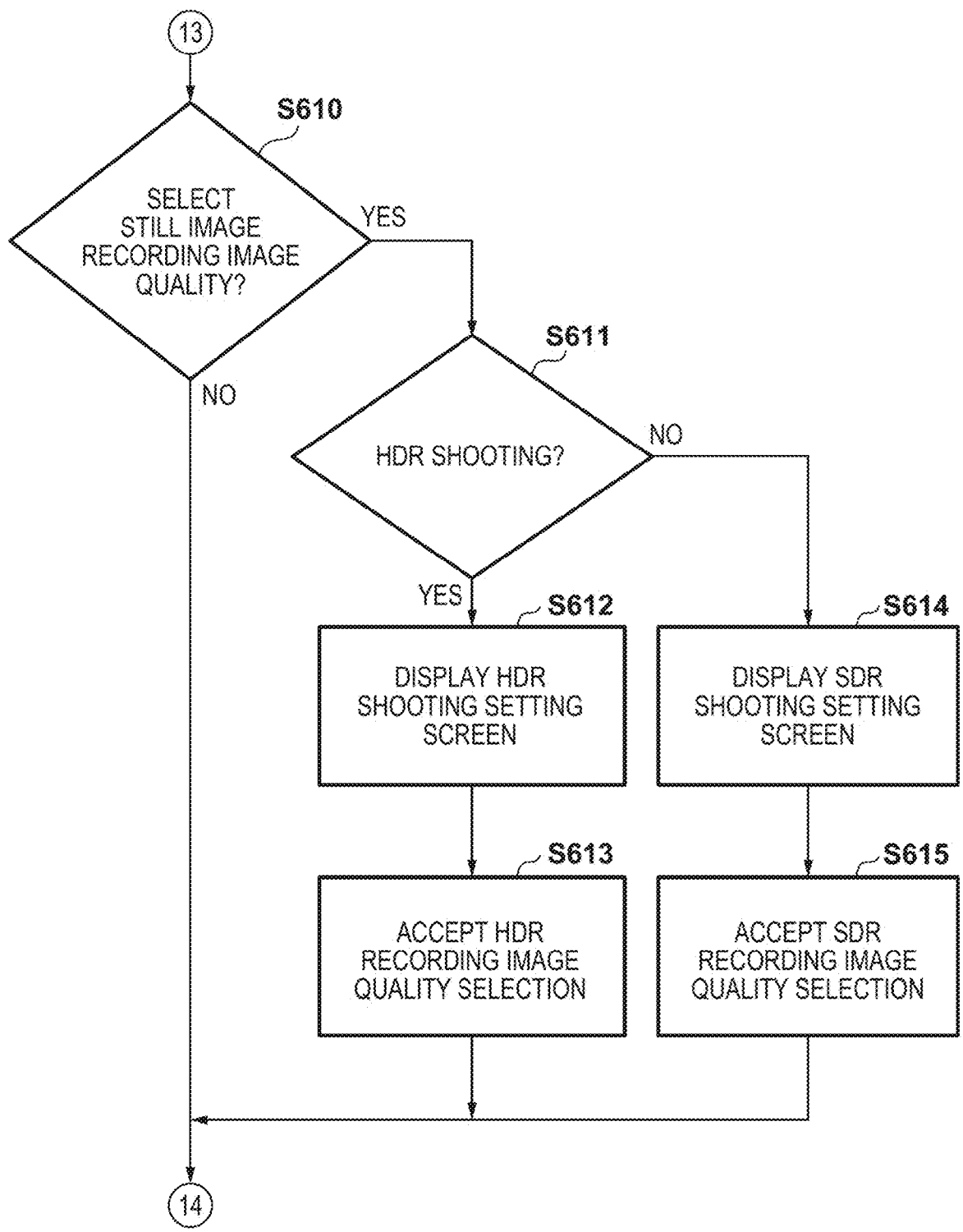
Figures 1, 6B:
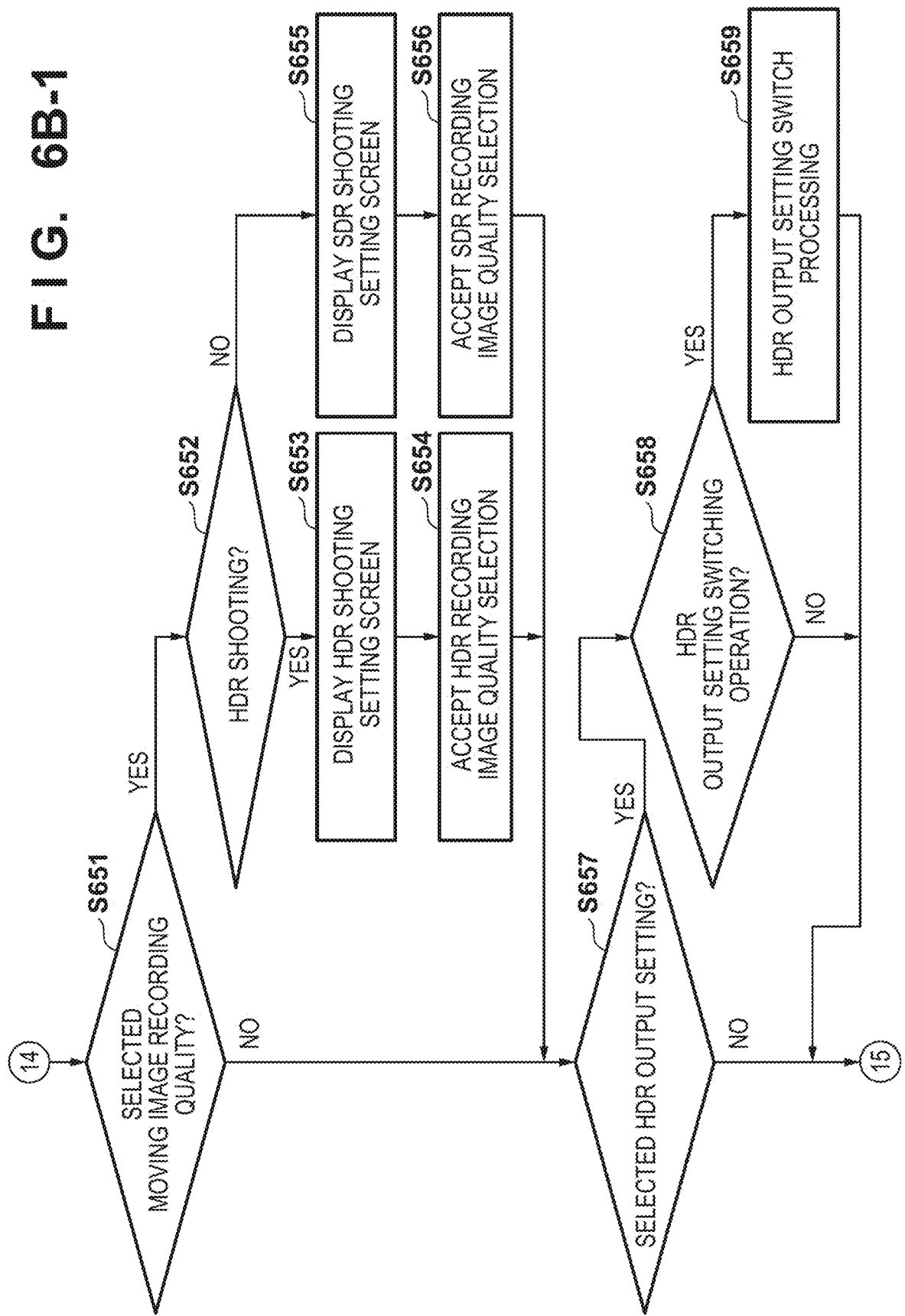
Figures 2, 6B:
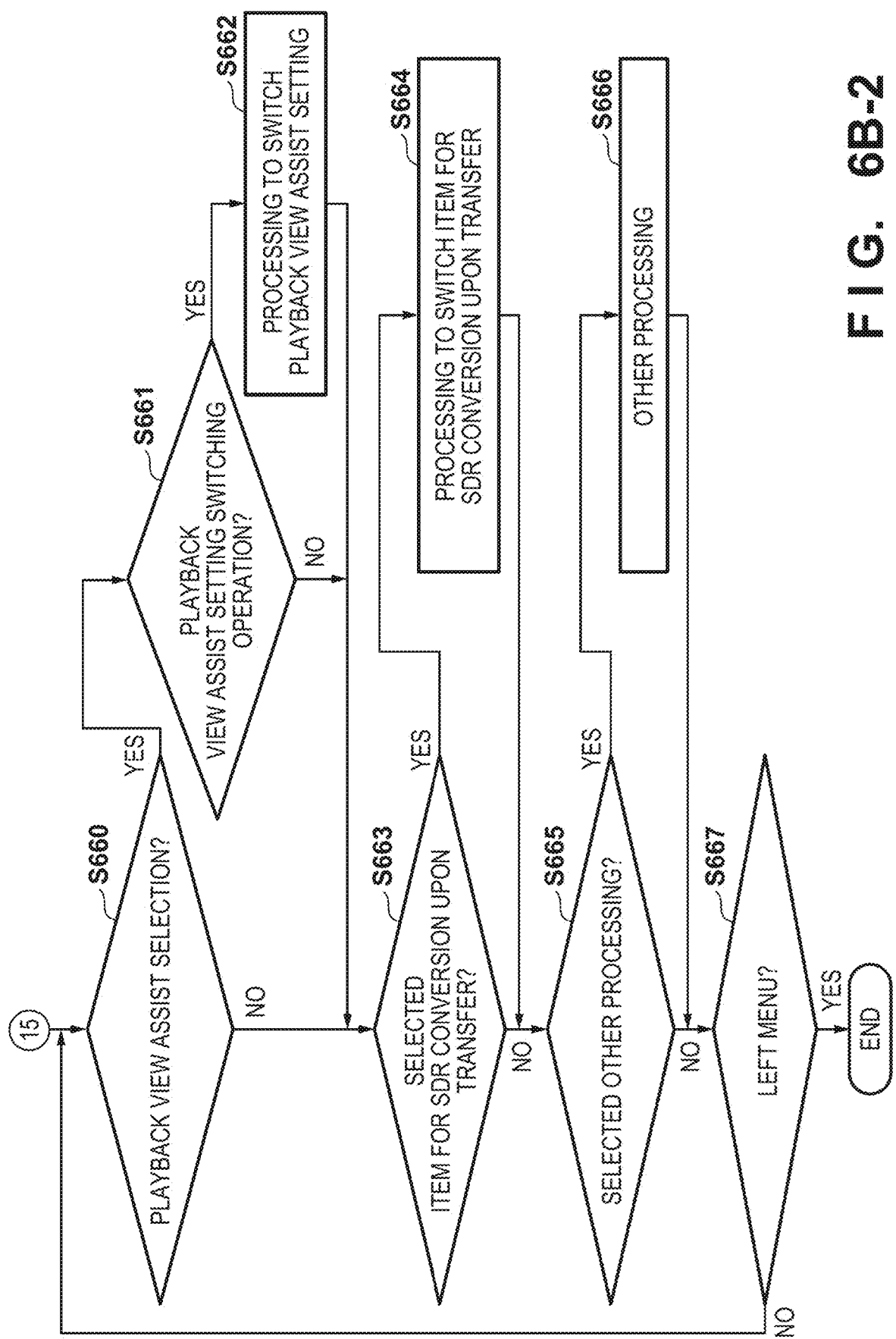

FIG. 5B is a sequence chart showing a process of switching the video outputs of the digital camera 100 and the external apparatus 300 from an SDR image to an HDR image.

In this sequence, it is assumed that the connection between the digital camera 100 and the external apparatus 300 is completed in the sequence explained with reference to FIG. 5A.

In S521, the system control unit 50 instructs the digital output I/F 90 to transmit an SDR video signal, and advances the process to S522.

In S522, the digital camera 100 outputs the SDR video signal to the TMDS signal line (not shown) of the connection cable 302. The external apparatus 300 receives the SDR video signal via the TMDS signal line (not shown) of the connection cable 302, and advances the process to S523.

In S523, the external apparatus 300 displays the SDR video received in S522 on the display 301 of the external apparatus 300.

While the digital camera 100 is outputting the SDR signal, the display 301 of the external apparatus 300 displays the SDR image by repeating S521 to S523.

When the digital camera 100 switches the video output to the external apparatus 300 from an SDR image to an HDR image, processing from S524 is executed.

In S524, the system control unit 50 instructs the digital output I/F 90 to stop the SDR video signal, and advances the process to S525.

In S525, the system control unit 50 stops the video signal to the TMDS signal line (not shown) of the connection cable 302. The external apparatus 300 stops receiving the SDR video signal via the TMDS signal line (not shown) of the connection cable 302, and advances the process to S526.

In S526, the external apparatus 300 stops displaying the video on the display 301 of the external apparatus 300 because the reception of the video from the digital camera 100 has stopped.

In S527, the system control unit 50 instructs the digital output I/F 90 to transmit an HDR video signal, and advances the process to S528.

In S528, the system control unit 50 outputs the HDR video signal to the TMDS signal line (not shown) of the connection cable 302. The external apparatus 300 receives the HDR video signal via the TMDS signal line (not shown) of the connection cable 302, and advances the process to S529.

In S529, the external apparatus 300 analyzes the video signal received in S528, switches the driving conditions of the display 301 to settings capable of displaying the HDR video signal, and advances the process to S530.

In S530, the external apparatus 300 displays the HDR video signal received in S528 on the display 301 of the external apparatus 300.

The processing time from S529 to S530 changes in accordance with the performance of the external apparatus 300, so it takes about 1 to 5 seconds until the video is displayed.

FIG. 5C is a sequence chart showing a process of switching the video outputs of the digital camera 100 and the external apparatus 300 from an HDR image to an SDR image.

In this sequence, it is assumed that the connection between the digital camera 100 and the external apparatus 300 is completed in the sequence explained with reference to FIG. 5A.

In S541, the system control unit 50 instructs the digital output I/F 90 to transmit an HDR video signal, and advances the process to S542. In S542, the system control unit 50 outputs the HDR video signal to the TMDS signal line (not shown) of the connection cable 302. Also, the external apparatus 300 receives the HDR video signal via the TMDS signal line (not shown) of the connection cable 302, and advances the process to S543.

In S543, the external apparatus 300 displays the HDR video received in S542 on the display 301 of the external apparatus 300.

While the digital camera 100 is outputting the HDR signal, the display 301 of the external apparatus 300 displays the HDR signal by repeating S541 to S543.

When the digital camera 100 switches the video outputs to the external apparatus 300 from an HDR image to an SDR image, processing from S544 is executed.

In S544, the system control unit 50 instructs the digital output I/F 90 to stop the HDR video signal, and advances the process to S545. In S545, the system control unit 50 stops the video signal to the TMDS signal line (not shown) of the connection cable 302. The external apparatus 300 stops receiving the HDR video signal via the TMDS signal line (not shown) of the connection cable 302, and advances the process to S546.

In S546, the external apparatus 300 stops displaying the video on the display 301 of the external apparatus 300 because the reception of the video from the digital camera 100 has stopped.

In S547, the system control unit 50 instructs the digital output I/F 90 to transmit an SDR video signal, and advances the process to S548.

In S548, the system control unit 50 outputs the SDR video signal to the TMDS signal line (not shown) of the connection cable 302. The external apparatus 300 receives the SDR video signal via the TMDS signal line (not shown) of the connection cable 302, and advances the process to S549.

In S549, the external apparatus 300 analyzes the video signal received in S548, switches the driving conditions of the display 301 to settings capable of displaying the SDR video signal, and advances the process to S550. In S550, the external apparatus 300 displays the SDR video signal received in S528 on the display 301 of the external apparatus 300.

Note that the processing time from S549 to S550 changes in accordance with the performance of the external apparatus 300, so it takes about 1 to 5 seconds until the video is displayed.

FIGS. 6A-1 and 6A-2 and FIGS. 6B-1 and 6B-2 are flowcharts showing details of the shooting menu processing in S411 and S427 of FIGS. 4A-1 to 4A-4. This processing is implemented by deploying a program recorded in the nonvolatile memory 56 in the system memory 52, and executing the program by the system control unit 50.

In S601, the system control unit 50 determines whether to perform HDR shooting, based on whether the user has made the HDR shooting mode effective. If it is determined not to perform HDR shooting, the system control unit 50 advances the process to S602 and displays a menu for normal SDR shooting. If it is determined to perform HDR shooting, the system control unit 50 advances the process to S603 and displays a menu for HDR shooting. In S603, the system control unit 50 displays functions not to be used in HDR shooting in an ineffective state such as a grayed out state on the menu.

In S604, the system control unit 50 determines whether the user has selected a setting item indicating whether to perform HDR shooting. The system control unit 50 advances the process to S605 if it is determined that the item is selected, and advances the process to S611 if not. In S605, the system control unit 50 determines whether the user has switched the setting indicating whether to perform HDR shooting to "effective". The system control unit 50 advances the process to S606 if it is determined that the setting is switched to "effective", and advances the process to S607 if not. In S606, the system control unit 50 changes the setting indicating whether to perform HDR shooting to "effective", and stores the set value in the system memory 52.

If the setting indicating whether to perform HDR shooting is "effective", the system control unit 50 determines in S607 whether the user has switched HDR assist display setting to "change". The system control unit 50 advances the process to S608 if it is determined that the setting is switched to "change", and advances the process to S609 if not. Note that if the setting indicating whether to perform HDR shooting is "ineffective", it is desirable that the HDR assist display setting is unchangeable.

In S608, the system control unit 50 changes the HDR assist display setting for shooting to whether to "perform" or "not perform", and stores the set value in the system memory 52. "Perform" the HDR assist setting may have two or more variations.

Note that when the HDR shooting setting or the HDR assist display setting is changed on the menu screen, the change result of the display setting may also be reflected on the display at the timing at which the menu screen has changed to the live view screen. When these settings are changed not on the menu screen but on the live view screen by, for example, using a specific button of the operation unit 70, the change result may also be reflected at the timing of change (the timing at which the button is pressed).

In S609, the system control unit 50 determines whether the user has issued a termination instruction to the HDR setting menu display processing. If it is determined that the termination instruction is issued, the system control unit 50 advances the process to S610.

In S610, the system control unit 50 determines whether the user has selected a setting item of still-image recording image quality. The system control unit 50 advances the process to S611 if it is determined that the selection is made, and advances the process to S651 if not.

In S611, the system control unit 50 determines whether the user has input an instruction for HDR shooting. The system control unit 50 advances the process to S612 if it is determined that the instruction input for HDR shooting is issued, and advances the process to S614 if it is determined that there is no instruction input.

The system control unit 50 displays a screen for HDR shooting in S612, and accepts user selection for recording image quality for HDR shooting in S613. As the set recording image quality for HDR shooting, RAW, an HDR still image file, and two-image simultaneous outputs of RAW+ HDR still image files are prepared as file formats. Examples of the image size are Large close to the number of pixels at the time of sensor read, Middle that is slightly smaller than that, and Small that is further smaller than that. Examples of the compression ratio for compressing the file size volume are high image quality (a low compression ratio), standard (a high compression ratio), and low image quality (a high compression ratio).

The system control unit 50 displays a screen for SDR shooting in S614, and accepts user selection for the recording image quality for SDR shooting in S615. The same choices as those for HDR shooting are prepared as the setting recording image quality for SDR shooting as well.

In S651, the system control unit 50 determines whether the user has selected a setting item of moving image recording image quality. The system control unit 50 advances the process to S652 if it is determined that the setting item of moving image recording image quality is selected, and advances the process to S657 if not.

In S652, the system control unit 50 checks setting indicating whether to perform HDR shooting by the user. The system control unit 50 advances the process to S653 if the setting is YES, and advances the process to S655 if not.

The system control unit 50 displays a screen for HDR shooting in S653, and accepts user selection for the recording image quality for HDR shooting in S654. As the set recording image quality for HDR shooting, a RAW moving image, RAW moving image+proxy moving image, an HDR moving image file, and three-moving-image simultaneous outputs of RAW+proxy moving image+HDR moving image file are prepared. Examples of the image size are 8K, 4K, FullHD, HD, and VGA. Examples of the compression ratio for decreasing the file size are high image quality (a low compression ratio) such as ALL-I, and standard to low image quality (a high compression ratio) such as IPB. It is also possible to select the frame rate, and the broadcasting system such as NTSC/PAL.

The system control unit 50 displays a screen for SDR shooting in S655 in the same manner as in S653, and accepts user selection for the recording image quality for SDR shooting in S656. The same choices as those for HDR shooting are prepared as the setting recording image quality for SDR shooting as well.

In S657, the system control unit 50 determines whether the user has selected a setting item of HDR output. The system control unit 50 advances the process to S658 if it is determined that the user has selected the setting item of HDR output, and advances the process to S660 if not. In S658, the system control unit 50 determines whether the user has switched the HDR output setting to "effective". The system control unit 50 advances the process to S659 if it is determined that the setting is switched to "effective", and advances the process to S660 if not. In S659, the system control unit 50 changes the HDR output setting to "effective", and stores the set value in the system memory 52.

In S660, the system control unit 50 determines whether the user has selected a setting item of playback view assist. The system control unit 50 advances the process to S661 if it is determined that the setting item of playback view assist is selected, and advances the process to S663 if not. In S661, the system control unit 50 determines whether the user has switched the setting of playback view assist to "effective". The system control unit 50 advances the process to S662 if it is determined that the setting is switched to "effective", and advances the process to S663 if not. In S662, the system control unit 50 changes the setting for playback view assist to "effective", and stores the set value in the system memory 52.

In S663, the system control unit 50 determines whether the user has selected a setting item of SDR conversion for transfer. The system control unit 50 advances the process to S664 if it is determined that the selection is made, and advances the process to S665 if not. In S663, the system control unit 50 determines whether the user has switched the setting of SDR conversion for transfer to "effective". If it is determined that the setting is switched to "effective", the system control unit 50 changes the SDR conversion setting for transfer to "effective" in S664, and advances the process to S665.

In S665, the system control unit 50 determines whether the user has selected a setting item related to other HDR shooting. The system control unit 50 advances the process to S666 if it is determined that the selection is made, and advances the process to S667 if not. In S666, the system control unit 50 changes other process to "effective" and advances the process to S667.

In S667, the system control unit 50 determines whether the user has instructed to leave the menu. The system control unit 50 returns the process to S660 if the determination is "do not leave", and terminates this process if the determination is "leave".

Figure 7A:
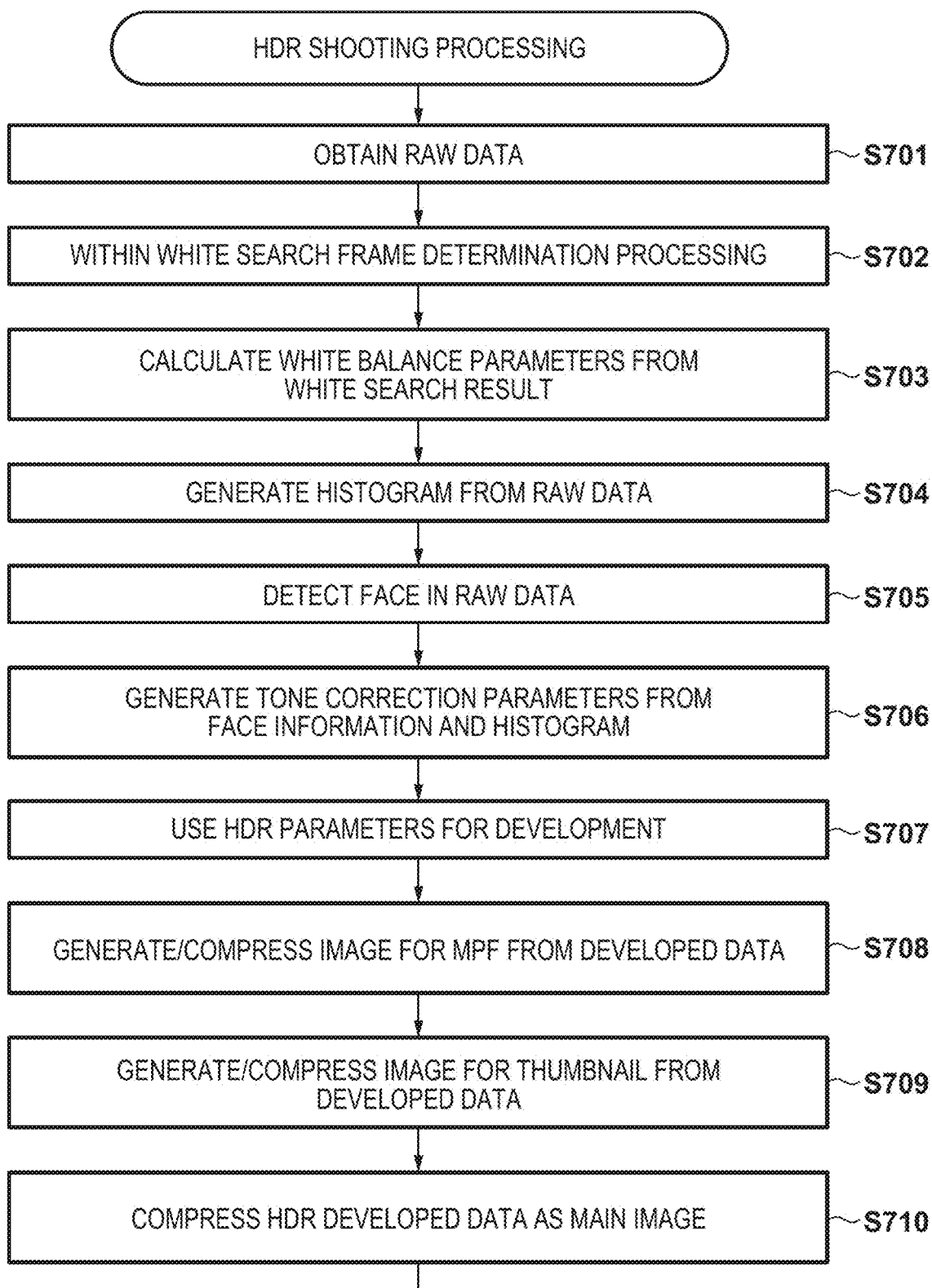
FIG. 7A is a flowchart of an HDR shooting process according to the embodiment.
Figure 7B:
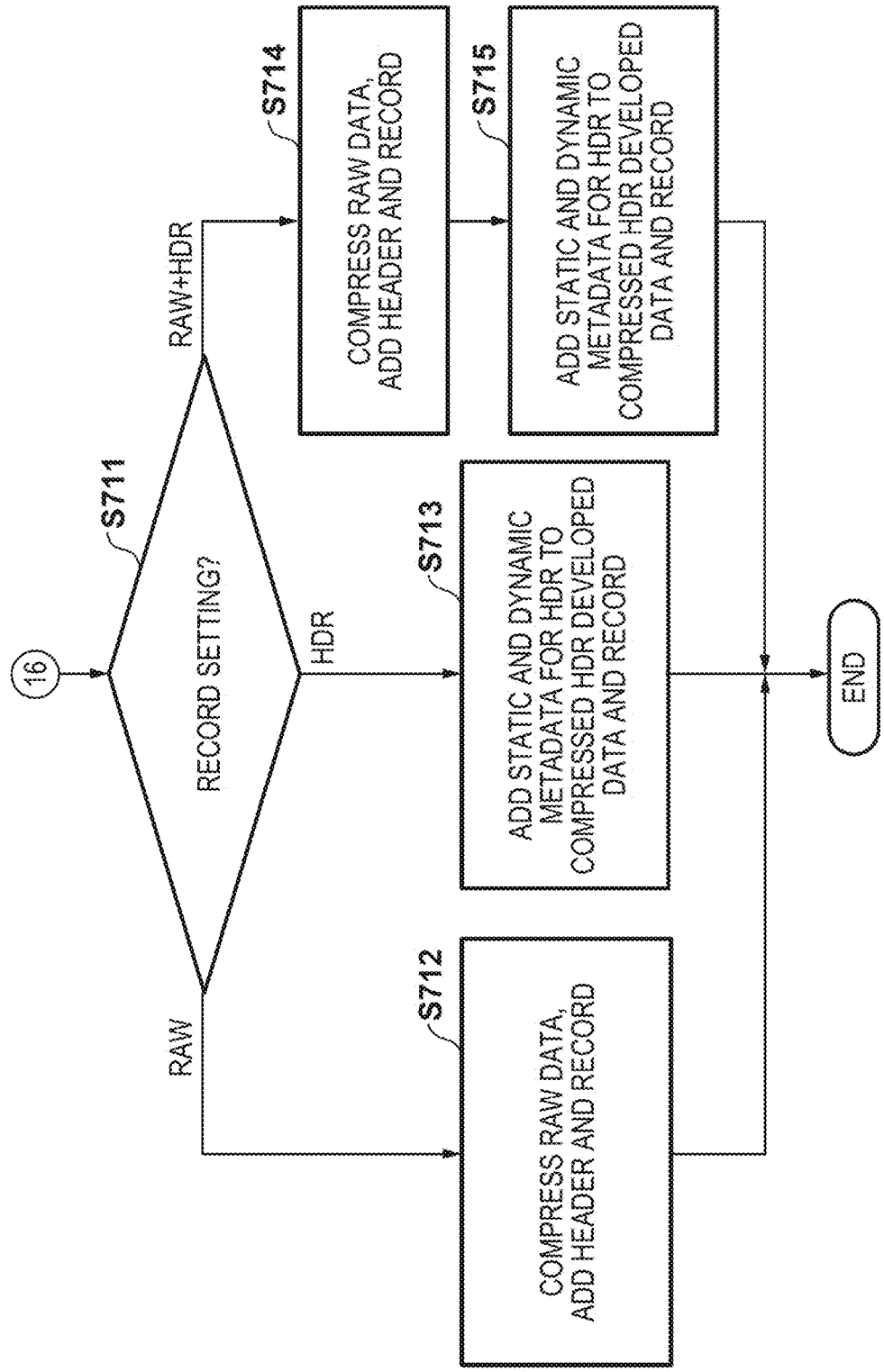
FIG. 7B is a flowchart of the HDR shooting process according to the embodiment.
Figure 8A:
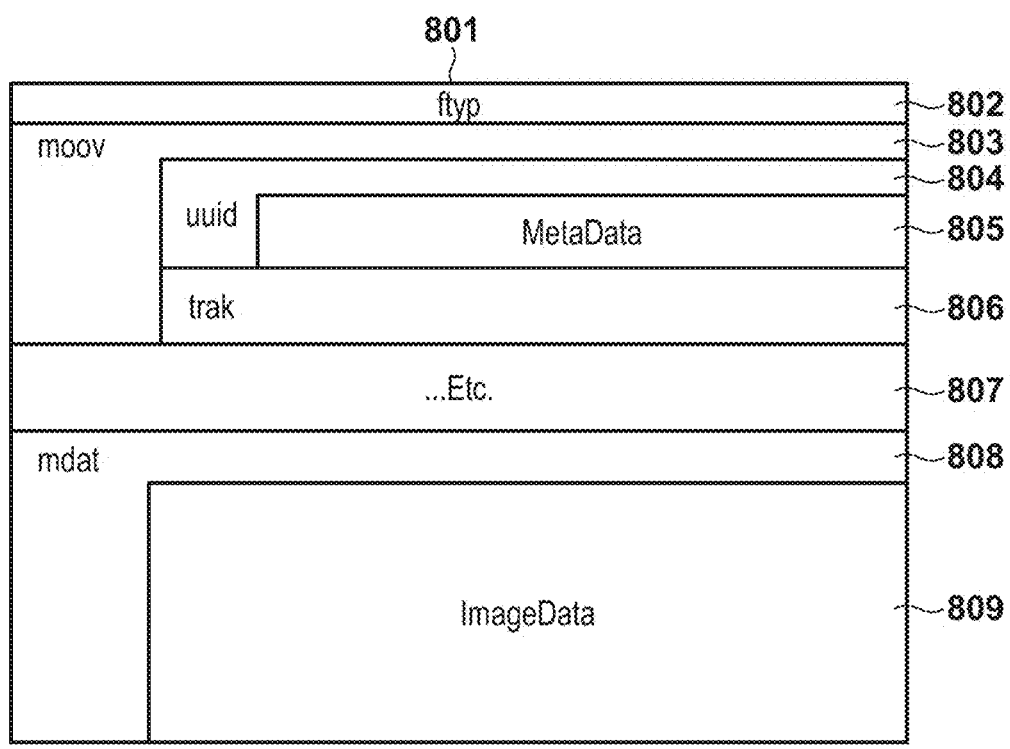
FIG. 8A is a view showing the configuration of a RAW file according to the embodiment.

FIGS. 7A and 7B are flowcharts showing details of the HDR shooting process of the system control unit 50. In this flow, RAW data written in the memory 32 is developed by HDR in the image processing unit 24.

An image capturing apparatus such as a digital camera or a digital video camera has a white balance function of correcting the color tone of a captured image in accordance with the light source used in shooting. The white balance function corrects the differences between color tones that change in accordance with light sources (natural light sources such as a clear sky and a cloudy sky, and artificial light sources such as a fluorescent lamp and an incandescent lamp), so that white looks the same regardless of the light source. In S701 to S703, white balance coefficients necessary for white balance processing are calculated. In this embodiment, it is assumed that shooting is performed by exposure lower than exposure with which the brightness of a person or the like is correct in order to prevent highlight detail loss of a high-luminance region such as the sky.

First, in S701, the system control unit 50 obtains RAW image data via the memory control unit 15.

In S702, the system control unit 50 performs intra-white-search-frame determination process of determining probably white pixels, on the RAW image data obtained to calculate white valance coefficients.

In S703, the system control unit 50 calculates the white balance coefficients based on the result of the intra-white-search-frame determination.

Details of the processing in S702 and S703 will be explained with reference to a flowchart shown in FIG. 12.

As explained earlier, each pixel of the RAW image data has a signal component of only one of R, G, and B. To perform white search, the system control unit 50 performs DeBayer processing S1201 because conversion to a color signal is necessary, thereby generating all channel signals of R, G, and B for each pixel. The DeBayer processing has several methods, and signal generation can be performed by, for example, liner interpolation using a low-pass filter. The RAW image data is generally affected by noise, so Optical Black is not 0 but has a value. Therefore, the system control unit 50 performs a process (S1202) of subtracting the OB value from the DeBayered signal. Then, the system control unit 50 calculates color signals $C_x$ and $C_y$ from the obtained RGB signals by the following equations (S1203).

$$C_x = \frac{(R + G_2) - (B + G_1)}{Y_i}$$

$$C_Y = \frac{(R + B) - (G_1 + G_2)}{Y_i}$$

$$Y_i = \frac{R + G_1 + G_2 + B}{4}$$

where $G_1$ and $G_2$ are two G component values in 2×2 pixels in the Bayer array. $C_x$ represents the color temperature, $C_y$ represents a green-direction correction amount, and $Y_i$ is the luminance value.

Figure 13:
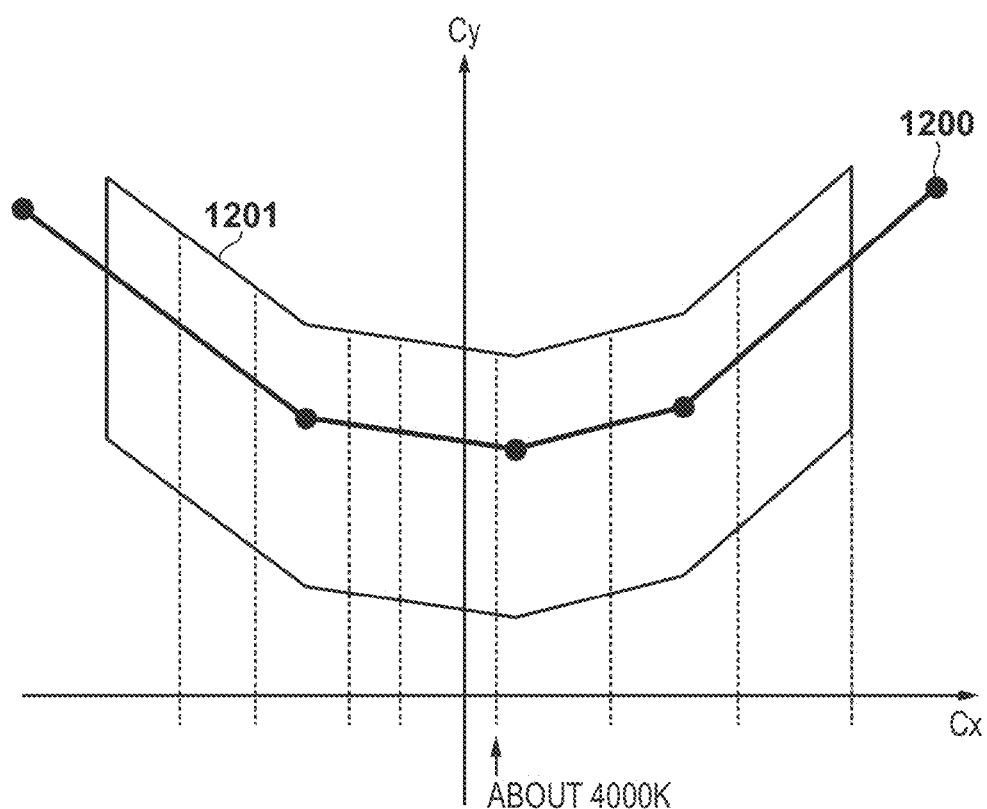
FIG. 13 is a graph showing a CxCy plane.

FIG. 13 shows a $C_x$-$C_y$ plane. As shown in FIG. 13, a white axis 1200 as a reference for detecting white can be obtained by capturing white in advance by the image capturing apparatus from a high color temperature (for example, daytime) to a low color temperature (for example, sundown), and plotting color evaluation values $C_x$ and $C_y$ on the coordinates. Since an actual light source has a slight white variation, the system control unit 50 gives widths to some extent to the two sides of the white axis 1200 (S1204). A frame obtained by thus widening the white axis is called a white search frame 1201.

In S1205, the system control unit 50 plots the DeBayered pixels in the $C_x$-$C_y$ coordinate system, and determines whether they exist in the white search frame. In S1206, the system control unit 50 performs a light/shade exclusion process of restricting pixels as integration targets in the luminance direction, among the pixels existing in the white search frame. This process is performed in order to prevent a decrease in the calculation accuracy of the white balance coefficients because a color that is too dark is easily affected by noise. Likewise, the process is performed in order to prevent a decrease in the calculation accuracy of the white balance coefficients because a color that is too bright breaks the balance of the R/G ratio or the B/G ratio due to sensor saturation of one of the channels and separates from the correct color. The luminance values of pixels as targets of the light/shade exclusion process are made different between SDR and HDR. That is, pixels to be used in the white balance coefficient calculation (to be described later) are made different between SDR and HDR. This is so because the reproducibility of a high-luminance region of HDR is higher than that of SDR. In this embodiment, brightness to, for example, +1 EV is a target on the bright side in SDR, whereas brightness to +2 EV is a target in HDR. This makes it possible to calculate white balance coefficients optimized for HDR.

In S1207, the system control unit 50 calculates integrated values SumR, SumG, and SumB of the color evaluation values from $C_x$ and $C_y$ existing in the white search frame and having undergone the light/shade exclusion process. Then, in S1208, the system control unit 50 calculates white balance coefficients $WBC_{OR}$, $WBC_{OG}$, and $WBC_{OB}$ by the following equations from the calculated integrated values.

$$WBCo_R = \frac{SumY \times 1024}{SumR}$$

$$WBCo_G = \frac{SumY \times 1024}{SumG}$$

$$WBCo_B = \frac{SumY \times 1024}{SumB}$$

$$SumY = \frac{(SumR + 2 \times SumG + SumB)}{4}$$

"1024" on the right-hand side of each equation indicates that one color component has an accuracy of 10 bits.

Note that as the white balance coefficients, it is possible to calculate values for a shooting mode (SDR shooting or HDR shooting) set by the user, or values for both SDR and HDR.

Figure 14A:
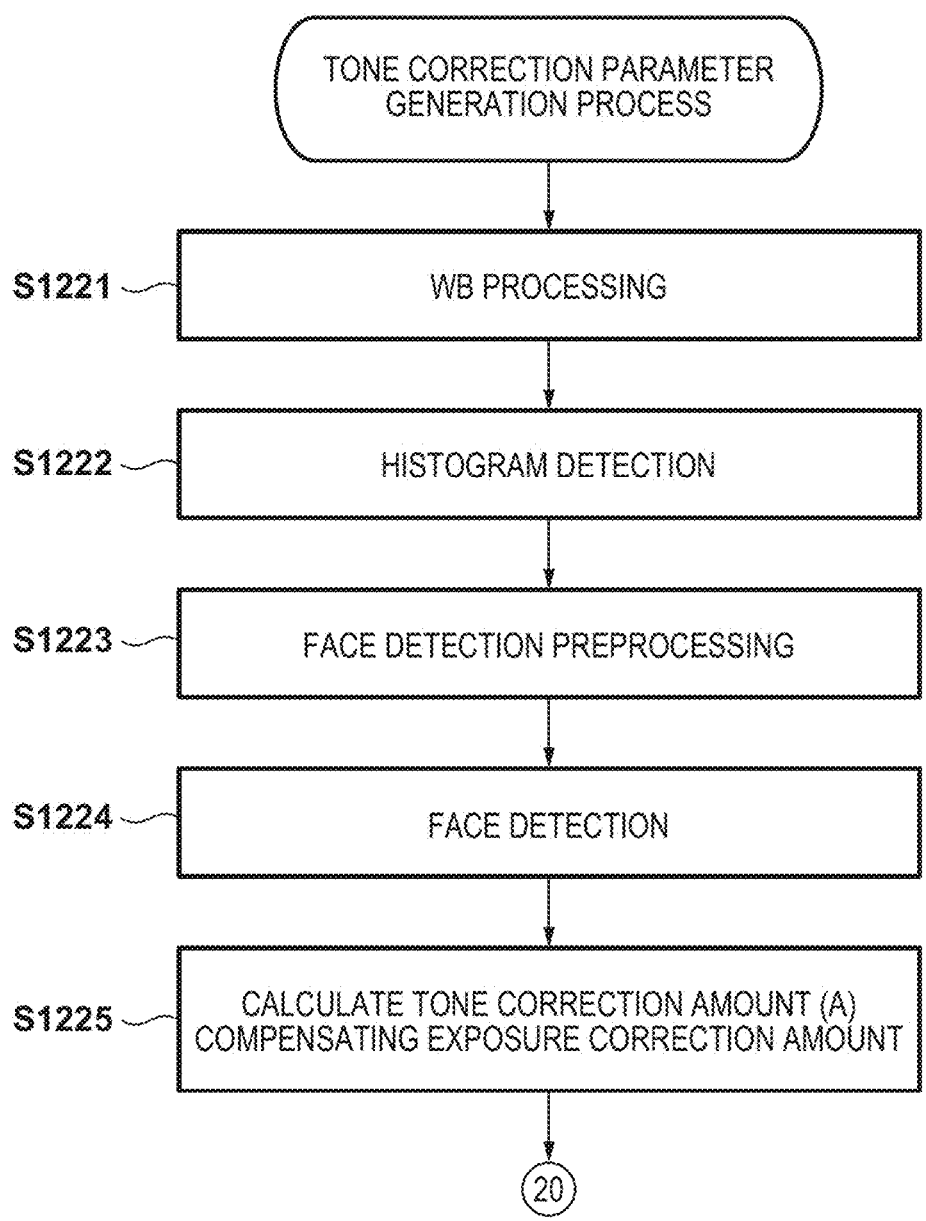
FIG. 14A is a flowchart of a tone correction parameter generation process.
Figure 14B:
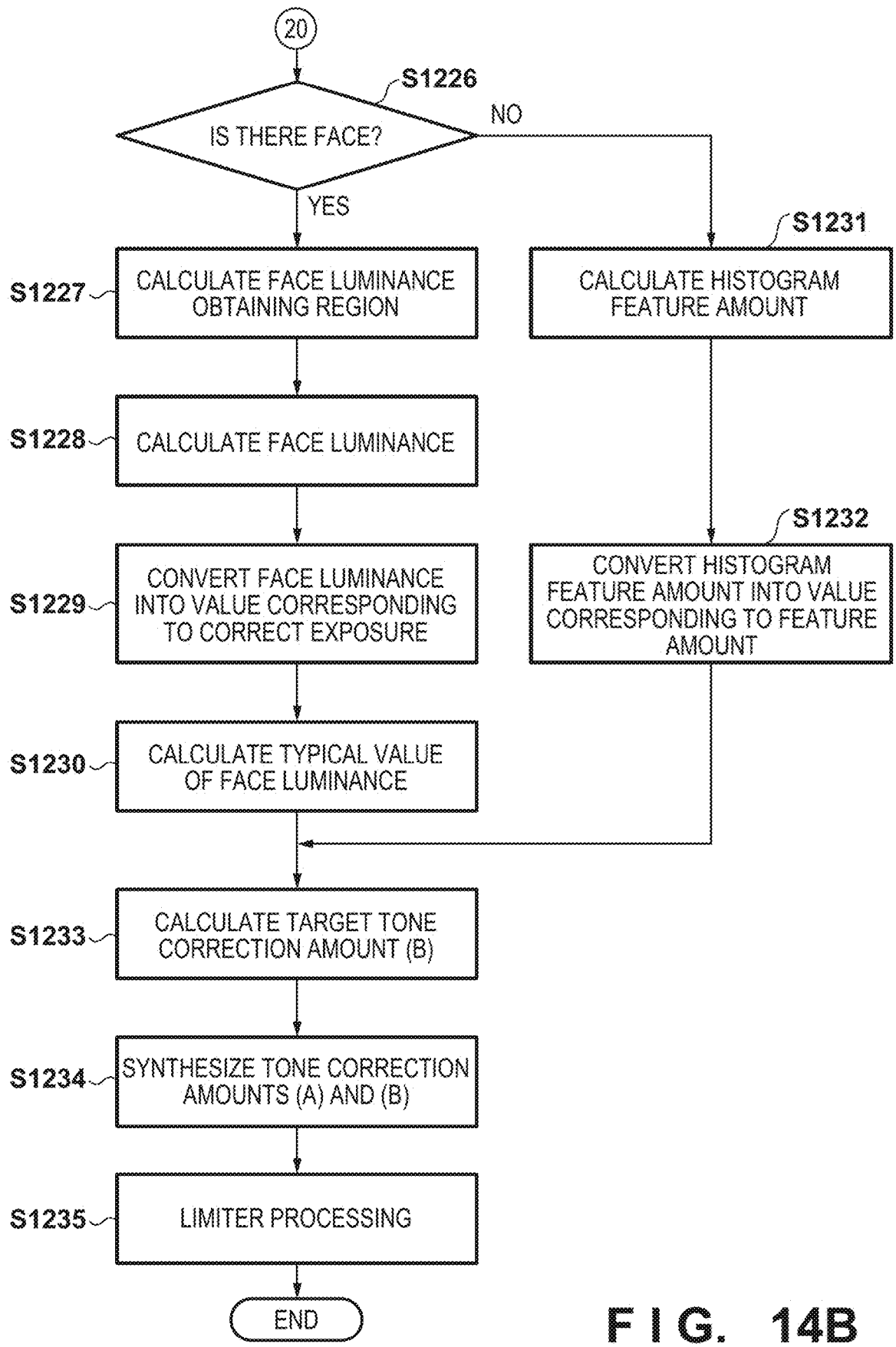
FIG. 14B is a flowchart of the tone correction parameter generation process.

The explanation will return to FIG. 7A. In S704 to S706, the system control unit 50 calculates a tone correction table necessary for a tone correction process. Details of tone correction will be explained with reference to flowcharts shown in FIGS. 14A and 14B.

In S1221, the system control unit 50 performs WB processing by using the WB coefficients generated by the processing in S701 to S703 of FIG. 7A. In S1222, the system control unit 50 performs histogram detection. More specifically, the system control unit 50 applies the white balance gain value obtained in S1221 to the whole image data, and generates a histogram as luminance information for pixel values having undergone a gamma correction process. The gamma correction process can be a method using a well-known lookup table, but it is preferable to use the same gamma characteristic as that to be used in development. However, a simplified gamma characteristic such as a gamma characteristic approximated by a line can also be used in order to save the processing time and the memory amount. Note that a portion at the end of an image is generally unimportant in many cases and is also affected by a decrease in marginal illumination depending on an image capturing lens, so a histogram may also be formed by excluding pixels in the peripheral portion.

In S1223, the system control unit 50 performs face detection preprocessing. This process makes faces easier to detect by performing a reduction process, gamma processing, and the like on image data. In S1224, the system control unit 50 executes a face detection process on the preprocessed image data by using a well-known method. In this face detection process, it is possible to obtain the position and size of a face-like region (face region), and the reliability of detection.

In S1225, the system control unit 50 calculates a tone correction amount (tone correction amount (A)) for compensating for an exposure correction amount (decrease amount), as a first tone correction amount. In this step, the system control unit 50 calculates a tone correction amount having input/output characteristics by which a dark portion of the image is correctly exposed and a high-luminance pixel having a predetermined luminance level or more is not corrected (at least the exposure correction amount is not completely compensated for). This makes it possible to further suppress highlight detail loss of a bright portion having undergone the tone correction. This tone correction amount can be prepared as a plurality of correction tables corresponding to exposure correction amounts.

In S1226, the system control unit 50 determines that a face is detected if there is a face region having reliability higher than a preset evaluation threshold, among the face regions detected by the face detection process in S1224. The system control unit 50 advances the process to S1227 if it is determined that a face is detected, and advances the process to S1231 if it is determined that no face is detected.

In S1227, the system control unit 50 calculates a partial region of the detected face region as a face luminance obtaining region. The face luminance obtaining region is a region for obtaining the luminance of a bright portion of the face, and the number, the positions, and the like of the regions are not particularly limited. In S1228, the system control unit 50 calculates, for each of the face luminance obtaining regions, the average value of each type of R, G, and B pixels contained in the region. In addition, the system control unit 50 performs gamma correction on each average value of the R, G, and B pixels by applying the white balance gain value in the same manner as in histogram detection, and converts the result into a luminance value Y by the following equation.

$$Y = 0.299 \times R + 0.587 \times G + 0.114 \times B$$

Note that as the white balance gain value to be applied in the histogram detection and the face detection, it is preferable to use the gain value used in the WB processing for the same image data. It is also ideally preferable to use the same luminance gamma as that to be used in development, but a simplified gamma characteristic such as a gamma characteristic approximated by a line may also be used in order to save the processing time and the memory amount.

In S1229, the system control unit 50 converts the luminance value obtained for each face luminance obtaining region in S1228 into a value corresponding to correct exposure. This is a process of correcting the luminance of the face, which is detected to be lower than that when the image is captured by correct exposure because the image data is captured by exposure lower than correct exposure. The conversion of the luminance value can be performed so as to compensate for the exposure correction amount (decrease amount) determined by exposure control, and can also be performed by using the tone correction amount calculated in S1225.

In S1230, the system control unit 50 calculates a typical value of the detected face luminance values. As the typical value, it is possible to, for example, obtain a maximum value of the luminance values in each face luminance obtaining region of the detected face region.

The processing in S1231 is performed when the system control unit 50 determines in S1226 that no face region is detected. In S1231, the system control unit 50 detects a histogram feature amount. The histogram feature amount can be, for example, a level (SD) to which a pixel having a cumulative frequency of 1% from a dark portion side belongs, or a level (HL) to which a pixel having a cumulative frequency of 1% from a bright portion side belongs. Subsequently, in S1232, the system control unit 50 converts the histogram feature amount calculated in S1231 into a value corresponding to image capturing by correct exposure. This is a process of correcting a histogram feature amount detected to be lower than that when the image is captured by correct exposure because the image data is captured by exposure lower than correct exposure. The conversion of the luminance value can be performed so as to compensate for the exposure correction amount (decrease amount) determined by exposure control, and can also be performed by using the tone correction amount calculated in S1225.

In S1233, the system control unit 50 calculates a target correction amount. The system control unit 50 calculates a typical luminance value of the face or a target luminance level with respect to the histogram feature amount. Then, the system control unit 50 generates a lookup table (input/output characteristics) defining an output luminance level with respect to an input luminance level, as a tone correction amount (B), by using spline interpolation from the target luminance levels and minimum and maximum values of the luminance in the image data. The tone correction amount (B) is a second tone correction amount.

Figure 15A:
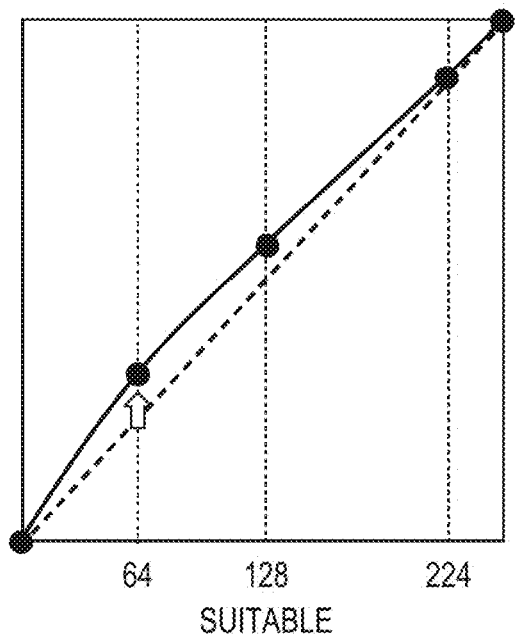
FIG. 15A is a graph showing a tone correction amount.
Figure 15B:
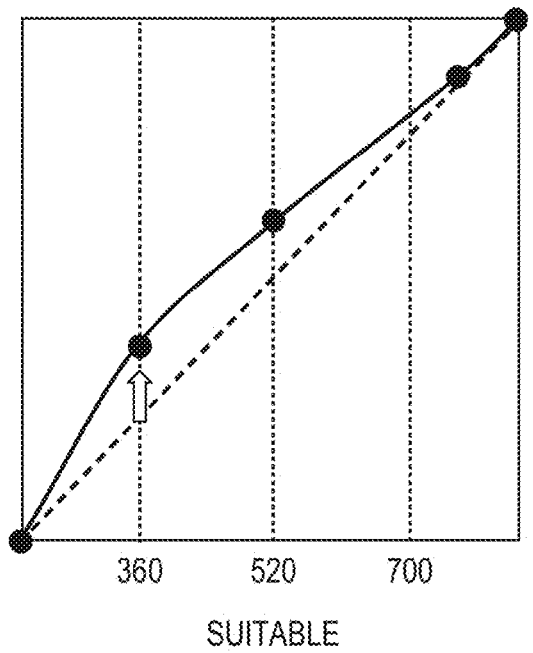
FIG. 15B is a graph showing the tone correction amount.
Figure 16A:
FIG. 16A is a view showing an example of the appearance of SDR.
Figure 16B:
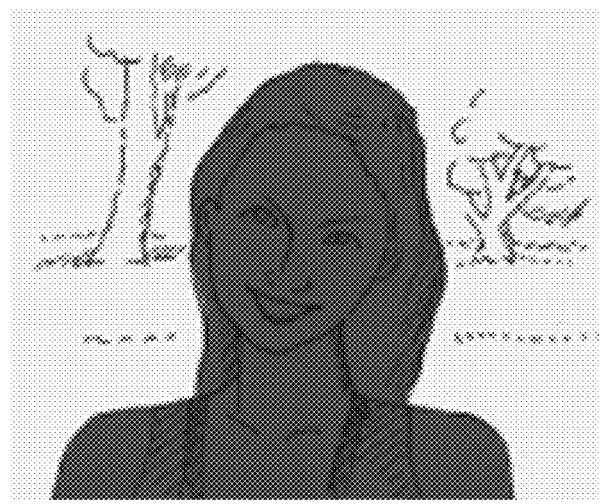
FIG. 16B is a view showing an example of the appearance of HDR.

The target tone correction amount of HDR can be different from that of SDR. For example, FIG. 16A shows the appearance of SDR, and FIG. 16B shows the appearance of HDR. Although the luminance values of an object (person) are the same, the background is at most 100 dc/m$^2$ in SDR but exceeds 100 cd/m$^2$ in HDR. Consequently, the object sometimes looks darker in HDR although the luminance values of the object are the same. This is called lightness contrast, and is a phenomenon caused by the human visual performance. For example, the luminance values of the object are the same in FIGS. 16A and 16B, but the difference between the object luminance and the background luminance in FIG. 16B is larger than that in FIG. 16A. In this case, the user feels that the object in FIG. 16B is darker than that in FIG. 16A. That is, HDR can express a high-luminance region such as the sky more brightly, and this increases the possibility that the object looks darker than that in SDR. In this embodiment, therefore, a tone characteristic as shown in FIG. 15A is used in the case of SDR. In the case of HDR, however, a tone correction amount that raises a dark portion is applied by using a tone characteristic as shown in FIG. 15B, and as a consequence a favorable appearance can be obtained. Note that the tone correction of this embodiment is explained by taking correction for compensating for insufficient exposure as an example. However, similar tone correction can be performed in brightness correction for the purpose of image making.

The target luminance levels with respect to the typical luminance value of the face and the histogram feature amount of image data can be set at experientially probably favorable fixed values. However, it is also possible to set different target luminance levels in accordance with the typical luminance value and the value of the histogram feature amount. In this case, a lookup table defining the relationship between an input level and the target luminance level can be prepared for each of the parameters (the typical luminance value and the histogram feature amount) for which the target luminance level is set.

A correction characteristic for implementing conversion to the target luminance level defined as described above is obtained by a method such as spline interpolation, and, if necessary, is saved as a lookup table (or a relational expression) to which the tone correction amount (B) is applied.

In S1234, the system control unit 50 synthesizes the tone correction amount (A) calculated in S1225 and the tone correction amount (B) calculated in S1233. For example, the system control unit 50 first applies the tone correction amount (A) to each input luminance level, and then applies the tone correction amount (B) to the corrected luminance level, thereby obtaining the resultant luminance value and forming a lookup table of an output luminance value with respect to each input luminance level.

In S1235, the system control unit 50 performs a process (limiter processing) of limiting the upper limit of the synthetic correction amount (synthetic tone correction amount) obtained in S1234. Synthesizing the tone correction amount (A) and the tone correction amount (B) increases the correction amount and makes the noise amount conspicuous in the corrected image, so the whole correction amount is limited. The limiter processing can be implemented by preparing a maximum correction amount permitted for each luminance value in the form of a table, and replacing an output level exceeding the maximum correction amount, among the values in the lookup table formed in S1234, with an output level corresponding to the maximum correction amount. Note that as the tone correction amount, it is possible to calculate a value for a shooting mode (SDR shooting or HDR shooting) set by the user, or values for both SDR and HDR.

The explanation will return to FIGS. 7A and 7B. In S707, the system control unit 50 performs development by using the calculated white balance coefficients, tone correction parameters, and various HDR parameters. An HDR developed image is generated by using, for example, a color matrix, camera OETF curve data, color adjustment parameters, noise reduction parameters, and sharpness parameters, as other development parameters. As an example of the camera OETF (gamma curve), the reverse characteristic of EOTF (Electro-Optical Transfer Function) of PQ (Perceptual Quantization) of the recommendation BT.2100 of ITU-R is assumed. However, it is also possible to combine OOTF (Opto-Optical Transfer Function) as the taste on the camera side. Alternatively, OETF of HLG (Hybrid Log-Gamma) of the same recommendation BT.2100 of ITU-R can be used.

In S708, the system control unit 50 generates an MPF (Multi Picture Format) image for simple display such as a two-screen comparison image by resizing the image developed in S707, and compression-encodes the generated image by the HEVC format.

In S709, the system control unit 50 further resizes the MPF image generated in S708, thereby generating a thumbnail image for index display or the like having the number of pixels smaller than that of the MPF image, and compresses the generated image.

In S710, the system control unit 50 compresses the HDR image developed in S707 as a main image. Various methods can be used in this compression. For example, 10-bit YUV422 data can be compressed by H.265 (ISO/IEC 23008-2 HEVC).

In S711, the system control unit 50 determines the recording image quality set by the user. The system control unit 50 advances the process to S712 if it is determined that the setting records only a RAW image, advances the process to S713 if it is determined that the setting records only an HDR image, and advances the process to S714 if it is determined that the setting records a RAW image and an HDR image.

In S712, the system control unit 50 generates a RAW image file having a structure as shown in FIG. 8A by compressing the RAW image and adding a header, and records the file on the recording medium 200 via the recording medium I/F 18. Several methods can be used as the compression method, and it is possible to use, for example, degradation-free reversible lossless compression or lossy compression that is irreversible but reduces the file size. Also, the white balance intra-white-search-frame determination result obtained in S1205, the histogram obtained in S704, and the face detection result obtained in S705 are recorded in the header. The intra-white-search-frame determination result to be detected herein is the determination result before the light/shade exclusion process is performed in S1206. Accordingly, the same determination result is recorded in both HDR shooting and SDR shooting. In addition, when the user has set the HDR shooting mode, HDR development parameters such as the white balance coefficients obtained in FIG. 12 and the tone correction amounts obtained in FIGS. 14A and 14B, and the MPF image for display generated in S708 by encoding the HDR-developed image data by the HEVC format, are also recorded as metadata as shown in FIG. 8C. As described previously, the contents of these data change in accordance with whether the shooting mode is HDR shooting or SDR shooting. Note that in SDR shooting, development parameters obtained by using the above-described intra-white-search-frame determination and tone characteristics for SDR are recorded. Note that even when performing HDR shooting, it is possible to generate SDR development parameters by performing the processing in S702 to S706 for SDR, and record the both parameters. Note also that the processing load increases when generating the development parameters for both HDR and SDR, so this process can also be performed when the processing load relatively has a margin such as when performing not continuous shooting but single shooting.

When the processing load has a margin such as when performing single shooting, it is also possible to generate an SDR-quality main image, MPF image, and thumbnail image by using SDR development parameters, in addition to an HDR display image, and record the HDR display image and the SDR display image in the same file (FIG. 8D).

When displaying a thumbnail image, the image is small, so the type of the image need only be recognizable. Therefore, it is possible to form and save only a thumbnail image as an SDR developed image in S709 (FIG. 8E). In an arrangement like this, a display device or a PC that does not correspond to decoding of H.265 as an HDR compression method can display only a thumbnail image.

In S713, the system control unit 50 adds static or dynamic metadata by compression-encoding the developed HDR image by the HECV format, and records encoded image as an HEIF (High Efficiency Image File Format) file on the recording medium 200 via the recording medium I/F 18. Examples of the static metadata are the three primary colors and the x and y coordinates of white points of a display complying with CEA-861.3, and the maximum light value, the minimum light value, the maximum content light level, and the maximum frame-average light level of a mastering display. An example of the dynamic metadata is dynamic tone mapping metadata of color volume conversion defined by SMPTE ST 2094. Note that a depth of 10 bits or more is preferable when expressing the HDR characteristic by a PQ signal. Since, however, the conventional JPEG format has only 8 bits, it is necessary to adopt a new container for still image HDR. This embodiment uses a container of HEIF as an image file format developed by MPEG (Moving Picture Experts Group) and defined by MPEG-H Part 12 (ISO/IEC 23008-12). HEIF has the feature that it can store, in one file, not only a main image but also a thumbnail, a plurality of temporally related images, and metadata such as EXIF or XMP. This makes HEIF convenient because a 10-bit image sequence encoded by HEVC can also be stored.

In S714 and S715, the processes in S712 and S713 are sequentially performed, thereby recording both the RAW image and the HDR image.

FIG. 8A shows the structure of the RAW image file of the still RAW image data to be recorded on the recording medium 200 in the above-described recording process. The container file format of the RAW image file to be explained below is an ISO base media file format defined by ISO/IEC14496-12. Accordingly, the container format of this file has a tree structure and has nodes each of which is called a box. Also, each box can have a plurality of boxes as child elements.

A RAW image data file 801 has a box ftyp 802 for describing the file type at the head, and further has a box moov 803 containing all metadata, a box mdat 808 of a track media data main body (image data), and a box 807 for others. The box moov 803 has, as child elements, a box uuid 804 for storing MetaData 805, and a trak box 806 for storing information that refers to ImageData. The MetaData 805 describes metadata of an image, for example, the formation date/time of the image, the shooting conditions, information indicating whether shooting is performed by HDR or SDR, the above-described detection metadata, and other shooting information. The box mdat 808 has ImageData 809 as captured still image data, as a child element.

Note that image data to be recorded in the ImageData 809 of a RAW image captured by SDR differs from that of a RAW image captured by HDR.

Figure 8B:
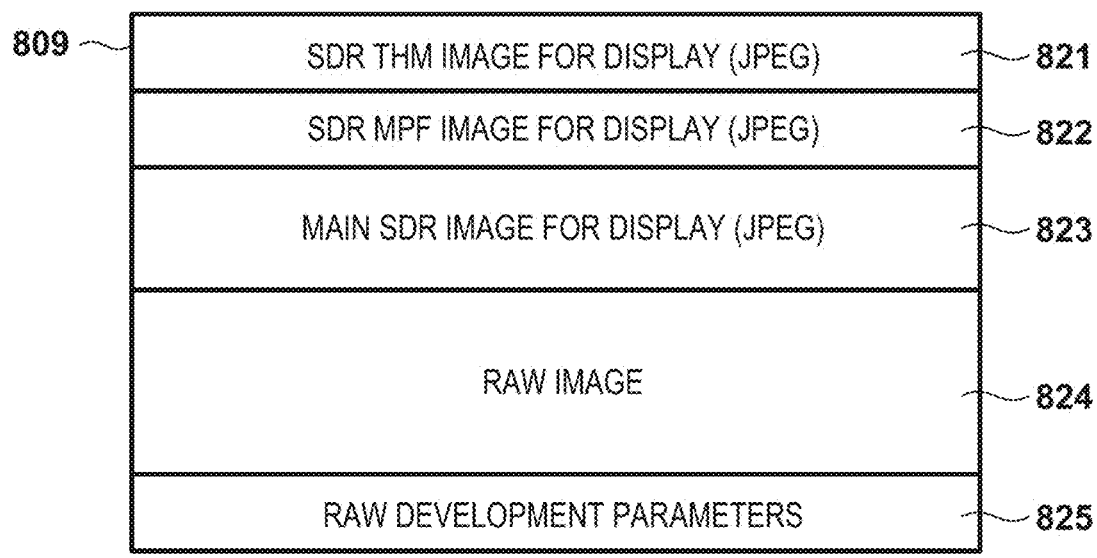
FIG. 8B is a view showing an example of an ImageData region in the RAW file.
Figure 8C:
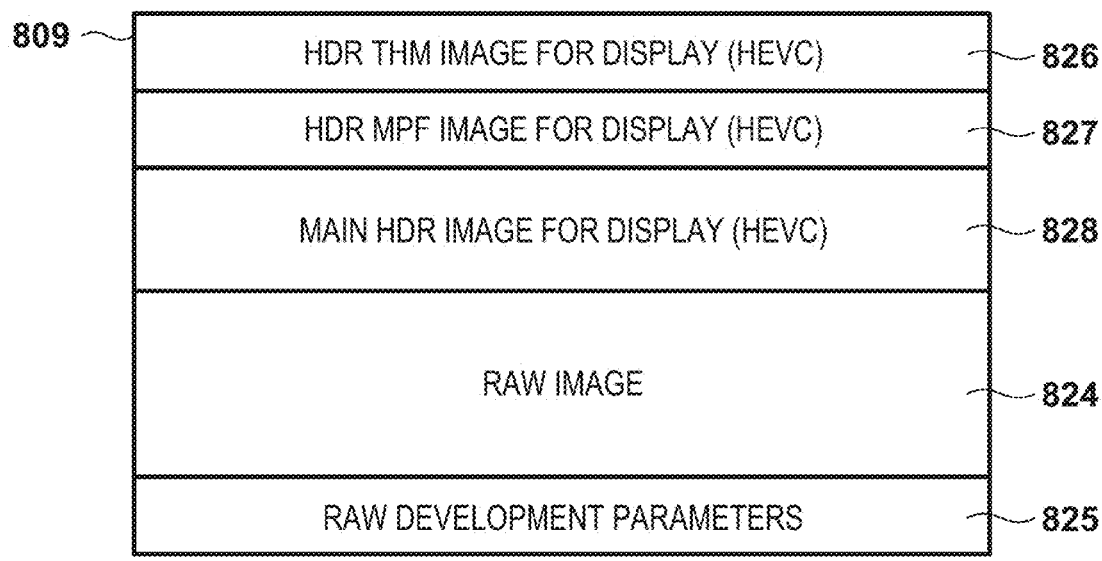
FIG. 8C is a view showing an example of the ImageData region in the RAW file.

FIG. 8B shows ImageData 809 to be recorded in a RAW image captured by SDR. The ImageData 809 shown in FIG. 8B has a THM image 821, an MPF image 822, and a main image 823, each of which is developed by the SDR image quality and compressed by JPEG, a RAW image 824, and RAW development parameters 825. Each SDR-quality image is an image in which each color component has 8 bits (256 tones). Note that the RAW development parameters 825 shown in FIG. 8B include at least a development parameter for SDR development.

FIG. 8C shows ImageData 809 to be recorded in a RAW image having only an HDR image as a display image when shooting is performed by HDR. The ImageData 809 shown in FIG. 8C has a THM image 826, an MPF image 827, and a main image 828, each of which is developed by the HDR image quality and compressed by HEVC, a RAW image 824, and RAW development parameters 825. Each HDR-quality image is an image in which each color component has 10 bits (1,024 tones). The RAW development parameters 825 shown in FIGS. 8C, 8D, and 8E have at least a development parameter for HDR development.

FIG. 8D shows ImageData 809 to be recorded in a RAW image having both an HDR image and an SDR image as display images when shooting is performed by HDR. The ImageData 809 shown in FIG. 8D has a THM image 821, an MPF image 822, and a main image 823, each of which is developed by the SDR image quality and compressed by JPEG, a THM image 826, an MPF image 827, and a main image 828, each of which is developed by the HDR image quality and compressed by HEVC, a RAW image 824, and RAW development parameters 825.

FIG. 8E shows ImageData 809 to be recorded in a RAW image having only a THM image as an SDR image and an MPF image and a main image as HDR-quality display images when shooting is performed by HDR. The ImageData 809 shown in FIG. 8E has a THM image 821 developed by the SDR image quality and compressed by JPEG, an MPF image 827 and a main image 828, each of which is developed by the HDR image quality and compressed by HEVC, a RAW image 824, and RAW development parameters 825.

Each file format explained in this example is one embodiment, and may also have other boxes as needed. In addition, a display image may also be stored in a box of the moov 803 or in the box 807 of others.

Since the file formats as described above are used, development parameters for an SDR image are recorded in a RAW image file captured as SDR, and development parameters for an HDR image are recorded in a RAW image file captured as HDR. Even when developing a RAW image later, therefore, the development can be performed by reflecting the settings of shooting. For example, an apparatus for performing RAW development (this apparatus can be the digital camera 100 and can also be another apparatus such as a PC) refers to the MetaData 805 of the RAW image, and determines whether the image is captured as HDR or SDR. If it is determined that the RAW image is captured as HDR, the RAW image is developed as an HDR image by using development parameters for an HDR image contained in the file. If it is determined that the RAW image is captured as SDR, the RAW image is developed as an SDR image by using development parameters for an SDR image contained in the file. To make processing like this possible, the digital camera 100 records development parameters for an SDR image in a RAW image file captured as SDR, and records development parameters for an HDR image in a RAW image file captured as HDR. Note that an apparatus for performing RAW development can record a still HDR image developed by using the HEIF container described above.

Furthermore, the same determination result is recorded as detection metadata for both HDR shooting and SDR shooting. Accordingly, even a RAW image file captured by the HDR shooting mode can be developed as an SDR image by using the recorded detection data. Therefore, even an apparatus that supports only an SDR image can appropriately display a RAW image file captured by the HDR shooting mode.

Figure 9A:
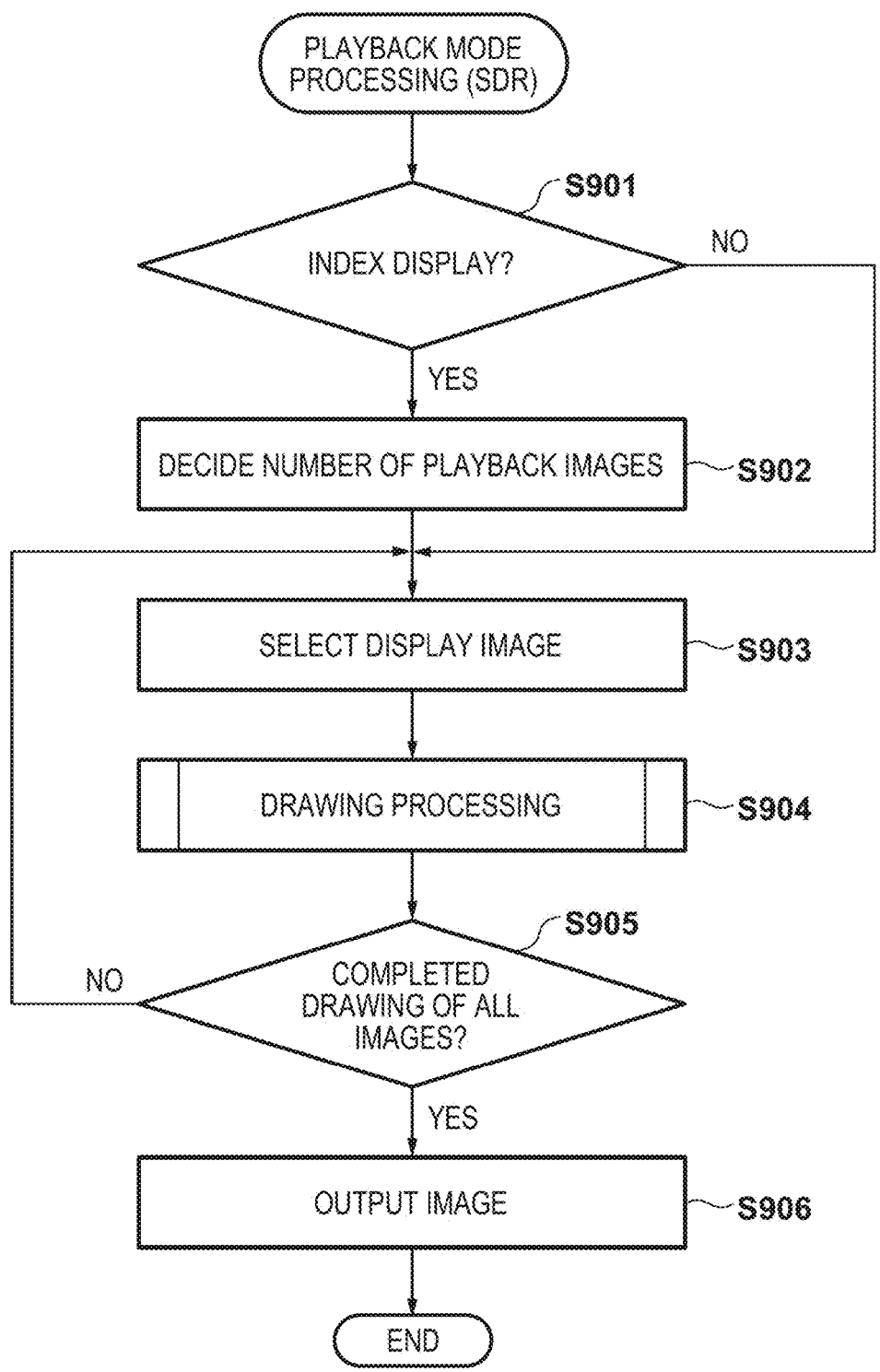
FIG. 9A is a flowchart of playback mode processing according to the embodiment.

FIG. 9A is a flowchart showing details of playback mode processing using the display unit 28 of the system control unit 50. This processing is implemented by deploying a program recorded in the nonvolatile memory 56 in the system memory 52, and executing the program by the system control unit 50.

In S901, the system control unit 50 determines whether playback is index playback or normal playback. If it is determined in S901 that playback is index playback, the system control unit 50 advances the process to S902. In S902, the system control unit 50 decides the number of images to be played back.

In S903, the system control unit 50 decides an image to be played back. In S904, the system control unit 50 performs a process of drawing the image to be played back.

In S905, the system control unit 50 determines whether drawing of all images to be displayed is complete. If it is determined that the drawing is incomplete, the system control unit 50 returns the process to S903 and continues the drawing process. If it is determined that the drawing process is complete, the system control unit 50 advances the process to S906. In S906, the system control unit 50 performs an image output process of S906 on the display unit 28, and terminates the displaying process. After that, the system control unit 50 performs an operation accepting process.

Figure 9B:
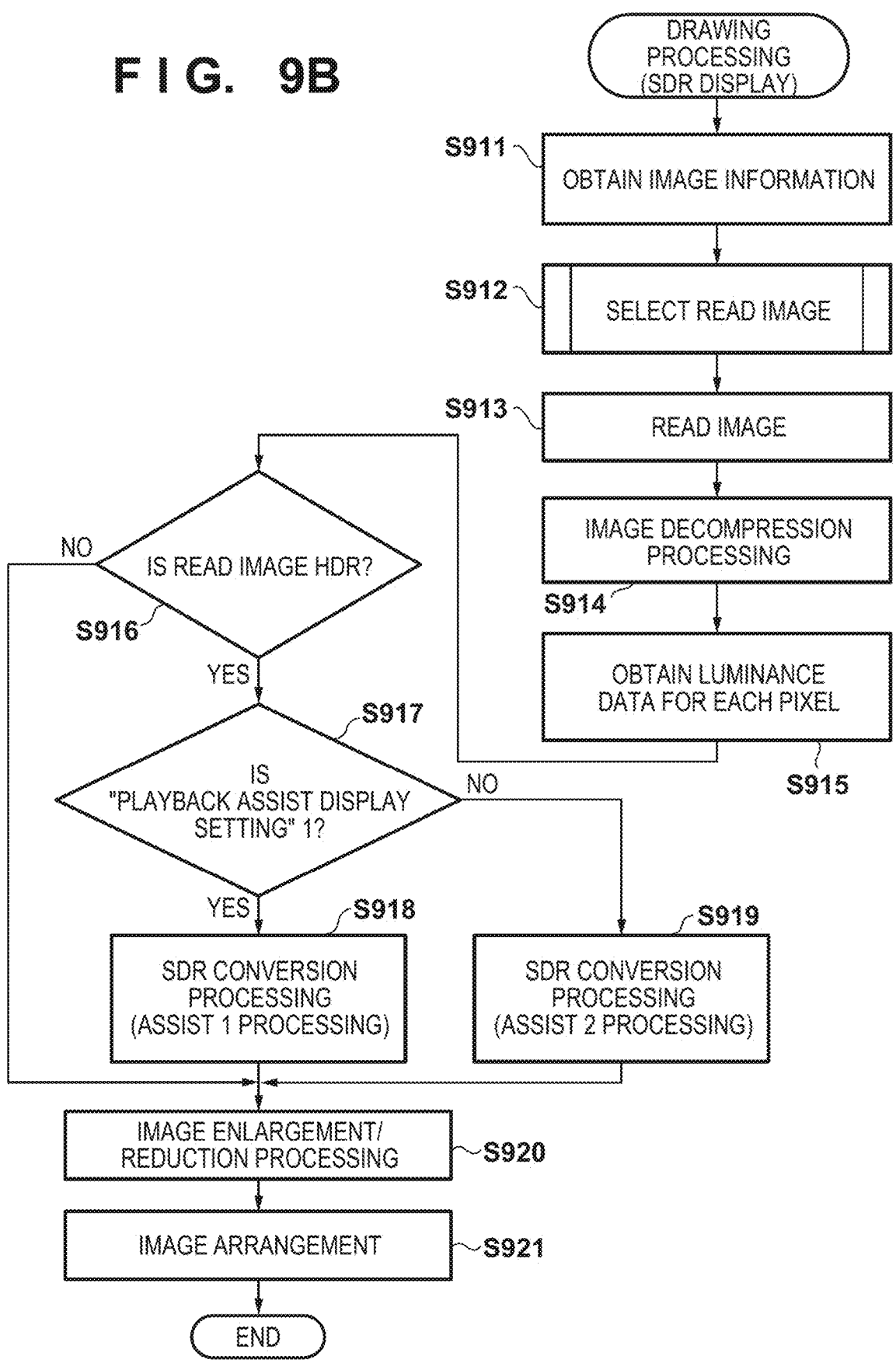
FIG. 9B is a flowchart of the playback mode processing according to the embodiment.
Figure 9C:
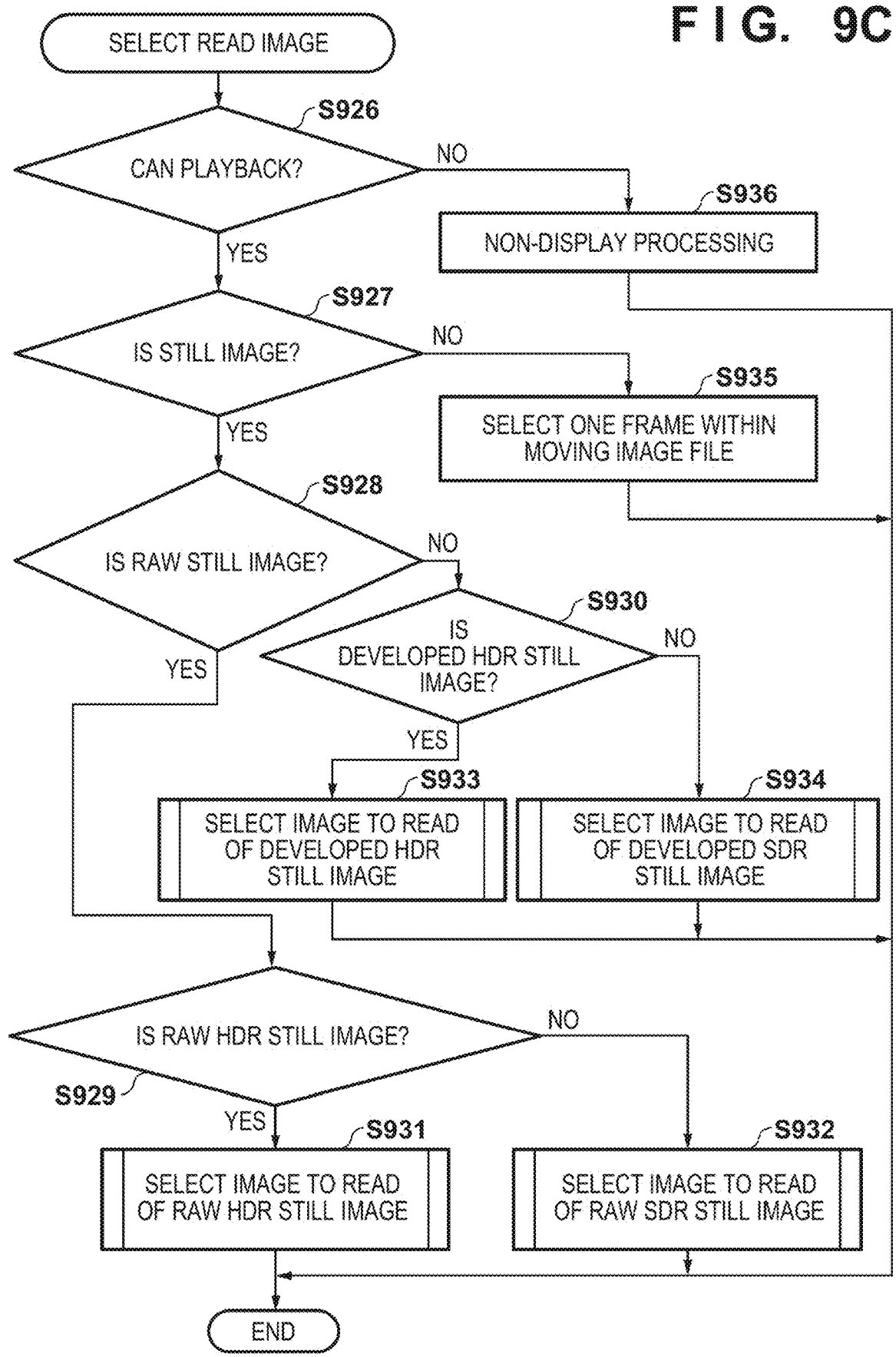
FIG. 9C is a flowchart of the playback mode processing according to the embodiment.

FIG. 9B is a flowchart showing details of the drawing process in the playback mode processing using the display unit 28 of the system control unit 50.

In S911, the system control unit 50 obtains information of an image to be played back. In S912, the system control unit 50 decides an image to be played back. In S913, the system control unit 50 reads out the image to be played back from the recording medium 200. In S914, the system control unit 50 performs a process of decompressing the image to be played back. In S915, the system control unit 50 collects data of each pixel from the image data having undergone the decompression process in S914. This image data is luminance data or the like, and is used in histogram processing or a highlight warning process.

In S916, the system control unit 50 determines whether the image to be played back is an HDR image or an SDR image. The system control unit 50 advances the process to S917 if it is determined that the image to be played back is an HDR image, and advances the process to S920 if it is determined that the image to be played back is an SDR image. In S917, the system control unit 50 checks the HDR assist display setting for playback. The system control unit 50 advances the process to S918 if assist 1 is set, and advances the process to S919 if assist 2 is set. In S918, the system control unit 50 performs an HDR→SDR conversion process in accordance with the setting of assist 1 on the image decompressed in S914. In S919, the system control unit 50 performs the HDR→SDR conversion process in accordance with the setting of assist 2 on the image decompressed in S914.

In S920, the system control unit 50 performs a process of increasing or decreasing the size of the image decompressed in S914, or the image having undergone the SDR conversion process in S918 or S919, to a size suitable for the display unit 28. Then, in S921, the system control unit 50 decides the placement of the generated image, and terminates the drawing process.

FIGS. 9C to 9H are flowcharts showing details of a read target image selection process of the system control unit 50.

In S926, the system control unit 50 checks information of the obtained image and determines whether the image can be played back. The system control unit 50 advances the process to S927 if it is determined that the image can be played back, and advances the process to S936 if it is determined that the image cannot be played back.

In S927, the system control unit 50 determines whether the image to be played back is a still image. The system control unit 50 advances the process to S928 if it is determined that the image to be played back is a still image, and advances the process to S935 if not.

In S928, the system control unit 50 determines whether the image to be played back is a RAW image. The system control unit 50 advances the process to S929 if it is determined that the image to be played back is a RAW image, and advances the process to S930 if not.

In S929, the system control unit 50 determines that the RAW image is a RAW image captured by HDR or a RAW image captured by SDR. The system control unit 50 performs this determination by using the metadata in the RAW file explained with reference to FIGS. 8A to 8E. The system control unit 50 advances the process to S931 if it is determined that the RAW image is a RAW image captured by HDR, and advances the process to S932 if it is determined that the RAW image is an SDR image.

In S930, the system control unit 50 determines whether the still image that is found to be not a RAW image is an image captured by HDR or an image captured by SDR. In this embodiment, an image captured by HDR is recorded by HEIF, and an image captured by SDR is recorded by JPEG, so whether an image is an HDR image or an SDR image is determined by whether the format is HEIF or JPEG. However, it is also possible to determine whether an image is an HDR image or an SDR image by using metadata in HEIF.

In S931, the system control unit 50 selects image data to be used in playback from the RAW image captured by HDR. In S932, the system control unit 50 selects image data to be used in playback from the RAW image captured by SDR. In S933, the system control unit 50 selects image data to be used in playback from the still image developed by HDR. In S934, the system control unit 50 selects image data to be used in playback from the still image captured by SDR. In S935, the system control unit 50 selects image data to be displayed from a moving image file. In S936, the system control unit 50 performs playback image non-display processing. In this processing, information indicating that the image is not playable is displayed in order to notify the user that the image cannot be played back.

Figure 9D:
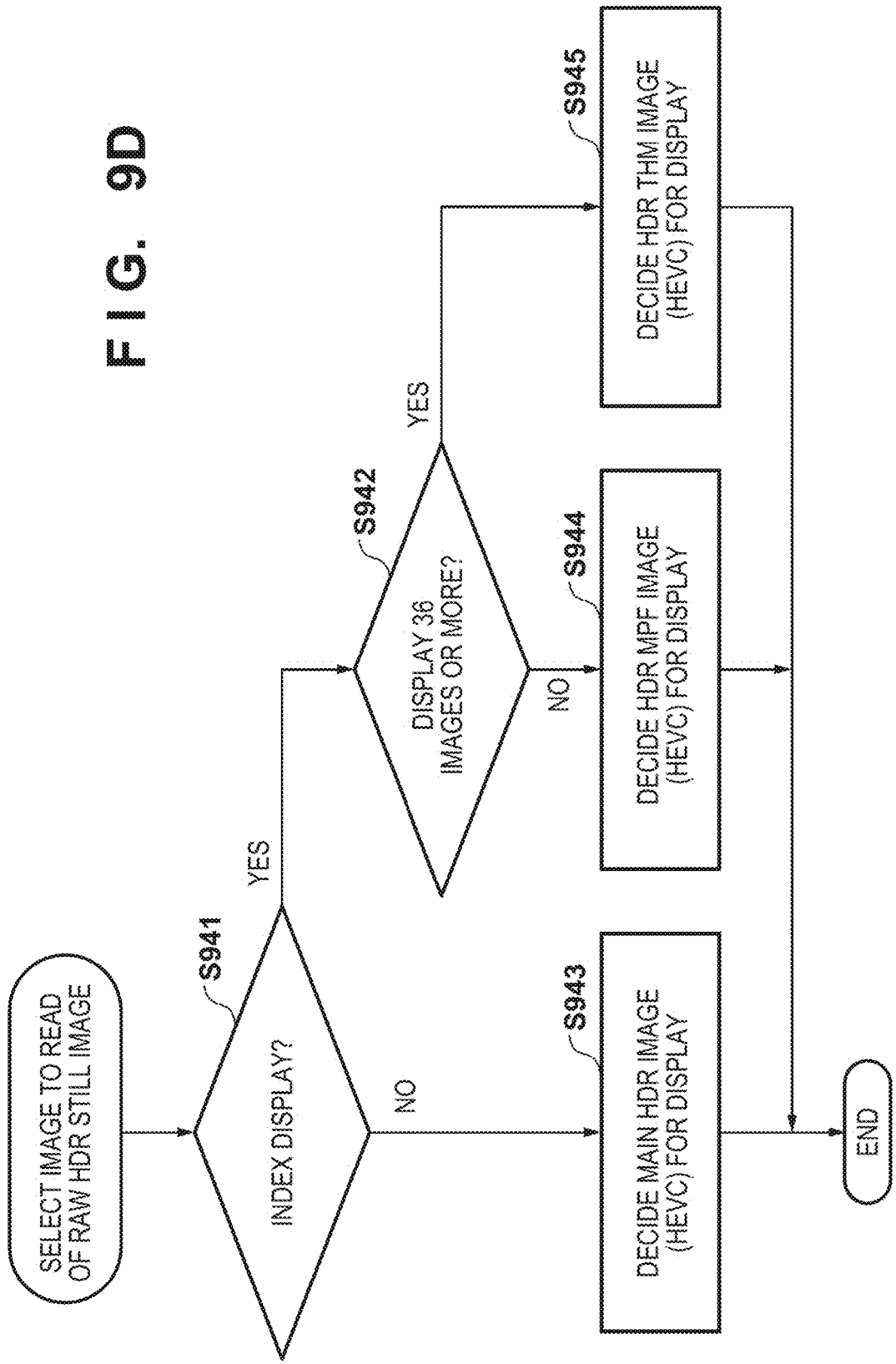
FIG. 9D is a flowchart of the playback mode processing according to the embodiment.

FIG. 9D is a flowchart by which the system control unit 50 selects image data to be used in playback from the RAW image captured by HDR.

In S941, the system control unit 50 determines whether playback is index playback or normal playback. The system control unit 50 advances the process to S942 if it is determined that the playback is index playback, and advances the process to S943 if it is determined that the playback is normal playback.

In S942, the system control unit 50 determines image data to be used in accordance with the number of images to be played back by index playback. Although the threshold value is 36 in this embodiment, this number is merely an example, so the number can be set by the user and can also be decided depending on the size of the display unit 28. The system control unit 50 advances the process to S945 if it is determined that the number of images to be displayed is 36 or more, and advances the process to S944 if it is determined that the number is less than 36.

In S943, the system control unit 50 decides "HDR main image (HEVC) for display" (828) as the image data to be used in playback. In S944, the system control unit 50 decides "HDR MPF image (HEVC) for display" (827) as the image data to be used in playback. In S945, the system control unit 50 decides "HDR THM image (HEVC) for display" (826) as the image data to be used in playback.

Figures 1, 9E:
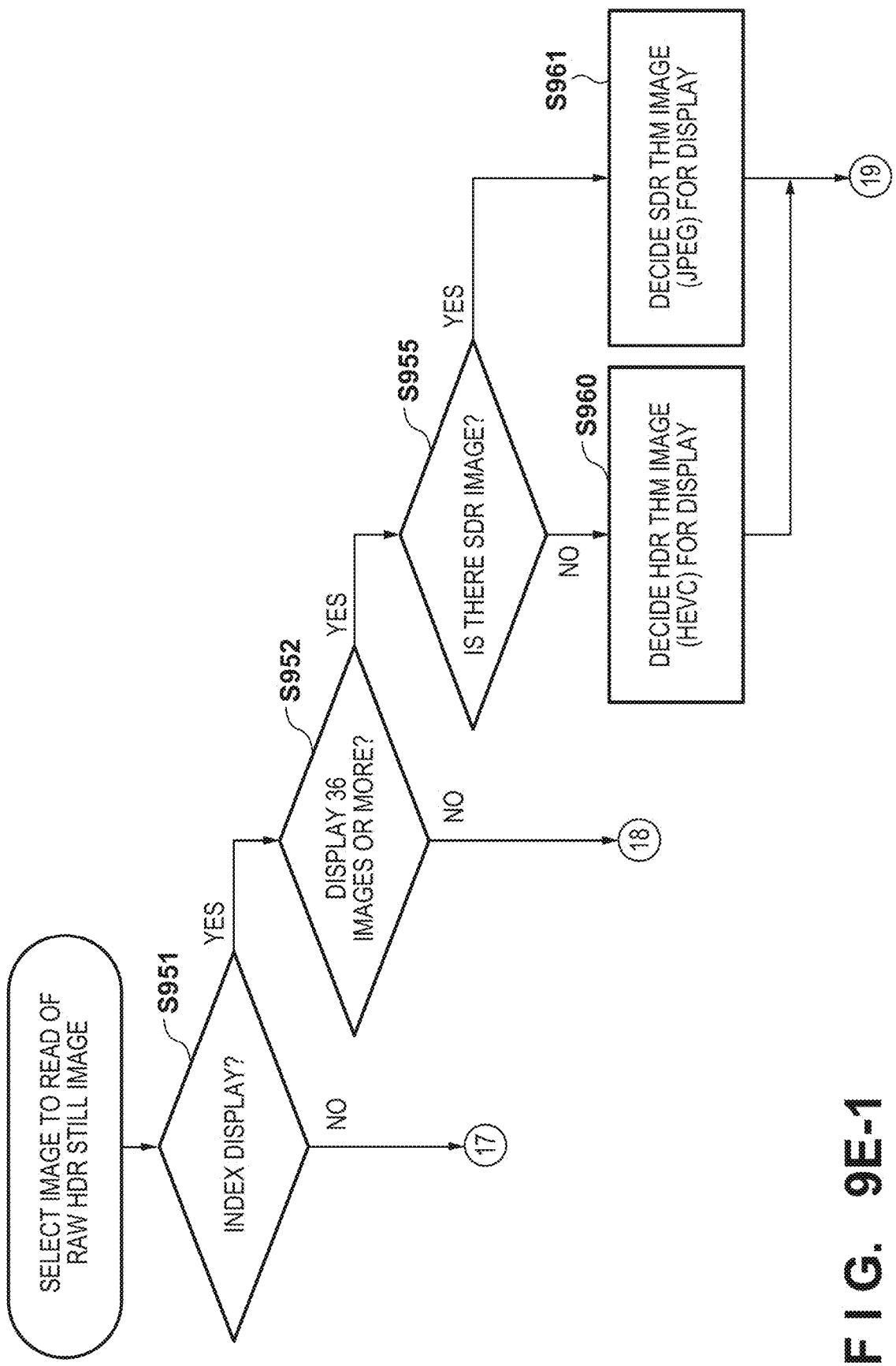
Figures 2, 9E:
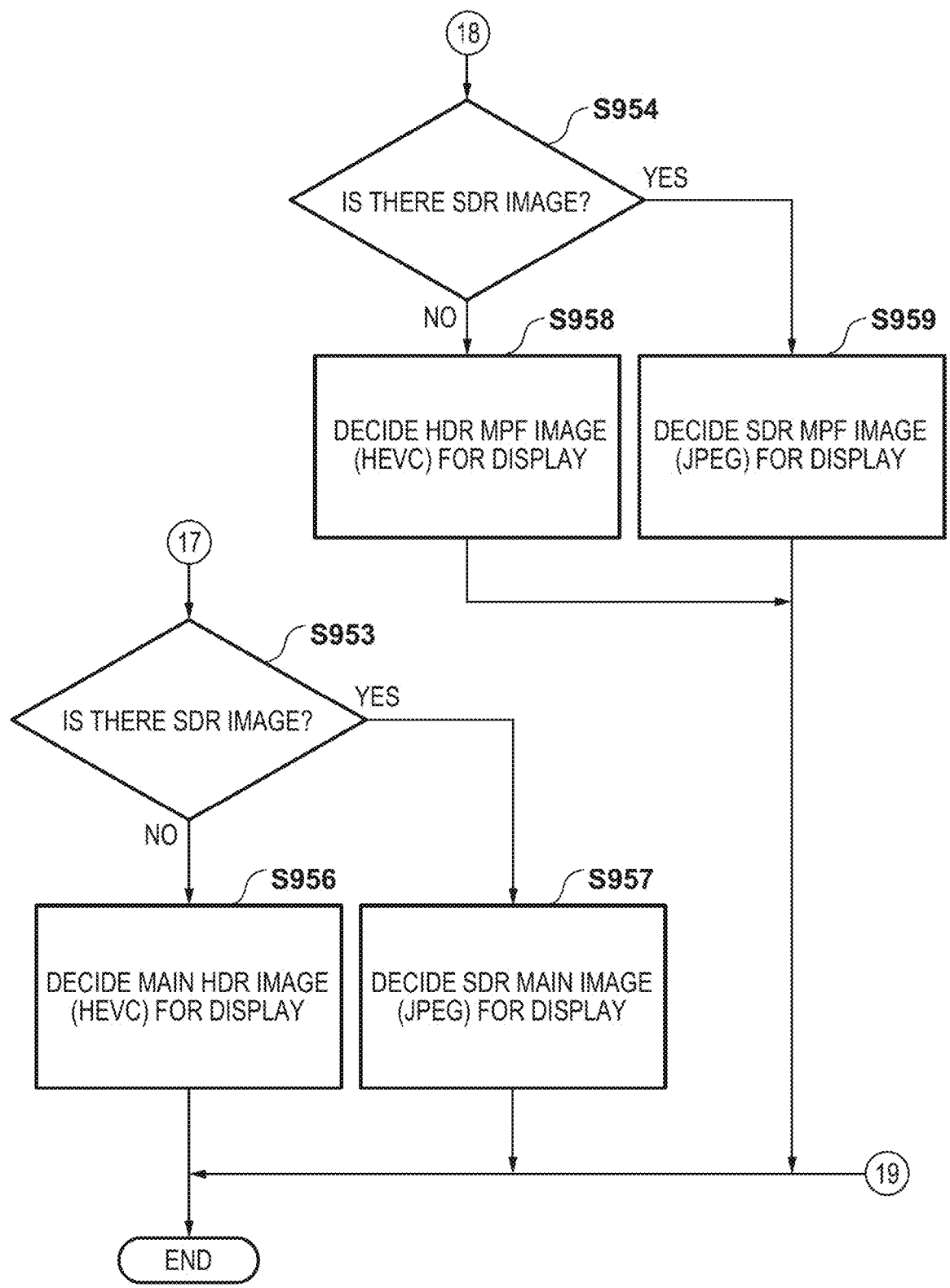

FIGS. 9E-1 and 9E-2 are flowcharts showing a process of selecting image data to be used in playback from a RAW image captured by HDR when the RAW image has an SDR image for display.

In S951, the system control unit 50 determines whether playback is index playback or normal playback. The system control unit 50 advances the process to S952 if it is determined that the playback is index playback, and advances the process to S953 if it is determined that the playback is normal playback.

In S952, the system control unit 50 determines image data to be used in accordance with the number of playback images for index playback. Assume that the threshold value of the determination is 36 in this case. The system control unit 50 advances the process to S955 if it is determined that the number of playback images is 36 or more, and advances the process to S954 if it is determined that the number is less than 36.

In S953, S954, and S955, the system control unit 50 determines whether the RAW image to be played back contains an SDR image. This determination uses metadata in the RAW file explained with reference to FIGS. 8A to 8E.

In S956, the system control unit 50 decides "HDR main image (HEVC) for display" (828) as the image data to be used in playback. In S957, the system control unit 50 decides "SDR main image (JPEG) for display" (823) as the image data to be used in playback. In S958, the system control unit 50 decides "HDR MPF image (HEVC) for display" (827) as the image data to be used in playback. In S959, the system control unit 50 decides "SDR MPF image (JPEG) for display" (822) as the image data to be used in playback. In S960, the system control unit 50 decides "HDR THM image (HEVC) for display" (826) as the image data to be used in playback. In S961, the system control unit 50 decides "SDR THM image (JPEG) for display" (821) as the image data to be used in playback.

FIG. 9F is a flowchart by which the system control unit 50 selects image data to be used in playback from a still image developed by HDR.

In S971, the system control unit 50 determines whether playback is index playback or normal playback. The system control unit 50 advances the process to S972 if it is determined that the playback is index playback, and advances the process to S973 if it is determined that the playback is normal playback.

In S972, the system control unit 50 determines image data to be used in accordance with the number of images to be played back in index playback. In this embodiment, the threshold value of the number is 36. The system control unit 50 advances the process to S975 if it is determined that the number of playback images is 36 or more, and advances the process to S974 if it is determined that the number is less than 36.

In S973, the system control unit 50 decides "HDR main image (HEVC)" (not shown) as the image data to be used in playback. In S974, the system control unit 50 decides "HDR MPF image (HEVC)" (not shown) as the image data to be used in playback. In S975, the system control unit 50 decides "HDR THM image (HEVC)" (not shown) as the image data to be used in playback.

FIG. 9G is a flowchart for selecting image data to be used in playback from a RAW image captured by SDR.

In S981, the system control unit 50 determines whether playback is index playback or normal playback. The system control unit 50 advances the process to S982 if it is determined that the playback is index playback, and advances the process to S983 if it is determined that the playback is normal playback.

In S982, the system control unit 50 determines image data to be used in accordance with the number of playback images in index playback. In this embodiment, the threshold value of the number is 36. The system control unit 50 advances the process to S985 if it is determined that the number of images to be displayed is 36 or more, and advances the process to S984 if it is determined that the number is less than 36.

In S983, the system control unit 50 decides "SDR main image (JPEG) for display" (823) as the image data to be used in playback. In S984, the system control unit 50 decides "SDR MPF image (JPEG) for display" (822) as the image data to be used in playback. In S985, the system control unit 50 decides "SDR THM image (JPEG) for display" (821) as the image data to be used in playback.

Figure 9H:
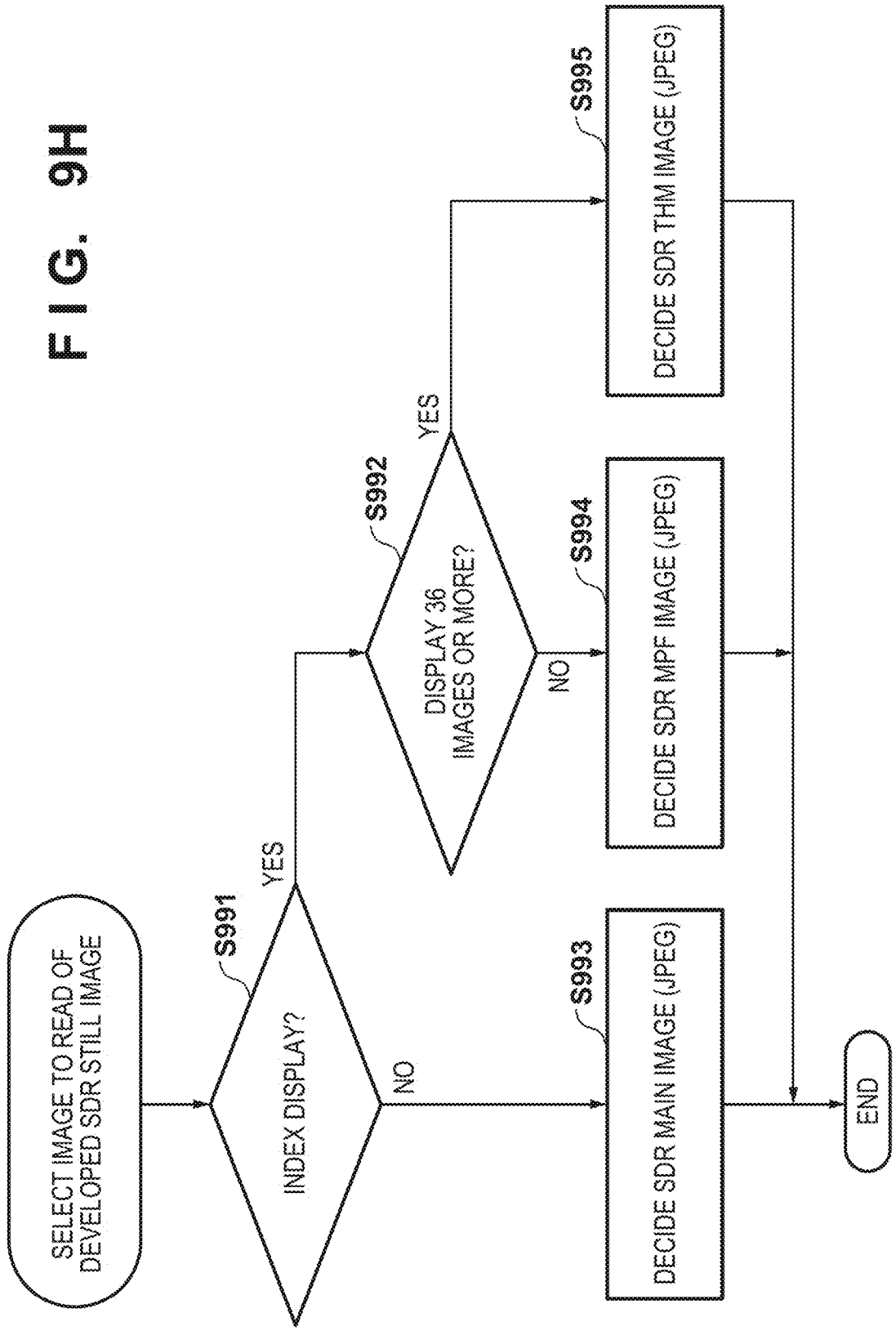
FIG. 9H is a flowchart of the playback mode processing according to the embodiment.

FIG. 9H is a flowchart for selecting image data to be used in playback from a still image developed by SDR.

In S991, the system control unit 50 determines whether playback is index playback or normal playback. The system control unit 50 advances the process to S992 if it is determined that the playback is index playback, and advances the process to S993 if it is determined that the playback is normal playback.

In S992, the system control unit 50 determines image data to be used in accordance with the number of images to be played back in index playback. In this embodiment, the threshold value of the number is 36. The system control unit 50 advances the process to S995 if it is determined that the number of playback images is 36 or more, and advances the process to S994 if it is determined that the number is less than 36.

In S993, the system control unit 50 decides "SDR main image (JPEG)" (not shown) as the image data to be used in playback. In S994, the system control unit 50 decides "SDR MPF image (JPEG)" (not shown) as the image data to be used in playback. In S995, the system control unit 50 decides "SDR THM image (JPEG)" (not shown) as the image data to be used in playback.

FIG. 10A is a flowchart showing details of the playback mode processing using the external apparatus 300. This processing is implemented by deploying a program recorded in the nonvolatile memory 56 in the system memory 52, and executing the program by the system control unit 50.

In S1001, the system control unit 50 determines whether the external apparatus 300 is connected to the digital camera 100. The system control unit 50 advances the process to S1002 if it is determined that the external apparatus 300 is connected, and advances the process to S1005 if it is determined that the external apparatus 300 is not connected.

In S1002, the system control unit 50 determines whether the playback HDR setting is effective. As the playback setting, it is possible to select "perform HDR playback", "do not perform HDR playback", or "synchronized with shooting mode". When "perform HDR playback" is set, the mode is an HDR output mode if the external apparatus 300 supports HDR, regardless of whether the image to be played back is an HDR image or an SDR image. "Do not perform HDR playback" is an SDR output mode. "Synchronized with shooting mode" is a mode in which the playback output is synchronized with the shooting mode. That is, in the HDR shooting mode in which "HDR shooting" is set to "perform", HDR output is performed in playback. In the SDR shooting mode in which "HDR shooting" is set to "do not perform", SDR output is performed in playback. Note that "synchronized with shooting mode" is set as a default mode, and "synchronized with shooting mode" is maintained even when the user has changed the shooting mode. This synchronization is canceled only when the user has changed the playback setting from "synchronized with shooting mode" to "perform HDR playback" or "do not perform HDR playback". It is also possible to use file formats such as "HEIF (playback)" and "JPEG (playback)" as choices instead of "perform HDR playback" and "do not perform HDR playback". Likewise, file formats such as "HEIF (shooting)" and "JPEG (shooting)" can also be used as choices instead of "perform HDR shooting" and "do no perform HDR shooting".

In S1002, the system control unit 50 advances the process to S1003 if "perform HDR playback" is selected, and advances the process to S1005 if "do not perform HDR playback" is selected. Also, the system control unit 50 advances the process to S1003 if "synchronized with shooting mode" is selected and "HDR shooting" set in S606 is "perform", and advances the process to S1005 if "HDR shooting" is "do not perform".

In S1003, the system control unit 50 determines whether the external apparatus 300 is a display that supports HDR. The system control unit 50 advances the process to S1004 if it is determined that the external apparatus 300 is a display that supports HDR, and advances the process to S1005 if not.

In S1004, the system control unit 50 outputs an HDR signal to the external apparatus 300. In S1005, the system control unit 50 outputs an SDR signal to the external apparatus 300.

S1006 to S1011 are the same as S901 to S906 in FIG. 9A, so an explanation thereof will be omitted.

Figure 10B:
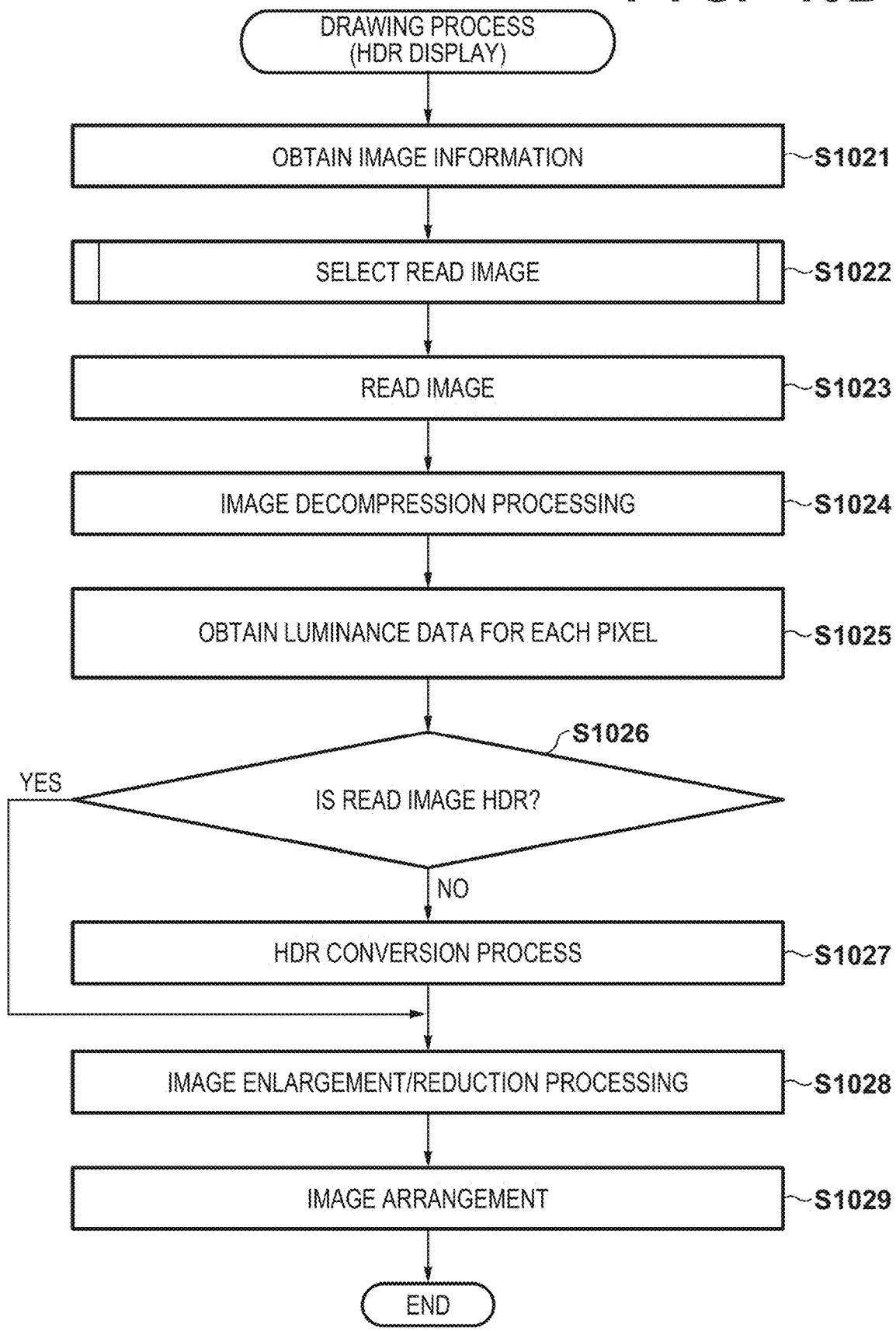
FIG. 10B is a flowchart of the HDMI playback process according to the embodiment.

FIG. 10B is a flowchart showing details of a drawing process (S1009) when an HDR signal is output to the external apparatus 300.

S1021 to S1025, S1028, and S1029 are the same as S911 to S915, S920, and S921 explained with reference to FIG. 9B, so an explanation thereof will be omitted.

In S1026, the system control unit 50 determines whether an image to be played back is an HDR image or an SDR image. The system control unit 50 advances the process to S1028 if it is determined that the image to be played back is an HDR image, and advances the process to S1027 if it is determined that the image to be played back is an SDR image.

In S1027, the system control unit 50 performs an SDR→HDR conversion process. S1028 and S1029 after that are the same as S920 and S921 in FIG. 9B. Note that details of the drawing process (S1009) when an SDR signal is output to the external apparatus 300 are the same as FIG. 9B, so an explanation thereof will be omitted.

Figure 11A:
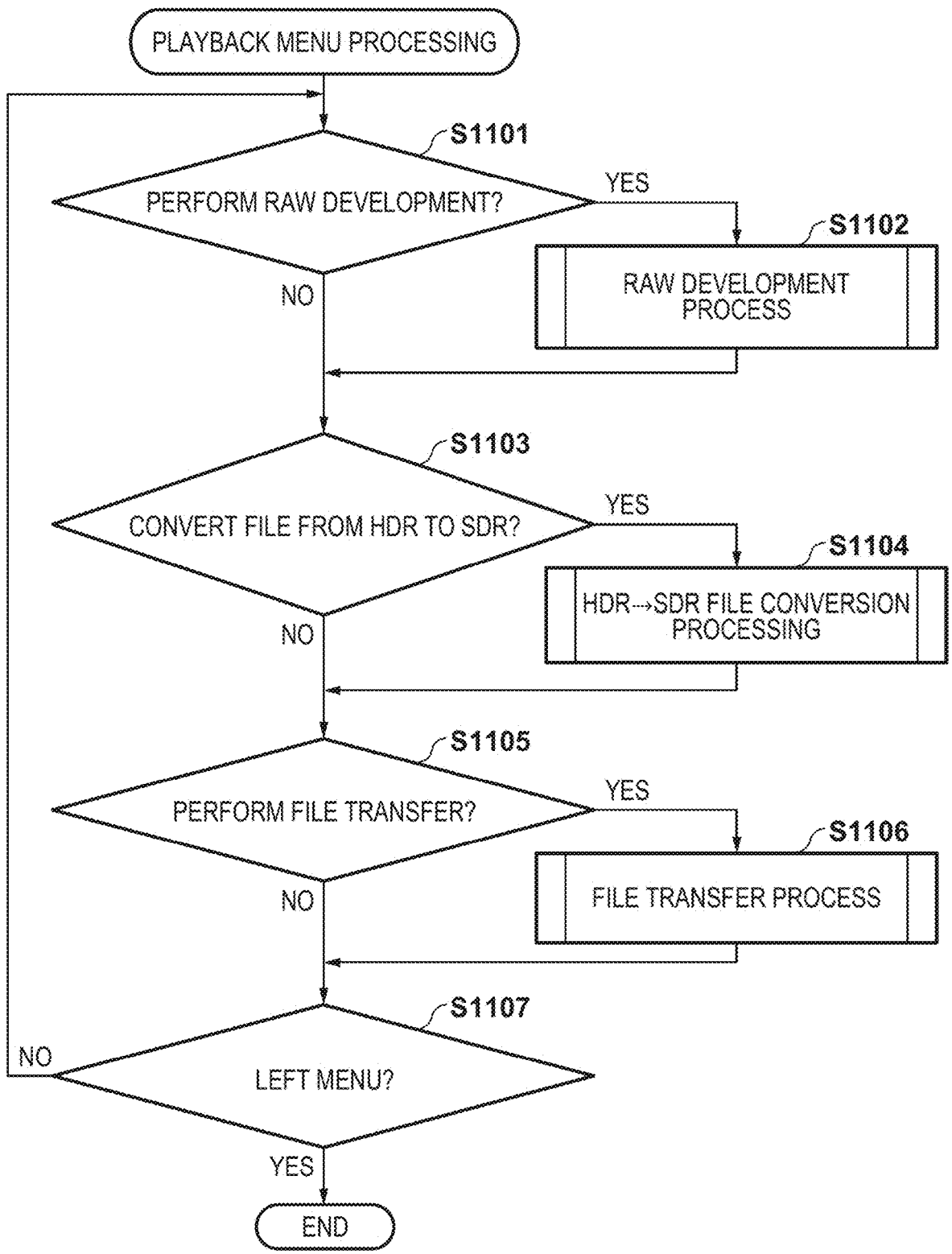
FIG. 11A is a flowchart of playback menu processing according to the embodiment.

FIG. 11A is a flowchart showing details of the playback menu processing. This processing is implemented by deploying a program recorded in the nonvolatile memory 56 in the system memory 52 and executing the program by the system controller 50.

In S1101, the system control unit 50 determines whether the user has set RAW development by a setting item (not shown) of RAW development. The system control unit 50 advances the process to S1103 if it is determined that RAW development is not set, and advances the process to S1102 if it is determined that RAW development is set.

In S1103, the system control unit 50 determines whether HDR→SDR conversion is set by a setting item (not shown) of SDR conversion for an HDR file. The system control unit 50 advances the process to S1105 if it is determined that HDR→SDR conversion is not set, and advances the process to S1104 if it is determined that HDR→SDR conversion is set.

In S1105, the system control unit 50 determines whether file transfer is set by a setting item (not shown) of file transfer. The system control unit 50 advances the process to S1107 if it is determined that file transfer is not set, and advances the process to S1106 if it is determined that file transfer is set.

In S1107, the system control unit 50 determines whether to leave the menu. The system control unit 50 returns the process to S1101 if the determination is "do not leave", and terminates the playback menu processing if the determination is "leave".

In S1106, the system control unit 50 performs a transfer process on an image file designated by the user. If the receiving destination can display only SDR when an HDR image file is to be transferred, it is possible to perform HDR→SDR conversion shown in S1104 in the camera and transfer the HDR image file as an SDR image file.

Figure 11B:
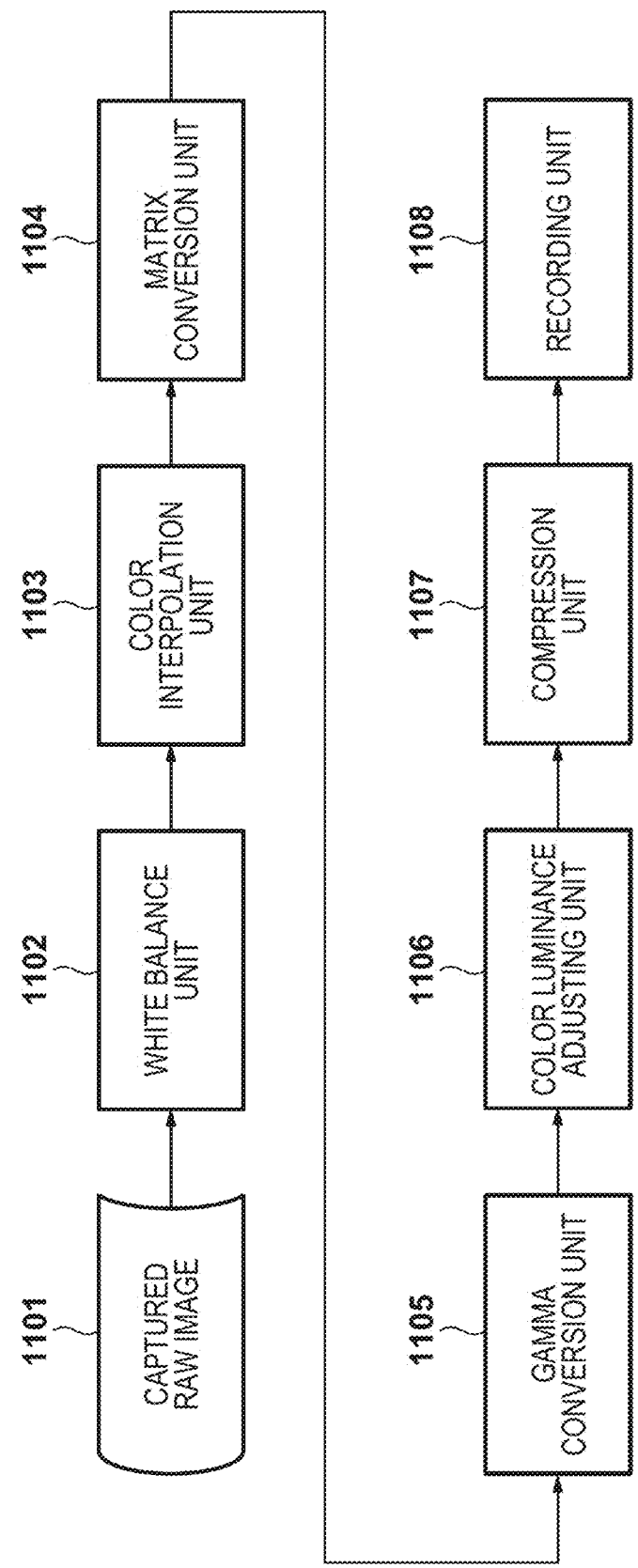
FIG. 11B is a flowchart of the playback menu processing according to the embodiment.

In S1102, the system control unit 50 performs RAW development on the RAW image file designated by the user. Details of this RAW developing process will be explained below with reference to a block diagram shown in FIG. 11B. Note that the image processing unit 24 includes each processing unit shown in FIG. 11*i*, but each processing unit may also be implemented by a program to be executed by the system control unit 50.

The system control unit 50 causes the image processing unit 24 to perform a RAW developing process on a captured RAW image 1101 recorded on the recording medium 200. A RAW image is a set of pixels having the Bayer array, so one pixel has intensity data of only one color component. Note that a RAW image includes RAW (SDR) obtained when SDR shooting is performed and RAW (HDR) obtained when HDR shooting is performed. Also, RAW (SDR) can be developed by either SDR development or HDR development. On the contrary, RAW (HDR) can be developed either HDR development or SDR development. A white balance unit 1102 performs a process of whitening white. When performing HDR development on RAW (HDR), the white balance processing is performed by using an HDR white balance coefficient as HDR development meta recorded in the file. On the other hand, when performing SDR development, the white balance processing is performed by generating an SDR white balance coefficient from the intra-white-search-frame determination result as detection meta stored in the file. When white balance coefficients of both HDR and SDR are recorded in RAW, it is, of course, possible to appropriately use a necessary one.

A color interpolation unit 1103 interpolates noise reduction and a color mosaic image, thereby generating a color image in which each of all pixels has three components (for example, color information of R, G, and B). The generated color image is processed by a matrix conversion unit 1104 and a gamma conversion unit 1105, thereby generating a basic color image. After that, a color luminance adjusting unit 1106 performs a process of improving the appearance of an image, on the generated color image. For example, image correction of detecting an evening scene and emphasizing the saturation is performed in accordance with the scene. Tone correction is also performed in the same manner. When performing HDR development on RAW (HDR), however, tone correction is performed by using a tone correction amount for HDR as HDR development meta stored in the file. On the contrary, when performing SDR development, tone correction is performed by calculating a tone correction amount for SDR by using the face detection result and the histogram as detection meta recorded in the file. When the tone correction amounts of both HDR and SDR are recorded in RAW, it is, of course, possible to appropriately use a necessary one.

For the image having undergone desired color adjustment, a compression unit 1107 compresses a high-resolution image by a method such as JPEG or HEVC, and a recording unit 1108 generates a developed image to be recorded on a recording medium such as a flash memory. Note that the HEIF container described earlier can store a plurality of images, so it is also possible to store an SDR-developed image in addition to an HDR-developed image.

In S1104, the system control unit 50 performs SDR conversion on an HDR image file designated by the user. Since the HDR image is an image generated in a color space in which OETF is PQ and the color gamut is BT.2020, it is necessary to perform tone mapping and gamut mapping in a color space such as γ2.2 or sGRB of SDR. A well-known method can be used as a practical method. For example, when performing tone mapping that matches correct exposure with SDR, a result to which brightness is added compared to SDR can be obtained.

(Modification)

When recording a RAW image by HDR shooting in the above embodiment, a main image developed by HDR, an MPP image for display developed by HDR, and a THM (thumbnail) image developed by HDR are recorded together with RAW image data in a RAW image file, as shown in FIG. 8C. Alternatively, as shown in FIG. 8D, not only the main image, MPP image, and THM image developed by HDR, but also a main image, MPP image, and THM image developed by SDR, are recorded together with the RAW image. Otherwise, as shown in FIG. 8E, the main image and MPP image developed by HDR and the THM image developed by SDR are recorded together with the RAW image.

In this modification, an HDR image file or an SDR image file is associated with a RAW image file and recorded together with the RAW image file in a shooting process. When recording a RAW image file and an HDR image file or an SDR image file by associating the former with the latter, if there is a difference in a developing method or a compression encoding method between the HDR image or the SDR image contained in the RAW image file and an HDR image or an SDR image contained in an image file associated with the RAW image file, management becomes complicated, or the playback compatibility cannot be held. In this modification, therefore, for a RAW image file and an image file associated with the RAW image file, images generated by being developed by the same method and encoded by the same compression coding method are recorded as main images, MPP images, and THM images.

Figure 19A:
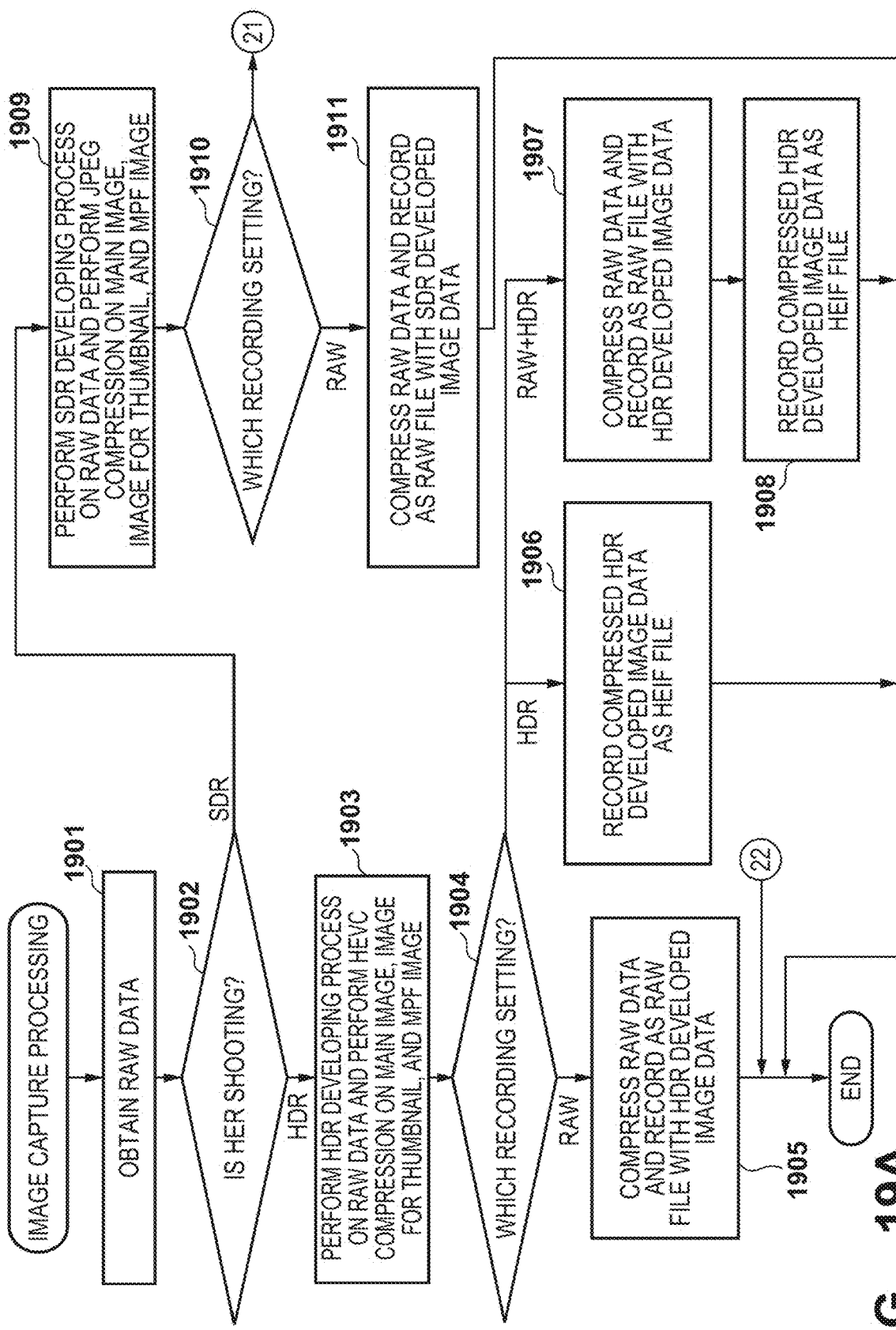
FIG. 19A is a flowchart of a shooting process according to a modification.
Figure 19B:
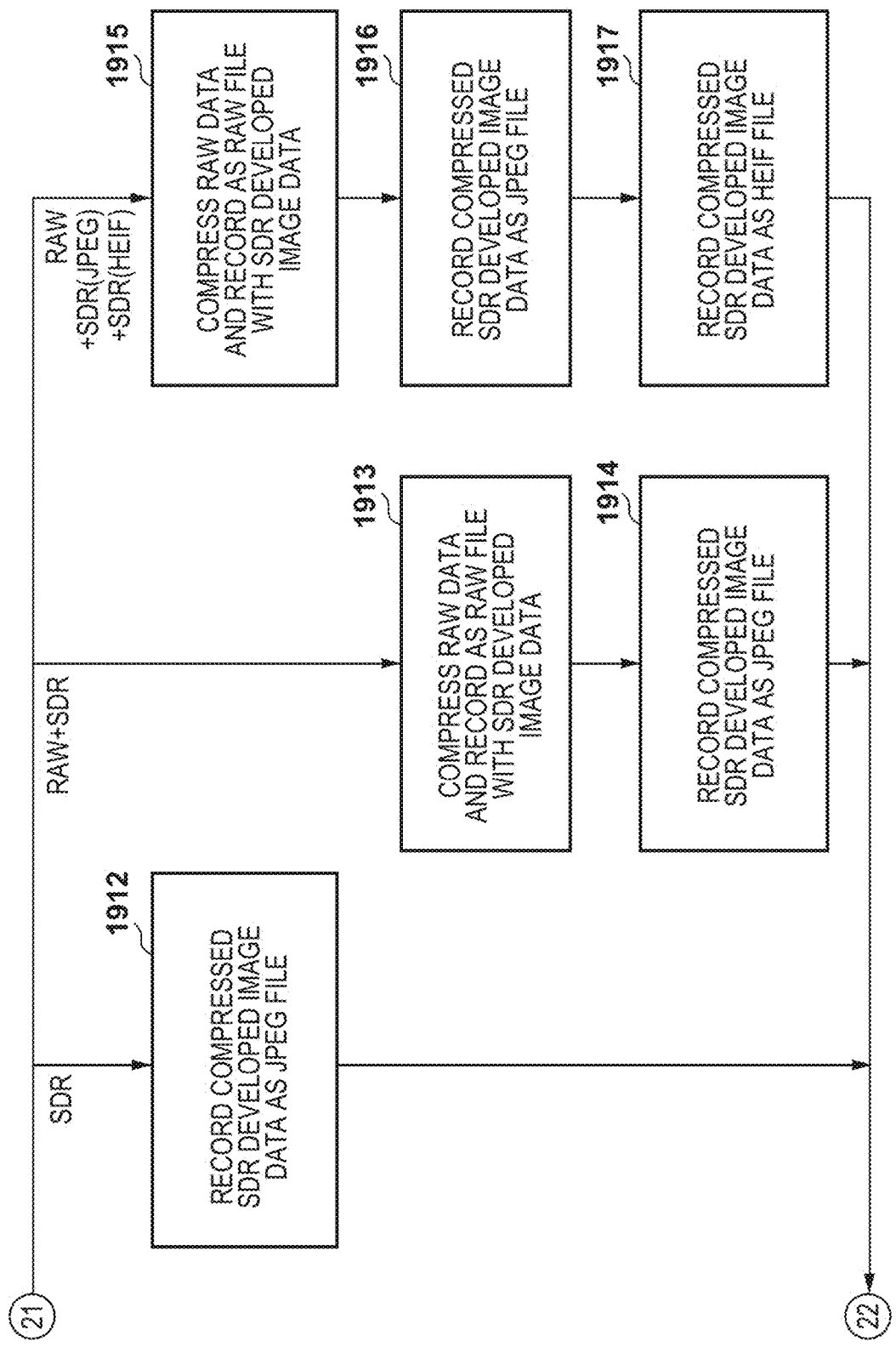
FIG. 19B is a flowchart of the shooting process according to the modification.

FIGS. 19A and 19B are flowcharts of a shooting process according to this modification, which corresponds to the HDR shooting process (FIGS. 7A and 7B) in S418, and the SDR shooting process in S434. This process is implemented by deploying a program recorded in the nonvolatile memory 56 in the system memory 52 and executing the program by the system control unit 50.

First, in S1901, the system control unit 50 obtains RAW data. This processing is the same as S701.

Then, in S1902, the system control unit 50 determines whether the setting of the shooting image quality is the HDR shooting mode. The system control unit 50 advances the process to S1903 if it is determined that the HDR shooting mode is set, and advances the process to S1909 if it is determined that the SDR shooting mode is set.

In S1903, the system control unit 50 performs the same processing as in S702 to S710. That is, various parameters are calculated and a detection process is performed by using the RAW data obtained in S1901, and an HDR main image, an HDR MPF image, and an HDR THM image are generated by performing an HDR developing process on the obtained RAW data. Then, 10-bit data of each of the HDR main image, the HDR MPF image, and the HDR THM image is compression-encoded by the HECV format, thereby generating an HDR compressed image data (HEVC).

Subsequently, in S1904, the system control unit 50 determines the recording image quality set by the user in the same manner as in S711. The system control unit 50 advances the process to S1905 if it is determined that only a RAW image file is recorded by the setting, advances the process to S1906 if it is determined that only an HDR image file is recorded by the setting, and advances the process to S1907 if it is determined that an RAW image file and an HDR image file are recorded by the setting.

In S1905, the system control unit 50 records, in the same manner as in S712, the RAW image data obtained in S1901 as a RAW image file having the container file format as shown in FIG. 8A. In S1905, the HDR main image, the HDR MPF image, and the HDR THM image generated and compression-encoded by the HEVC format in S1903 are recorded as images for display together with the RAW image data in the ImageData 809, as shown in FIG. 8C.

In S1906, the system control unit 50 records the HDR main image, the HDR MPF image, and the HDR THM image generated and compression-encoded in S1903 as an image file having the HEIF format, in the same manner as in S713. That is, the HDR main image is recorded as a main image of the HEIF file, and the HDR MPF image and the HDR THM image are recorded as images for display in the HEIF file.

Figure 17B:
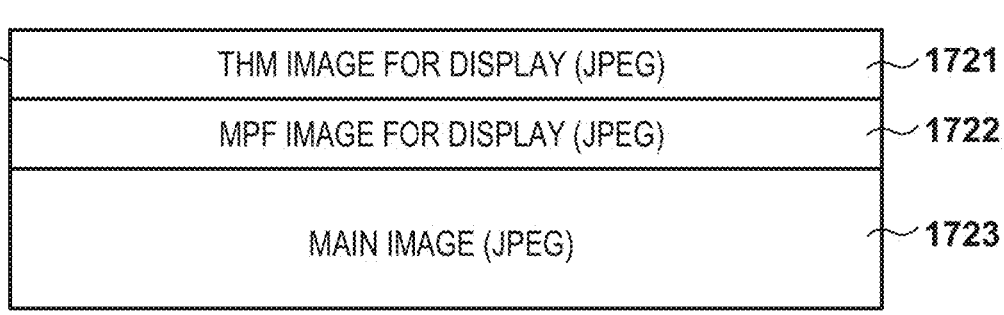
FIG. 17B is a view showing an example of an ImageData region in the HEIF file.
Figure 17C:
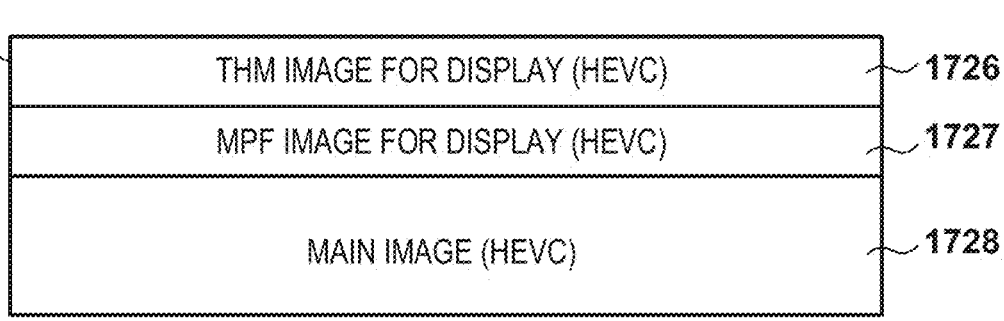
FIG. 17C is a view showing an example of the ImageData region in the HEIF file.

The HEIF file will be explained. FIG. 17A shows the structure of an image file having the HEIF format. The container file format of an image file to be exemplified below is an ISO base media file format defined by ISO/IEC14496-12. Accordingly, the container format of this file has a tree structure and has a node called a box. Also, each box can have a plurality of boxes as child elements. An HEIF image data file 1701 has a box ftyp 1702 for describing a file type at the head, and also has a box meta 1703 containing metadata, and a box mdat 1708 containing a media data main body (image data) of a track. The box meta 1703 has, as child elements, a trak box 1706 for storing information that refers to ImageData, and a box MetaData 1705-1 for storing metadata other than metadata defined by EXIF. The box mdat 1708 has, as child elements, a box MetaData 1705-2 for storing metadata such as the shooting date/time and the shooting conditions of an image defined by EXIF, and ImageData 1709 as captured still image data. The ImageData 1709 stores image data. Image data to be recorded in the ImageData 1709 by SDR shooting differs from that to be recorded by HDR shooting. In S1906, an image as shown in FIG. 17C is recorded in the ImageData 1709. In this case, a THM image 1726 for display and an MPF image 1727 for display, each of which is developed by the HDR image quality and compressed by HEVC, and a main image 1728 developed by the HDR image quality and compressed by HEVC, are recorded in the ImageData 1709.

In S1907, the system control unit 50 records the RAW image data obtained in S1901 as a RAW image file having the container file format as shown in FIG. 8A, in the same manner as in S1905. Then, in S1908, the system control unit 50 records the HDR main image, the HDR MPF image, and the HDR THM image, each of which is generated and compression-encoded by the HEVC format in S1903, as an image file having the HEIF format, in the same manner as in S1906. That is, when recording a RAW file of RAW image data and an image file (HEIF file) developed by HDR, identical images having undergone the same developing process and encoded by the same encoding format (HEVC) are recorded as an MPF image for display and a THM image for display. Also, image data to be recorded as a main image for display of the RAW image file and image data to be recorded as a main image of the developed image file (HEIF file) are identical images encoded by the same encoding format (HEVC). Note that the system control unit 50 associates the RAW image file to be recorded in S1907 with the developed image file (HEIF file) to be recorded in S1908.

As described above, in the RAW file and the HEIF file to be recorded at the same time as they are associated with each other, identical images having undergone the same HDR developing process and encoded by the same encoding format (HEVC) are recorded as images for display. This makes it possible to prevent management from being complicated, and hold the playback compatibility.

Also, as the images for display to be recorded in the RAW file that is recorded in S1905 and in the HEIF file that is recorded in S1906, images having undergone the same HDR developing process and the encoding process having the same format (HEVC) as those in S1907 and S1908 are recorded. Even when the recording format is changed, therefore, it is possible to prevent the inconvenience that another playback apparatus or the like cannot play back an image in a specific one of image files captured by the same HDR shooting setting, so the playback compatibility can be held.

In S1909, the system control unit 50 causes the image processing unit 24 to perform an SDR developing process on the RAW image data obtained in S701, thereby generating an SDR main image, an SDR MPF image, and an SDR THM image. Then, SDR compressed image data (JPEG) is generated by compression-encoding each image by the JPEG format. Since the image is an SDR image, the developed and compression-encoded image data is 8-bit YUV420 data. In addition, the calculation of various parameters and a detection process are also performed in the same manner as in HDR shooting.

Subsequently, in S1910, the system control unit 50 determines the recording image quality set by the user. The system control unit 50 advances the process to S1911 if it is determined that only a RAW image file is recorded by the setting, and advances the process to S1912 if it is determined that only an SDR image file is recorded by the setting. Also, the system control unit 50 advances the process to S1913 if it is determined that a RAW image file and an SDR image file are recorded by the setting, and advances the process to S1914 if it is determined that a RAW image file and a plurality of types of SDR image files are recorded by the setting.

In S1911, the system control unit 50 compresses the RAW image, adds a header, and records the RAW image as a RAW image file having the container file structure as shown in FIG. 8A, on the recording medium 200 via the recording medium I/F 18, in the same manner as in S1905. In S1911, the SDR image generated in S1909 is recorded as image data for display, and the SDR development parameters generated in S1909 are recorded as RAW development parameters, unlike S1905. That is, in S1911, data is recorded in the ImageData 809 of the RAW image file as shown in FIG. 8B. In S1911, the raw image data (lossless compression or lossy compression) 824 obtained in S1901 and the SDR RAW development parameters generated in S1909 are recorded in the ImageData 809 of the RAW image file 801. Furthermore, the SDR THM image (JPEG) 821, the SDR MPF image (JPEG) 822, and the SDR main image (JPEG) 823, each of which is generated in S1909, are recorded as images for display in the ImageData 809 of the RAW image file 801.

Figure 18:
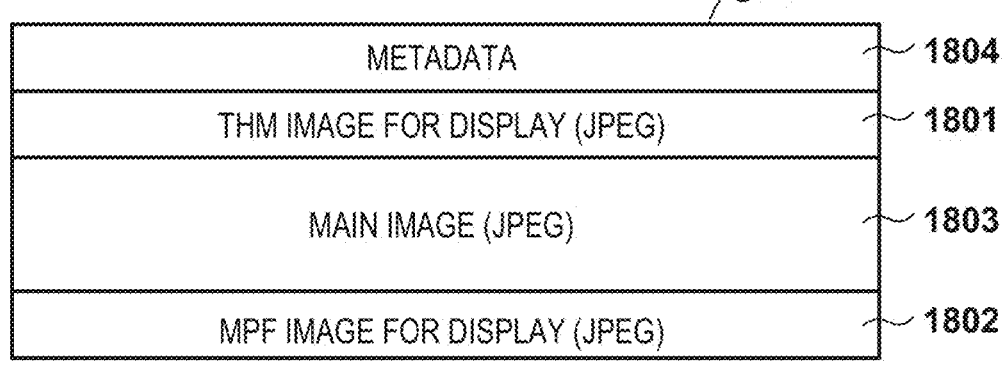
FIG. 18 is a view showing the configuration of a JPEG file.

In S1912, the system control unit 50 records the SDR developed image data (the THM image, the MPF image, and the main image) generated and compression-encoded by JPEG in S1909, as a JPEG file on the recording medium 200 via the recording medium I/F 18. FIG. 18 shows the file structure of the JPEG format. An image data file 1800 having the JPEG format has metadata 1804 such as EXIF at the head, and further has a THM image 1801, an MPF image 1802, and a main image 1803, each of which has the SDR image quality and is compressed by JPEG. The file format indicated in this example is one embodiment, and may also have another information as needed.

In S1913, the system control unit 50 records the RAW image data obtained in S1901 and the SDR image data generated and compressed by JPEG in S1909 as a JPEG image file on the recording medium 200 via the recording medium I/F 18, in the same manner as in S1911. Then, in S1914, the system control unit 50 records the SDR image data generated and compressed by JPEG in S1909 as a JPEG image file on the recording medium 200 via the recording medium I/F 18, in the same manner as in S1912. As described above, when recording a RAW image file of RAW image data and an image file (JPEG file) developed by SDR, identical images having undergone the same developing process and encoded by the same encoding format (JPEG) are recorded as an MPF image for display and a THM image for display. Also, image data to be recorded as an image for display of the RAW image file, and image data to be recorded as a main image of the developed image file (JPEG file), are identical images having undergone the same developing process and encoded by the same encoding format (JPEG). Note that the system control unit 50 associates the RAW image file to be recorded in S1913 with the developed image file (JPEG file) to be recorded in S1914, and records them.

As described above, in the RAW file and the JPEG file to be recorded at the same time as they are associated with each other, identical images having undergone the same SDR developing process and encoded by the same encoding format (JPEG) are recorded as images for display. This makes it possible to prevent management from being complicated, and hold the playback compatibility.

In S1915, the system control unit 50 records the RAW image data obtained in S1901 and the JPEG-compressed SDR image data generated in S1909 as a JPEG file on the recording medium 200 via the recording medium I/F 18, in the same manner as in S1911. Then, in S1916, the system control unit 50 records the JPEG-compressed SDR image data generated in S1909 as a JPEG image file on the recording medium 200 via the recording medium I/F 18, in the same manner as in S1912. Furthermore, in S1917, the system control unit 50 records the JPEG-compressed SDR image data generated in S1909 as an HEIF file on the recording medium 200 via the recording medium I/F 18. In S1917, the image data is recorded in the ImageData 1709 as shown in FIG. 17B, unlike S1906. That is, the SDR THM image (JPEG) 1721 and the SDR MPF image (JPEG) 1722 generated in S1909 are recorded as images for display, and the SDR main image (JPEG) 1723 generated in S1909 is recorded as a main image.

Note that the system control unit 50 associates the RAW file to be recorded in S1915, the JPEG file to be recorded in S1916, and the HEIF file to be recorded in S1917 with each other. As described above, in the RAW, JPEG, and HEIF files to be recorded at the same time as they are associated with each other, identical images having undergone the same SDR developing processing and encoded by the same encoding format (JPEG) are recorded as images for display. This makes it possible to prevent management from being complicated, and hold the playback compatibility. Also, in the RAW files to be recorded in S1911, S1913, and S1915, the JPEG files to be recorded in S1912, S1914, and S1916, and the HEIF file to be recorded in S1917, images for display having undergone the same HDR developing process and encoded by the same format (JPEG) are recorded. Even when the recording format is changed, therefore, it is possible to prevent the inconvenience that another playback apparatus or the like cannot playback an image in a specific one of image files captured by the same SDR shooting setting, so the playback compatibility can be held.

Note that SDR images are recorded in JPEG files in S1912 and S1914 in the above explanation, but they may also be recorded as HIEF files in the same manner as in S1917.

Note also that in the above explanation, the HDR THM image for display and the HDR MPF image to be recorded in the RAW file in S1907 and the HDR THM image for display and the HDR MPF image to be recorded in the HIEF file in S1908 are identical image data. However, these images need not be completely identical images as long as the images are generated by encoding images having undergone the HDR developing process, by using the same encoding format. Likewise, the image for display to be recorded in the RAW file in S1913 and the image for display to be recorded in the JPEG file in S1914 need not be completely identical images as long as the images are generated by encoding images having undergone the SDR developing process, by using the same encoding format. This applies to S1915 as well.

Also, in S1907, the HDR main image data to be recorded as a main image in the HEIF file in S1908 is recorded as an image for display of the RAW image file. However, it is also possible to record, for example, image data having different sizes without recording the same image data. Similarly, in S1913, the SDR main image data to be recorded as a main image in the JPEG file in S1914 need not be recorded as an image for display of the RAW image file, and different image data can be recorded instead. This applies to S1915 as well.

Figure 17D:
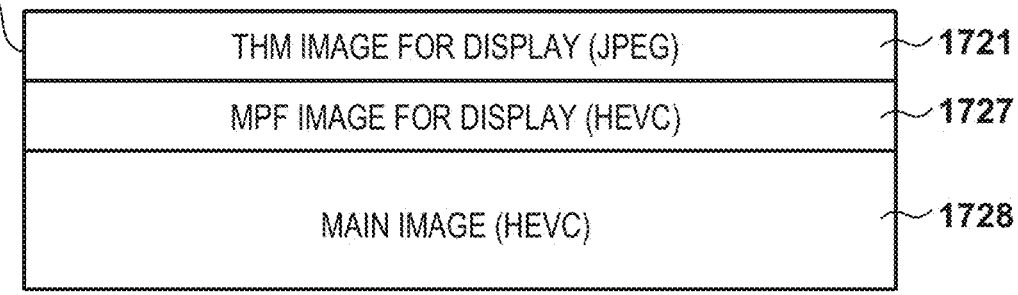
FIG. 17D is a view showing an example of the ImageData region in the HEIF file.

Furthermore, when recording an HEIF file, a JPEG image can be recorded as a thumbnail image for display without recording an HEVC image, as shown in FIG. 17D. When a JPEG image is recorded as a thumbnail for display, even a display device or a PC that does not support decoding of H.265 as the compression method of HDR can display only the thumbnail image.

According to the present invention, even when recording RAW image data in an image capturing apparatus that supports a plurality of types of dynamic ranges such as SDR and HDR, developed image data corresponding to a selected dynamic range is recorded in a RAW image file, so an image having the selected dynamic range can be checked when, for example, performing simple display such as file list display.

Also, according to the present invention, even when recording RAW image data in an image capturing apparatus that supports a plurality of types of dynamic ranges such as SDR and HDR, developed image data corresponding to a selected dynamic range is recorded in a RAW image file. Therefore, an image having the selected dynamic range can be checked when, for example, performing simple display such as file list display.

Alternatively, the present invention can prevent the complexity of management and hold the playback compatibility when recording a plurality of types of files in an image capturing apparatus that supports a plurality of types of dynamic ranges.

OTHER EMBODIMENTS

The preferred embodiments of the present invention have been explained above, but the present invention is not limited to these embodiments, and various modifications and changes can be made within the spirit and scope of the invention. For example, in the above embodiments, HEVC (High Efficiency Video Coding) is adopted to encode image data in which one color component exceeds 8 bits. However, the type of a method is not particularly limited as long as the method can encode an image in which one color component exceeds 8 bits. Also, the above embodiments have been explained by assuming that the present invention is applied to a digital camera. However, the present invention is not limited to the above embodiments and is also applicable to a computer (such as a smartphone or a laptop PC with a camera) having an image capturing function.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image capturing apparatus comprising:
an image capturing unit;
a selecting unit configured to select a dynamic range;
a developing unit configured to perform a developing process on RAW image data obtained by the image capturing unit; and
a control unit configured to perform control, when recording RAW image data obtained by the image capturing unit as a RAW image file, such that if a first dynamic range is selected by the selecting unit, image data obtained by performing a developing process for the first dynamic range on the RAW image data by the developing unit is recorded as the RAW image file together with the RAW image data, and
if a second dynamic range is selected by the selecting unit, image data obtained by performing a developing process for the second dynamic range on the RAW image data by the developing unit is recorded as the RAW image file together with the RAW image data.

2. The image capturing apparatus according to claim 1, wherein when recording developed image data as an image file,
the control unit performs control such that if the first dynamic range is selected by the selecting unit, image data obtained by performing, by the developing unit, a developing process for the first dynamic range on RAW image data obtained by the image capturing unit is recorded as an image file having a first format, and
if the second dynamic range is selected by the selecting unit, image data obtained by performing, by the developing unit, a developing process for the second dynamic range on the RAW image data is recorded as an image file having a second format.

3. The image capturing apparatus according to claim 2, wherein
the control unit records image data processed by the developing unit as a JPEG file if the first dynamic range is selected by the selecting unit, and
records image data processed by the developing unit as an HEIF file if the second dynamic range is selected by the selecting unit.

4. The image capturing apparatus according to claim 2, further comprising an encoding unit configured to encode image data having undergone a developing process performed by the developing unit,
wherein image data having undergone a developing process for the first dynamic range and image data having undergone a developing process for the second dynamic range are encoded by different encoding formats.

5. The image capturing apparatus according to claim 4, wherein image data having undergone a developing process for the first dynamic range is encoded by a JPEG format, and image data having undergone a developing process for the second dynamic range is encoded by an HEVC format.

6. The image capturing apparatus according to claim 1, wherein the second dynamic range is wider than the first dynamic range.

7. The image capturing apparatus according to claim 6, wherein the first dynamic range is SDR, and the second dynamic range is HDR.

8. The image capturing apparatus according to claim 1, wherein if the first dynamic range is selected, the developing unit performs a developing process such that image data in which one color component has 8 bits is generated, and if the second dynamic range is selected, the developing unit performs a developing process such that image data in which one color component exceeds 8 bits is generated.

9. The image capturing apparatus according to claim 1, further comprising a generating unit configured to generate image data having a plurality of sizes from image data obtained by the developing process, wherein when recording RAW image data obtained by the image capturing unit as a RAW image file, the control unit records the image data having a plurality of sizes generated by the generating unit as the RAW image file together with the RAW image data.

10. The image capturing apparatus according to claim 9, wherein a plurality of sizes to be generated by the generating unit include at least a thumbnail size and an image size represented by RAW image data.

11. The image capturing apparatus according to claim 4, wherein when recording RAW image data obtained by the image capturing unit as a RAW image file, the control unit performs control such that when recording developed image data, which is obtained by performing a developing process for the first dynamic range on the RAW image data by the developing unit, as an image file different from the RAW image file, compressed image data obtained by performing, by the encoding unit, a compression encoding process having a first encoding format on the developed image data having undergone the developing process for the first dynamic range performed by the developing unit, is recorded as an image for display in each of the RAW image file and the image file, and when recording developed image data, which is obtained by performing a developing process for the second dynamic range on the RAW image data by the developing unit, as an image file different from the RAW image file, compressed image data obtained by performing, by the encoding unit, a compression encoding process having a second encoding format on the developed image data having undergone the developing process for the second dynamic range performed by the developing unit, is recorded as an image for display in each of the RAW image file and the image file.

12. The image capturing apparatus according to claim 11, wherein the control unit performs control such that compressed image data obtained by performing, by the encoding unit, a compression encoding process having the first encoding format on developed image data obtained by performing a developing process for the first dynamic range on the RAW image data by the developing unit, is recorded as an image file different from the RAW image file, and compressed image data obtained by performing, by the encoding unit, a compression encoding process having the second encoding format on developed image data obtained by performing a developing process for the second dynamic range on the RAW image data by the developing unit, is recorded as an image file different from the RAW image file.

13. The image capturing apparatus according to claim 11, wherein the control unit performs control such that developed image data obtained by performing a developing process for the first dynamic range on the RAW image data by the developing unit is recorded as an image file having a first file format different from the RAW image data, and developed image data obtained by performing a developing process for the second dynamic range on the RAW image data by the developing unit is recorded as an image file having a second file format different from the RAW image data.

14. The image capturing apparatus according to claim 11, wherein the control unit performs control such that developed image data obtained by performing a developing process for the first dynamic range on the RAW image data by the developing unit is recorded as an image file having a second file format different from the RAW image data, and developed image data obtained by performing a developing process for the second dynamic range on the RAW image data by the developing unit is recorded as an image file having the second file format different from the RAW image data.

15. The image capturing apparatus according to claim 11, wherein when recording RAW image data obtained by the image capturing unit as a RAW image file, the control unit performs control such that encoding formats of an image for display to be recorded together with the RAW image data in the RAW image file are switched in accordance with a dynamic range selected by the selecting unit.

16. The image capturing apparatus according to claim 11, wherein when recording developed image data obtained by performing a developing process on the RAW image data by the developing unit as an image file different from the RAW image file, the control unit performs control such that image data to be recorded as an image for display in the image file is recorded as image data for display of the RAW image data.

17. The image capturing apparatus according to claim 11, wherein when recording developed image data obtained by performing a developing process on the RAW image data by the developing unit as an image file different from the RAW image file, the control unit performs control such that developed image data to be recorded as a main image of the image file is recorded as an image for display of the RAW image file.

18. A method of controlling an image capturing apparatus comprising an image capturing unit, comprising:

(a) selecting a dynamic range;

(b) performing a developing process on RAW image data obtained by the image capturing unit; and (c) performing control, when recording RAW image data obtained by the image capturing unit as a RAW image file, such that if a first dynamic range is selected in the selecting (a), image data obtained by performing a developing process for the first dynamic range on the RAW image data in the developing (b) is recorded as the RAW image file together with the RAW image data, and if a second dynamic range is selected in the selecting (a), image data obtained by performing a developing process for the second dynamic range on the RAW image data in the developing (b) is recorded as the RAW image file together with the RAW image data.

19. A non-transitory computer-readable storage medium storing a program which, when read and executed by a computer, causes the computer to execute steps of a method of controlling an image capturing apparatus comprising an image capturing unit, the method comprising:

(a) selecting a dynamic range;

(b) performing a developing process on RAW image data obtained by the image capturing unit; and (c) performing control, when recording RAW image data obtained by the image capturing unit as a RAW image file, such that if a first dynamic range is selected in the selecting (a), image data obtained by performing a developing process for the first dynamic range on the RAW image data in the developing (b) is recorded as the RAW image file together with the RAW image data, and if a second dynamic range is selected in the selecting (a), image data obtained by performing a developing process for the second dynamic range on the RAW image data in the developing (b) is recorded as the RAW image file together with the RAW image data.

* * * * *